(12) United States Patent
Hatano et al.

(10) Patent No.: US 7,967,128 B2
(45) Date of Patent: Jun. 28, 2011

(54) ARTICLE CONVEYING DEVICE

(75) Inventors: Kouichi Hatano, Kawasaki (JP);
Hiroshi Inada, Kawasaki (JP); Katsuo Takahashi, Kawasaki (JP); Hidenori Shirai, Kawasaki (JP)

(73) Assignee: Kao Corporation, Tokyo (JP)

( * ) Notice: Subject to any disclaimer, the term of this patent is extended or adjusted under 35 U.S.C. 154(b) by 45 days.

(21) Appl. No.: 12/519,285

(22) PCT Filed: Dec. 13, 2007

(86) PCT No.: PCT/JP2007/074583
§ 371 (c)(1),
(2), (4) Date: Jun. 15, 2009

(87) PCT Pub. No.: WO2008/072786
PCT Pub. Date: Jun. 19, 2008

(65) Prior Publication Data
US 2010/0032265 A1    Feb. 11, 2010

(30) Foreign Application Priority Data

Dec. 15, 2006  (JP) .................................. 2006-338649
May 2, 2007   (JP) .................................. 2007-121902

(51) Int. Cl.
*B65G 25/00*   (2006.01)
(52) U.S. Cl. ........................................ 198/773
(58) Field of Classification Search ........... 198/773, 198/774.1, 775
See application file for complete search history.

(56) References Cited

U.S. PATENT DOCUMENTS

| | | | | |
|---|---|---|---|---|
| 1,760,369 A * | 5/1930 | Moe | .............................. | 198/773 |
| 1,865,086 A * | 6/1932 | Cutler | ............................. | 198/382 |
| 2,728,443 A * | 12/1955 | Pike, Jr et al. | ................. | 198/383 |
| 3,561,582 A * | 2/1971 | Smith | .............................. | 198/382 |
| 3,584,735 A * | 6/1971 | Daugherty | ..................... | 198/773 |
| 3,923,143 A * | 12/1975 | Green | ............................. | 198/773 |
| 4,215,966 A * | 8/1980 | Cooper | .......................... | 414/173 |
| 5,647,472 A * | 7/1997 | Fierkens | ........................ | 198/443 |
| 5,938,002 A * | 8/1999 | Molenaar et al. | .............. | 198/773 |
| 6,450,324 B1 * | 9/2002 | Lindenblatt | .................... | 198/773 |
| 6,761,261 B2 * | 7/2004 | Dussault et al. | ............... | 198/773 |
| 7,131,527 B2 * | 11/2006 | Robitaille et al. | ............. | 198/773 |

FOREIGN PATENT DOCUMENTS

| | | |
|---|---|---|
| DE | 2 319 116 | 10/1974 |
| FR | 2 736 625 | 1/1997 |
| JP | 60 114116 | 8/1985 |
| JP | 62 13918 | 1/1987 |

(Continued)

*Primary Examiner* — Mark A Deuble
(74) *Attorney, Agent, or Firm* — Oblon, Spivak, McClelland, Maier & Neustadt, L.L.P.

(57) ABSTRACT

An article conveying device 10 in which a floor surface 21 of each of a plurality of fixed floors 20 is arranged so as to form a descending slope towards a downstream side in a conveying direction with respect to each other, each of a plurality of moving floors 30 is adjacently arranged on a side in the conveying direction with respect to each fixed floor 20, and a raising/lowering operation of simultaneously positioning the respective floor surface 31 of each moving floor 30 at a high position and a low position with respect to the floor surface 21 of the adjacent fixed floor 20 is repeated to arrange the floor surface 31 of each moving floor 30 positioned at the high position so as to form a descending slope towards the downstream side in the conveying direction with respect to each other.

20 Claims, 46 Drawing Sheets

FOREIGN PATENT DOCUMENTS

| | | |
|---|---|---|
| JP | 3 6398 | 1/1991 |
| JP | 3 73514 | 7/1991 |
| JP | 6 72953 | 10/1994 |
| JP | 2003 292138 | 10/2003 |

* cited by examiner (A)

(B) ARTICLE NOT CONTACTED EVEN IF MOVING FLOOR IS RAISED (C) RISING OF MOVING FLOOR (D) LOWERING OF MOVING FLOOR

FIG.10
(A)
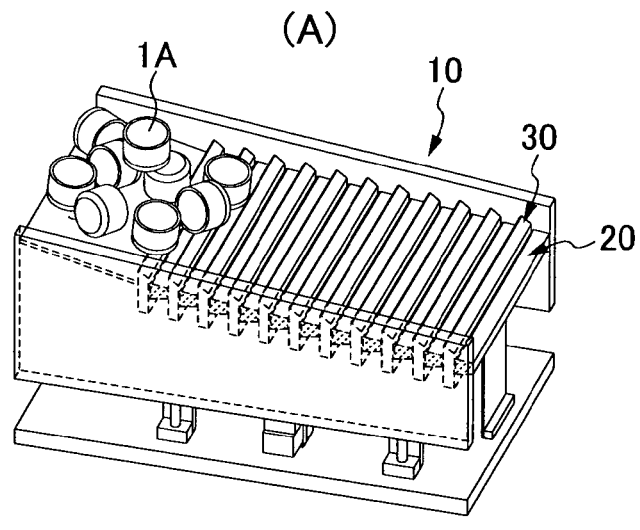
(B)
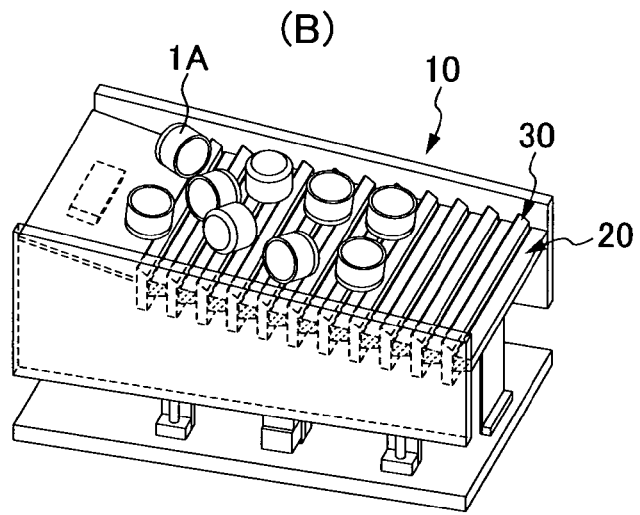
(C)
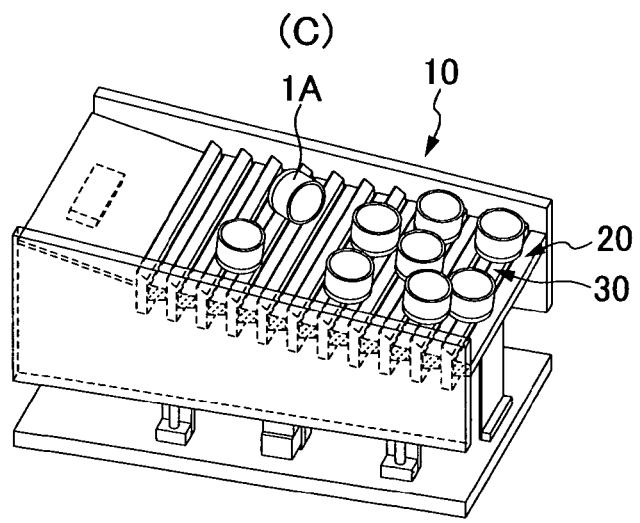

FIG.11
(A)
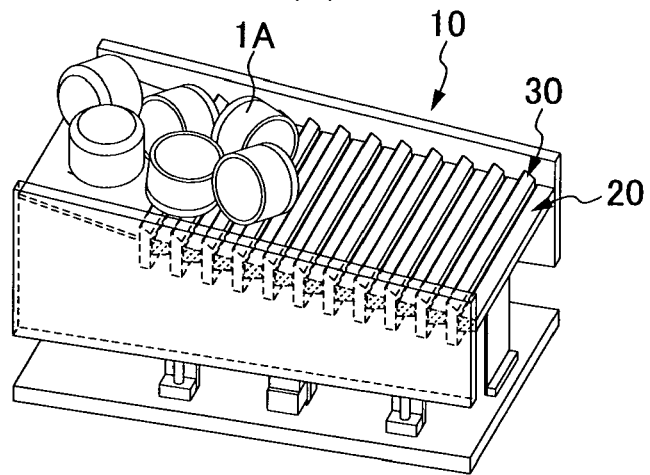
(B)
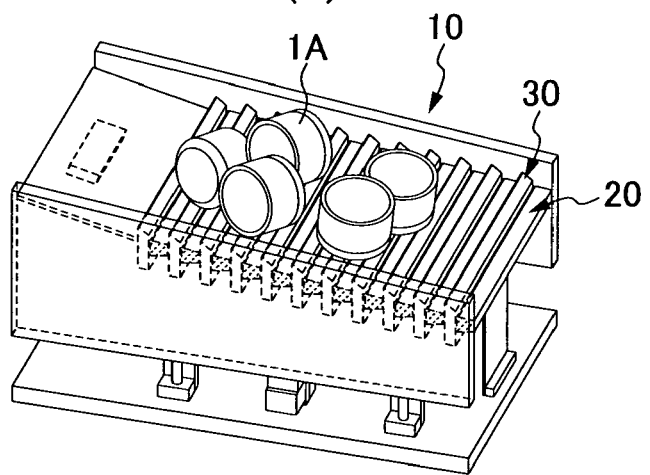
(C)
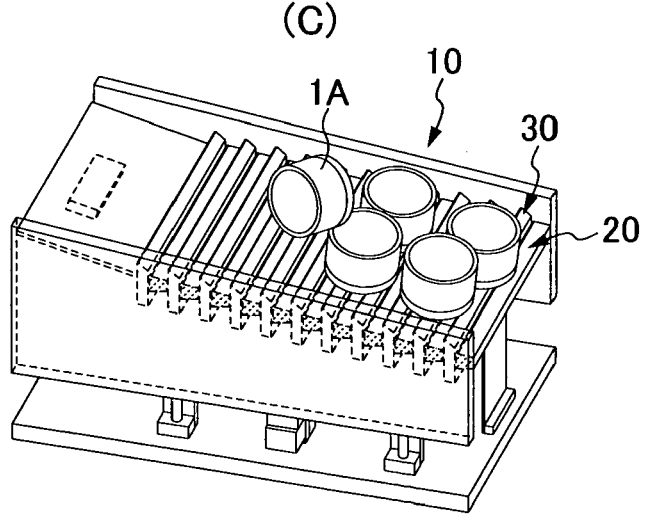

FIG.12
(A)
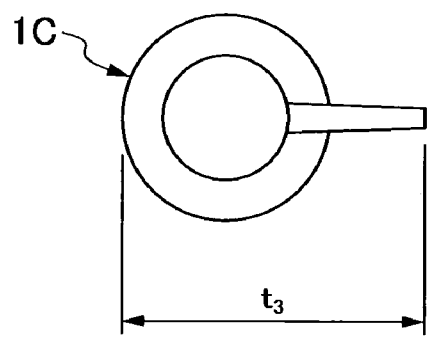
(B)
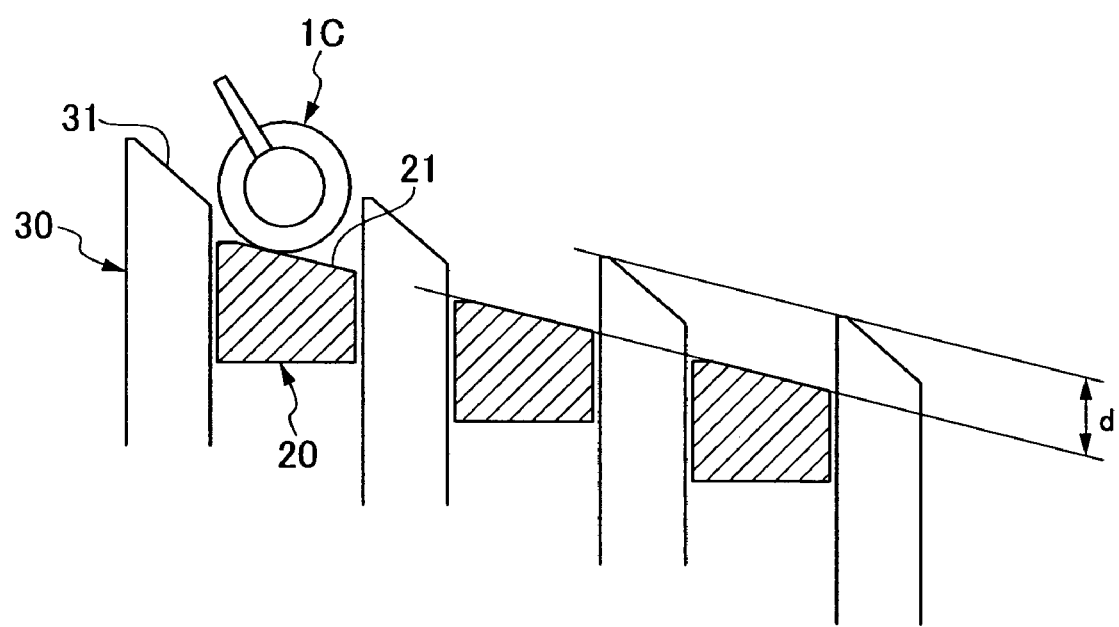

FIG.13
(A)
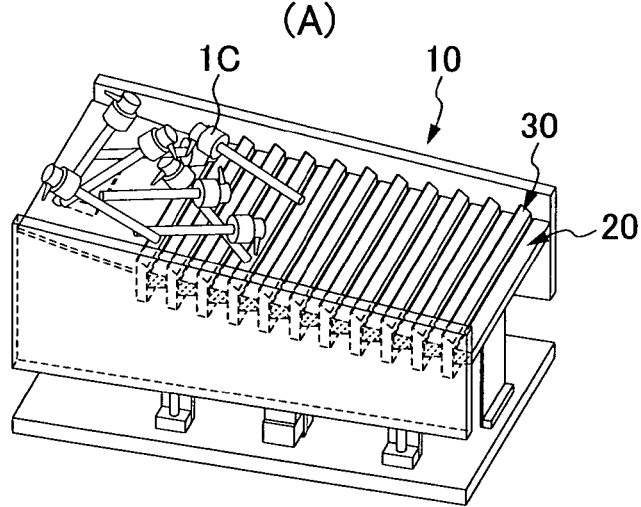
(B)
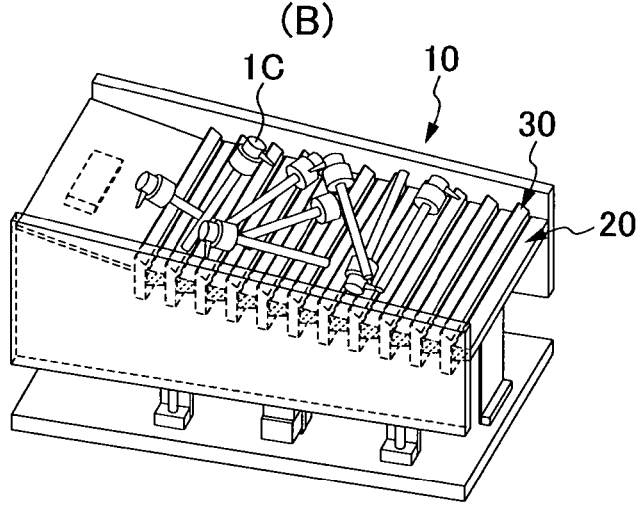
(C)
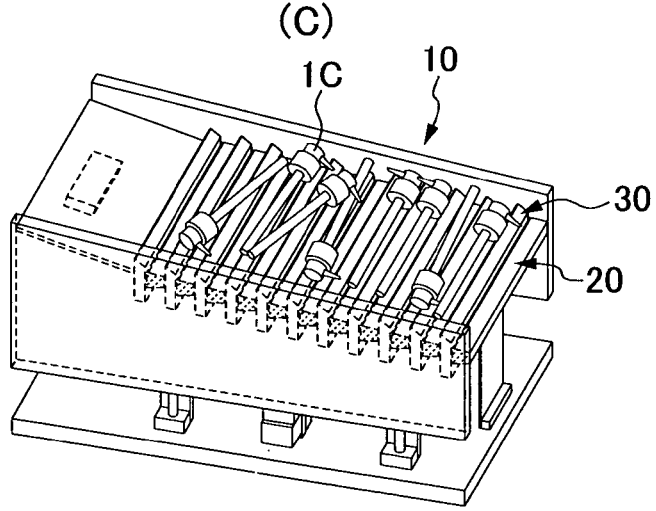

FIG.14
(A)
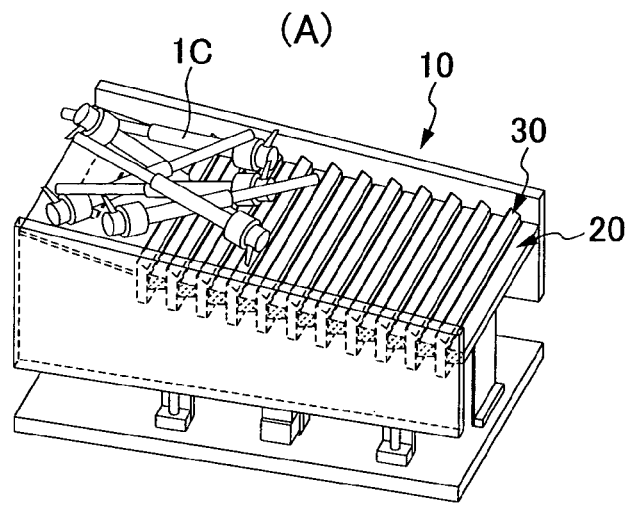
(B)
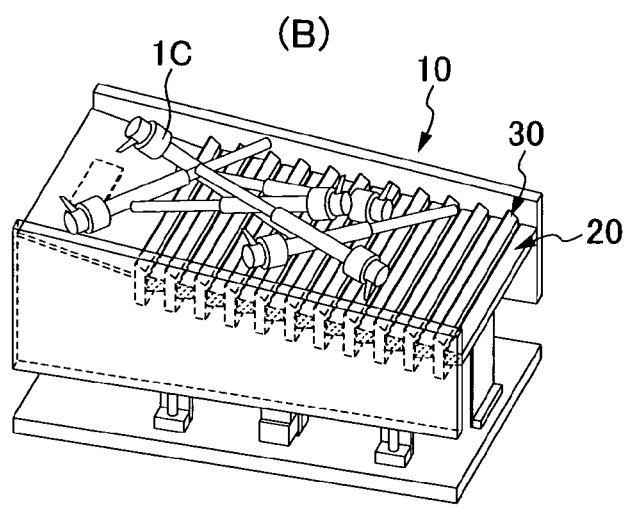
(C)
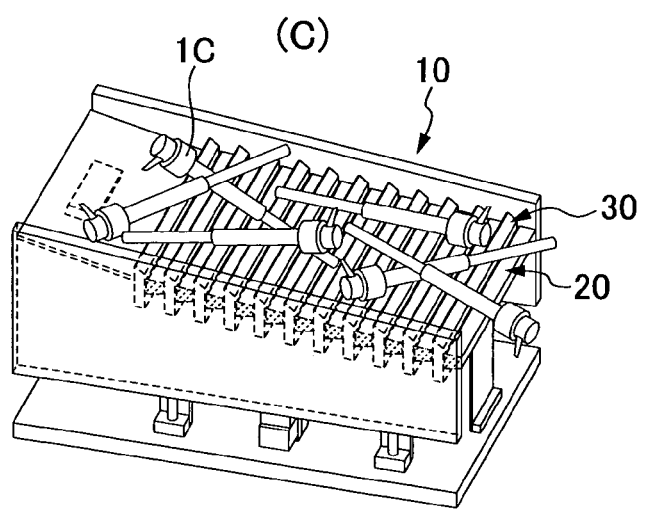

FIG.16
(A)
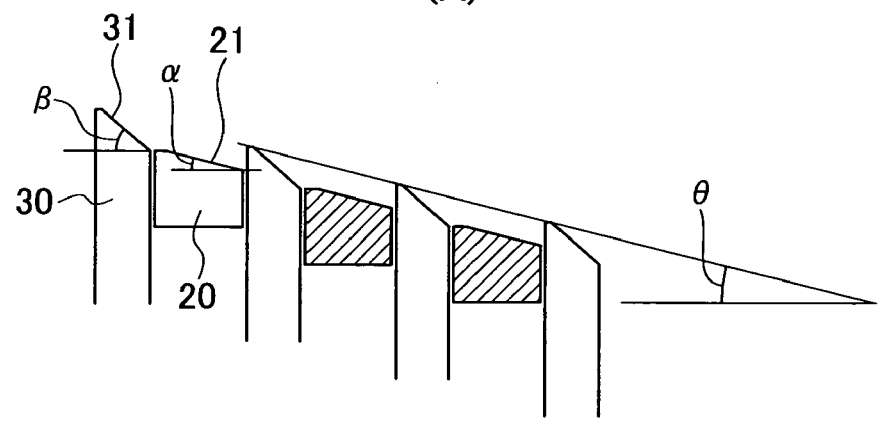
(B)
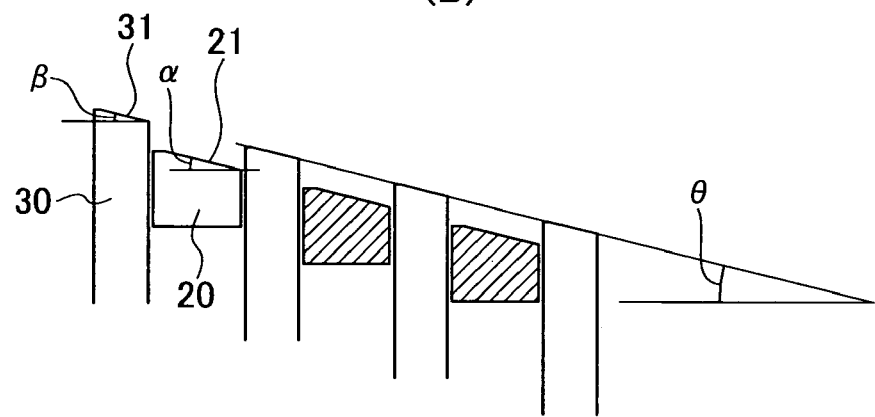
(C)
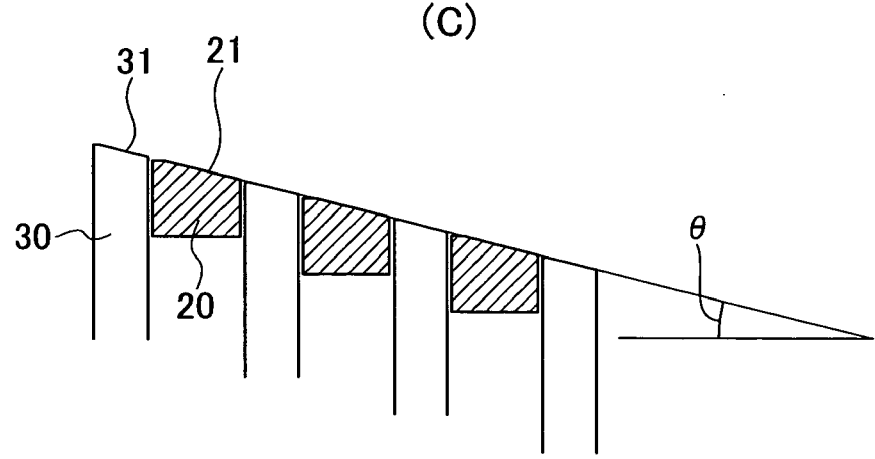

FIG.17
(A)
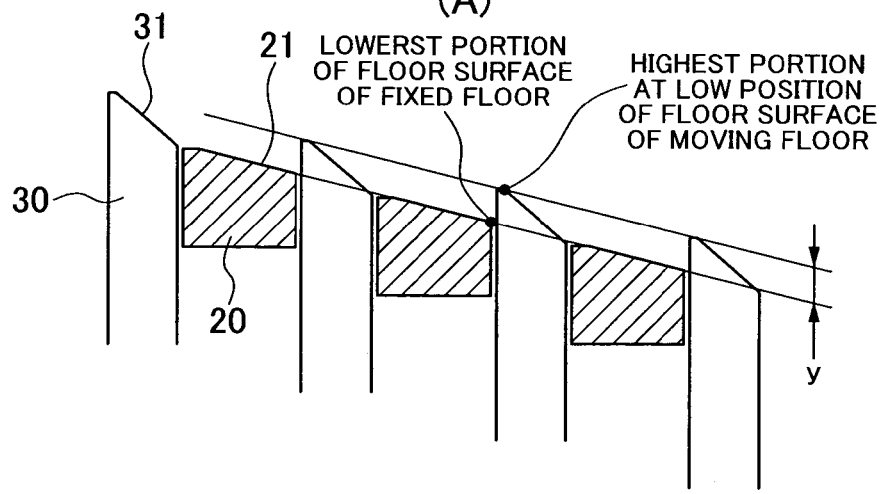
(B)
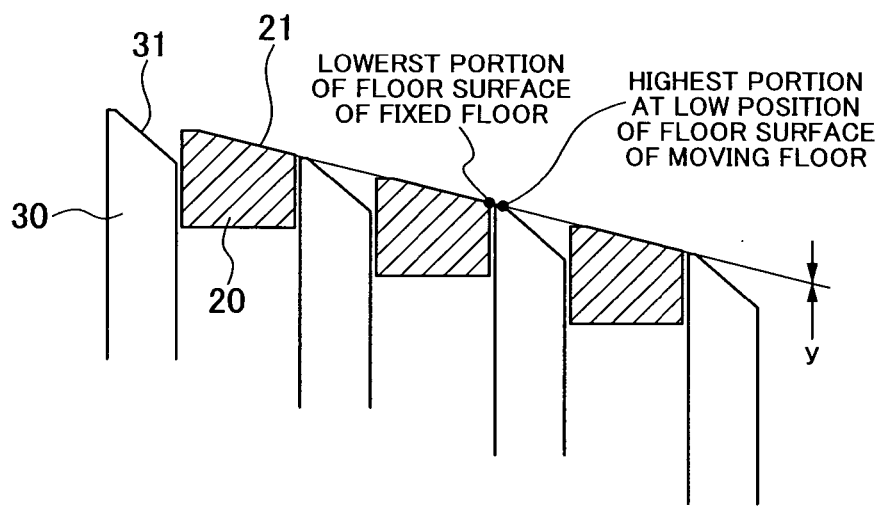
(C)
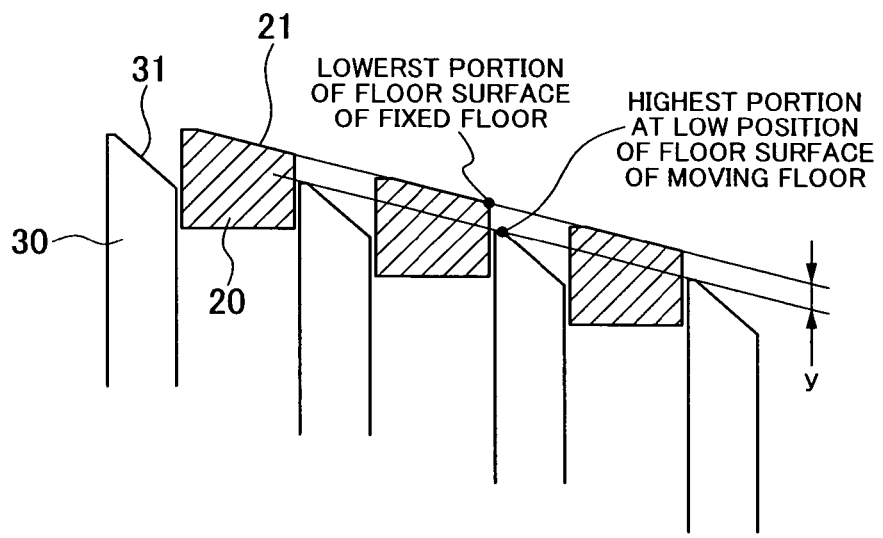

FIG.21
(A)
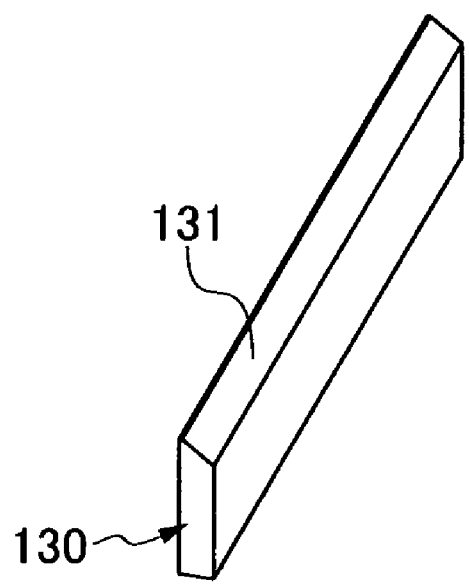
(B)
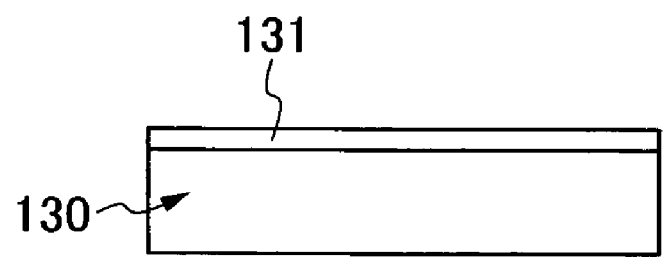

FIG.22
(A)
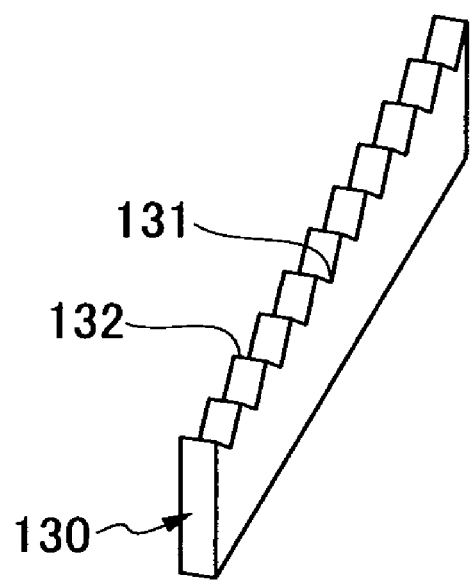
(B)
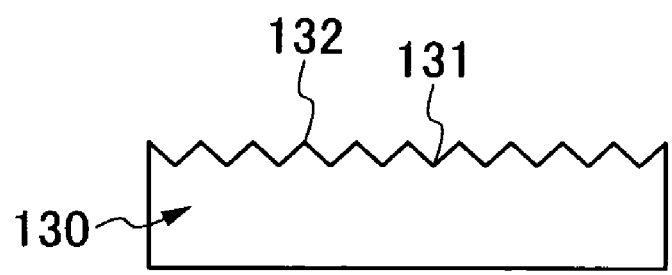

FIG.23
(A)
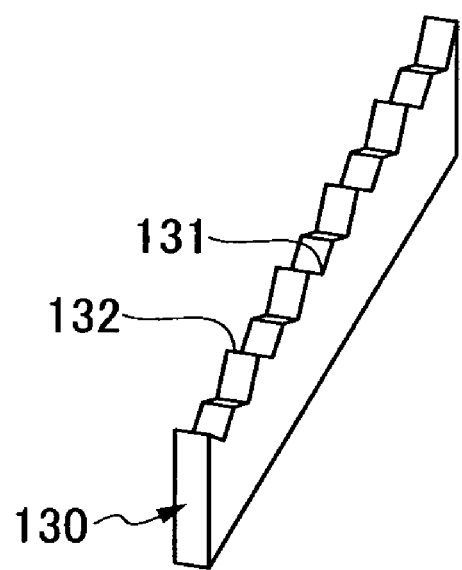
(B)
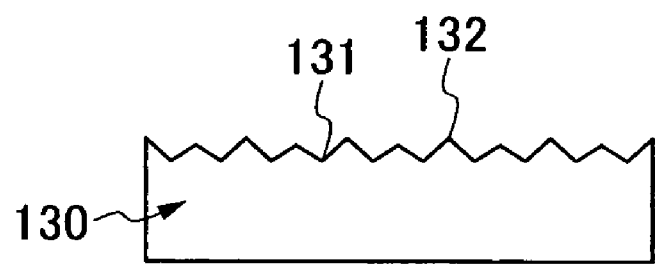

FIG.28
(A)
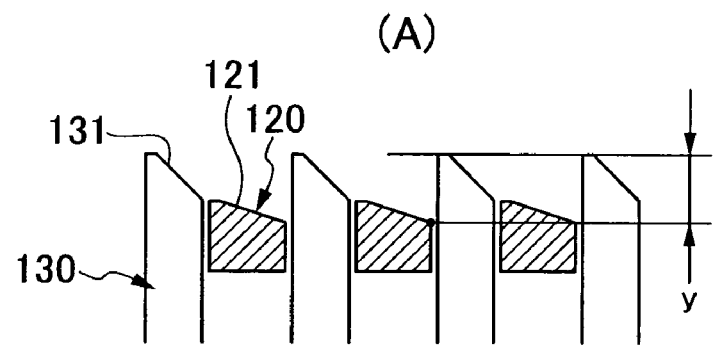
(B)
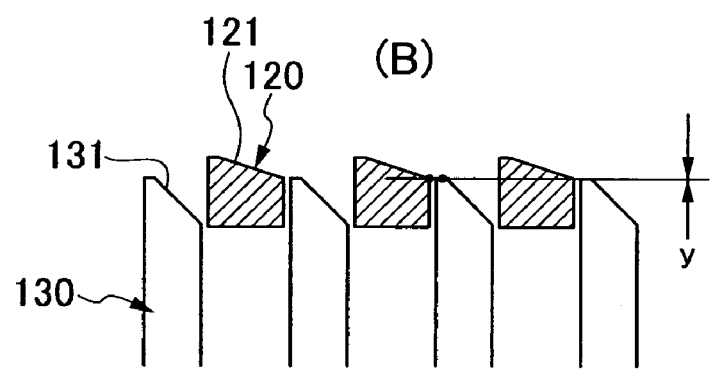
(C)
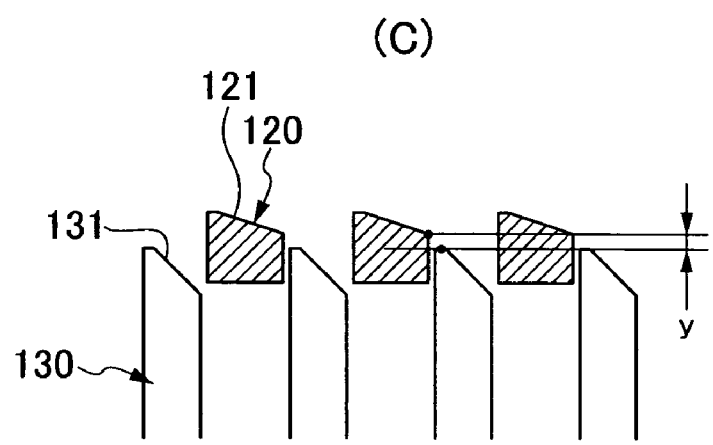

FIG.30
CIRCULAR CAP
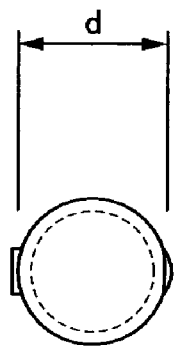
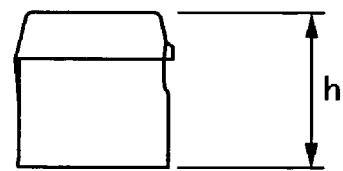
FIG.31
ELLIPTICAL CAP
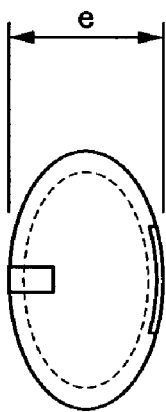
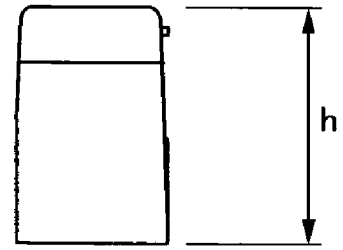

WHEN PASSING MOVING FLOOR NOT
INCLUDING CONCAVE-CONVEX PART (A)

(B)

WHEN PASSING MOVING FLOOR
CONCAVE-CONVEX PART (A) ROTATED AND ALIGNED IN W DERECTION (B) ROTATED AND ALIGNED IN W DERECTION

FIG.34
(A)
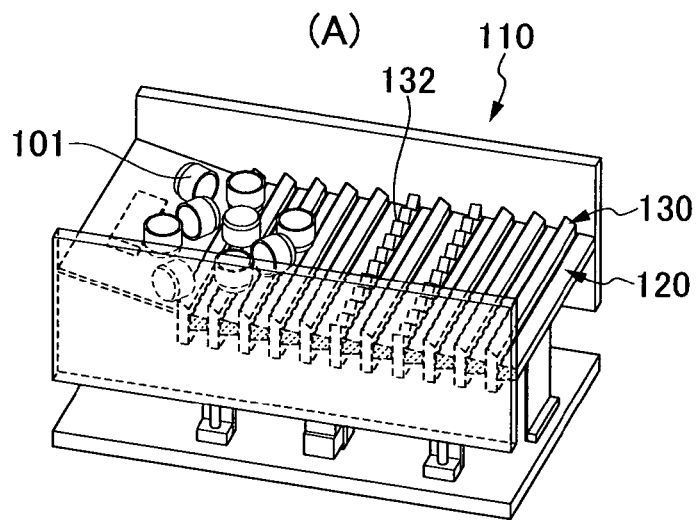
(B)
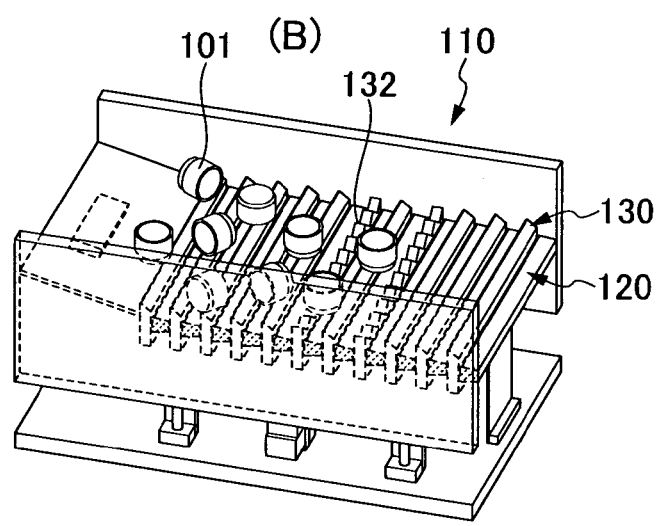
(C)
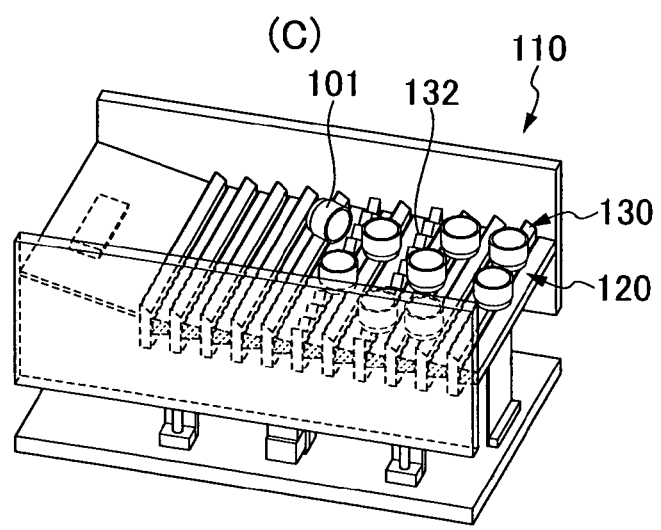

FIG.41
(A)
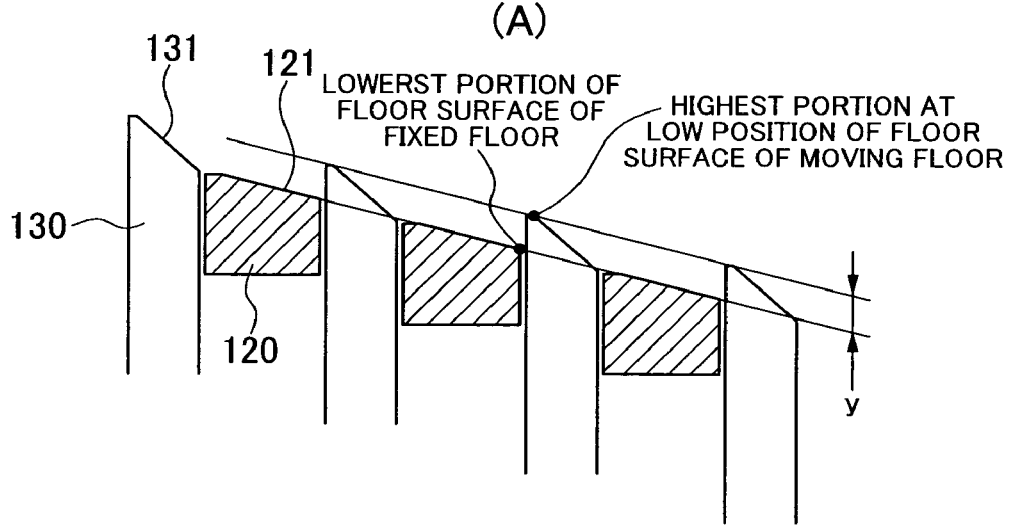
(B)
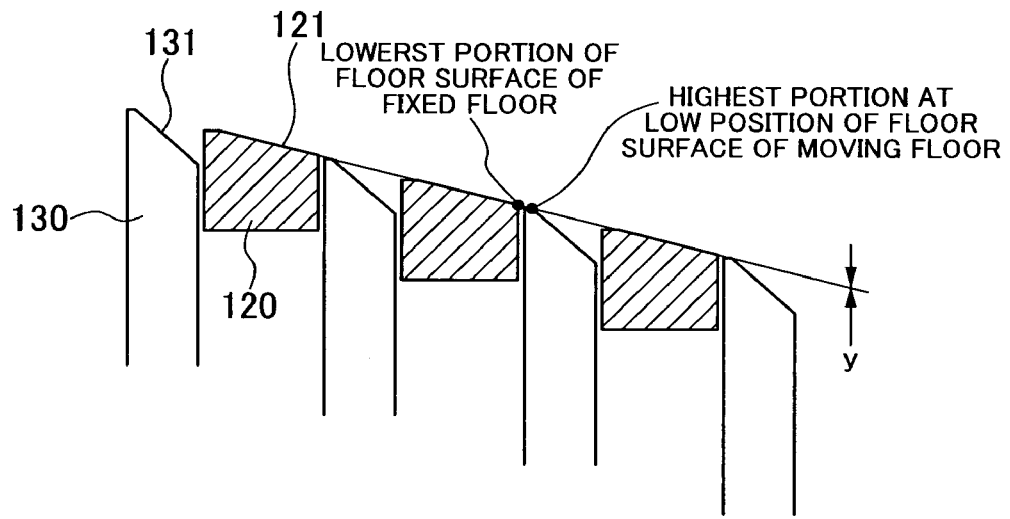
(C)
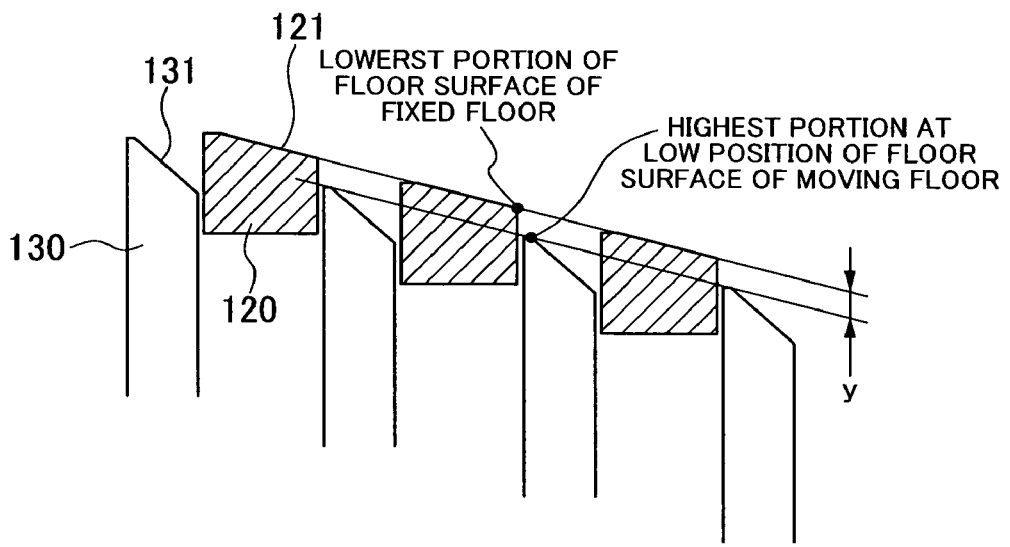

FIG.42
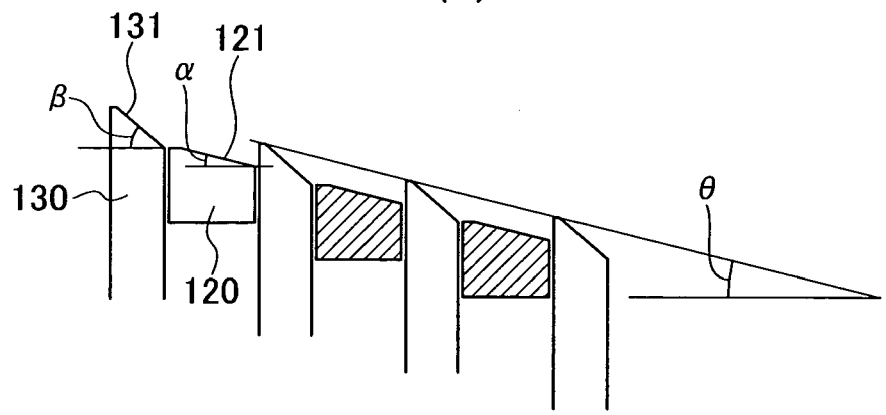
(A)
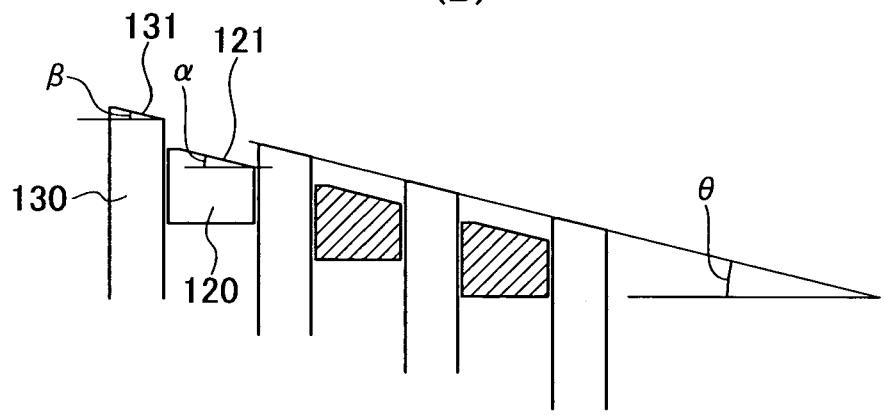
(B)
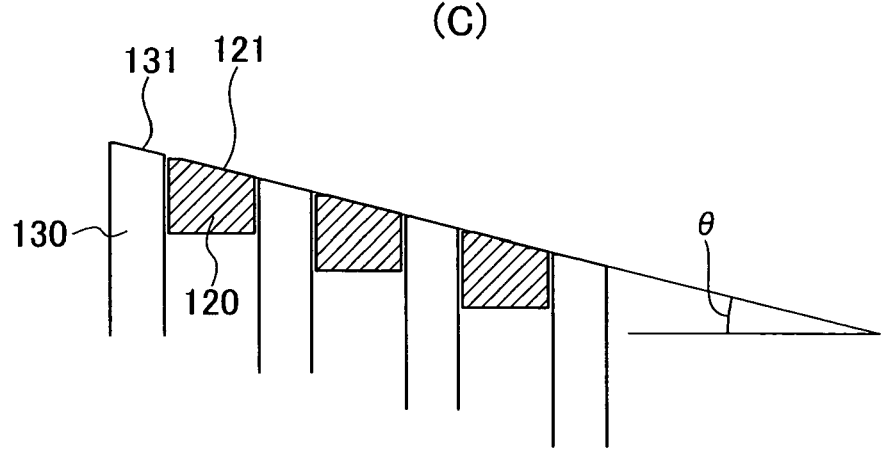
(C)

FIG.47
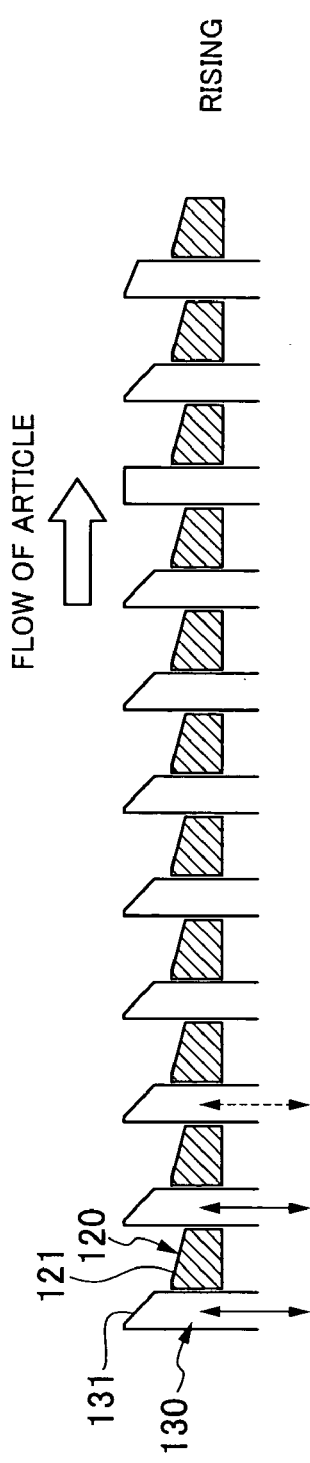
(A) RISING
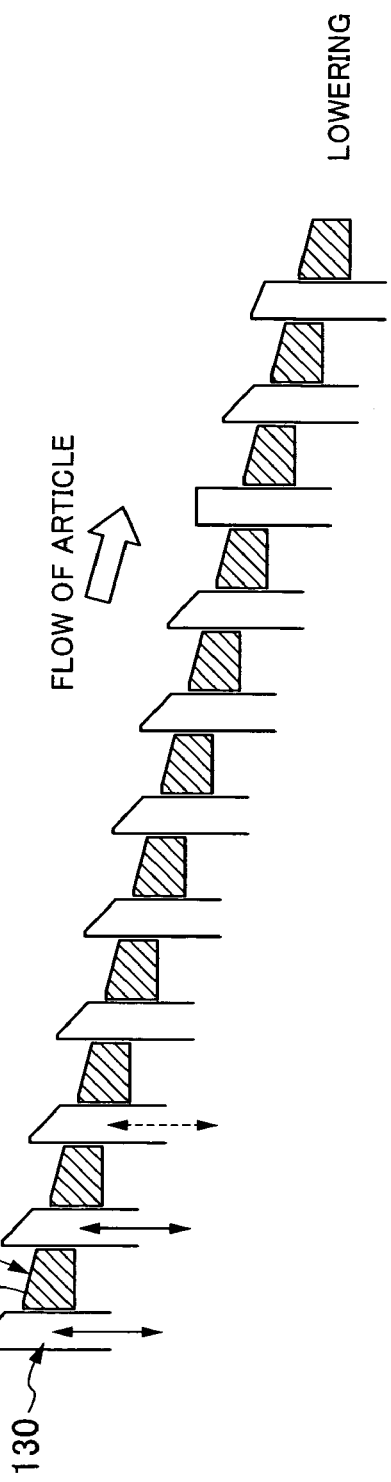
(B) LOWERING

ARTICLE CONVEYING DEVICE

BACKGROUND OF THE INVENTION

1. Field of the Invention

The present invention relates to an article conveying device.

2. Description of the Related Art

A device for supplying a large number of rod shaped materials (11) to the next step while separating the materials one by one in the middle of conveyance, the device including a fixed floor (41) formed in a step form in which an upstream side surface in the conveying direction of the rod shaped material (11) displaces to the downstream side in the conveying direction towards the upper side, a moving floor (42) adjacently positioned in parallel to the fixed floor (41) and formed in a step form in which the upstream side surface in the conveying direction of the rod shaped material (11) displaces to the downstream side in the conveying direction towards the upper side, and a reciprocate driving means (47), arranged on the lower side of the moving floor (42), for reciprocating a step part (45) of the moving floor (42) to the upper side and the lower side of a step part (43) of the fixed floor (41) is known as an article conveying device, as described in Japanese Utility Model Application Laid-Open No. 7-23731. In the article conveying device, when the step part (45) of the moving floor side moves to a level above the step part (43) of the fixed floor side by the drive of the reciprocate driving means (47), the step part (45) of the moving floor side captures one rod shaped material (11) from the group of rod shaped materials placed on the step part (43) of the fixed floor side, and sequentially moves the relevant rod shaped material to the step part (43) of the upper stage on the fixed floor side.

In the article conveying device of Japanese Utility Model Application Laid-Open No. 7-23731, the fixed floor and the moving floor are adjacently positioned in parallel, where the rod shaped material serving as an article to be conveyed is captured by the pair of moving floor side step parts arranged lined in a direction orthogonal to the conveying direction, and the rod shaped material is moved to a pair of similarly arranged fixed floor side step parts. Therefore, the article must be a long length article having a length exceeding the interval of the pair of moving floors, and the length exceeding the interval of the pair of fixed floors. The disposing orientation of the article must be orthogonal to the conveying direction so as to be received by the pair of fixed floor step parts. In the prior art, the article of various dimensional shapes cannot be discharged by substantially constant amount if placed in any direction. Furthermore, since the direction of the long length article cannot be changed, the articles of various dimensional shapes cannot be directed to the orientation in a constant direction if placed in any direction.

SUMMARY OF THE INVENTION

An object of the present invention is to discharge the article of various dimensional shapes by substantially constant amount even if placed in any direction.

Another object of the present invention is to enhance the dispersed conveying property of discharging the article of various dimensional shapes by substantially constant amount and to provide directing property for having the article in the orientation of a constant direction even if placed in any direction.

The present invention relates to an article conveying device, wherein a floor surface of each of a plurality of fixed floors is arranged so as to from a descending slope towards a downstream side in a conveying direction with respect to each other; each of a plurality of moving floors is adjacently arranged on a side in the conveying direction with respect to each fixed floor, a raising/lowering operation of simultaneously positioning the respective floor surface of each moving floor at a high position or a low position with respect to the floor surface of the adjacent fixed floor being repeatedly performed and the floor surface of each moving floor positioned at the high position being arranged so as to form a descending slope towards the downstream side in the conveying direction with respect to each other; and the floor surface of each fixed floor is inclined so as to form a descending slope towards the downstream side in the conveying direction and the floor surface of each moving floor is also inclined so as to form a descending slope towards the downstream side in the conveying direction.

Furthermore, the present invention relates to an article conveying device in which each of a plurality of fixed floors is arranged lined along a conveying direction, each of a plurality of moving floors is adjacently arranged on the side in the conveying direction with respect to each fixed floor, and a raising/lowering operation of simultaneously positioning the respective floor surface of each moving floor at a high position and a low position with respect to the floor surface of the adjacent fixed floor is repeated to send an article towards the downstream; wherein a concave-convex part forming a concave-convex pattern along a direction orthogonal to the conveying direction is arranged on at least some floor surfaces of the fixed floors or the moving floors.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 10(A) to 10(C) are frame format views showing a conveying state of a circular cap;

FIGS. 11(A) to 11(C) are frame format views showing a conveying state of a large circular cap;

FIGS. 12(A) and 12(B) are frame format views showing a conveying property of a cap with tube;

FIGS. 13(A) to 13(C) are frame format views showing a conveying state of a cap with tube;

FIGS. 14(A) to 14(C) are frame format views showing a conveying state of a cap with large tube;

FIGS. 16(A) to 16(C) are frame format views showing a relationship between angle and arrangement of the fixed floor and the moving floor;

FIGS. 17(A) to 17(C) are frame format views showing a depressed state of the moving floor with respect to the fixed floor;

FIGS. 21(A) and 21(B) are frame format views showing the moving floor;

FIGS. 22(A) and 22(B) are frame format views showing the moving floor;

FIGS. 23(A) and 23(B) are frame format views showing the moving floor;

FIGS. 28(A) to 28(C) are frame format views showing a depressed state with respect to the fixed floor of the moving floor;

FIG. 30 is a frame format view showing a circular cap;

FIG. 31 is a frame format view showing an elliptical cap;

FIGS. 34(A) to 34(C) are frame format views showing a conveying state of the cap;

FIGS. 41(A) to 41(C) are frame format views showing a depressed state with respect to the fixed floor of the moving floor;

FIGS. 42(A) to 42(C) are frame format views showing a relationship of the angle and the arrangement of the fixed floor and the moving floor;

FIGS. 47(A) and 47(B) are frame format views showing a variant of the article conveying device;

DESCRIPTION OF THE PREFERRED EMBODIMENTS

Embodiment 1

FIGS. 1 to 17

Figure 1:
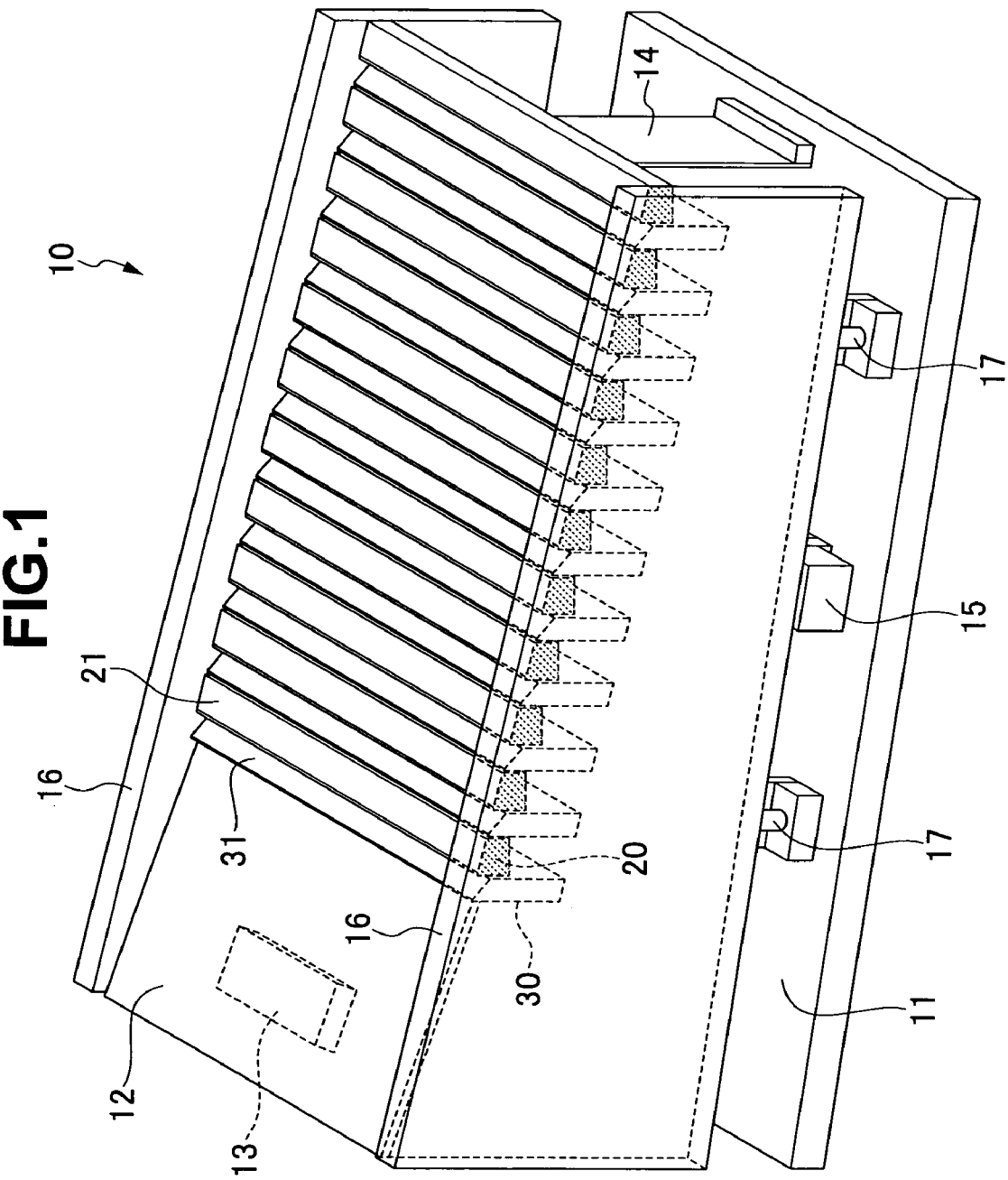
FIG. 1 is a perspective view showing state in which a moving floor of an article conveying device is depressed.
Figure 2:
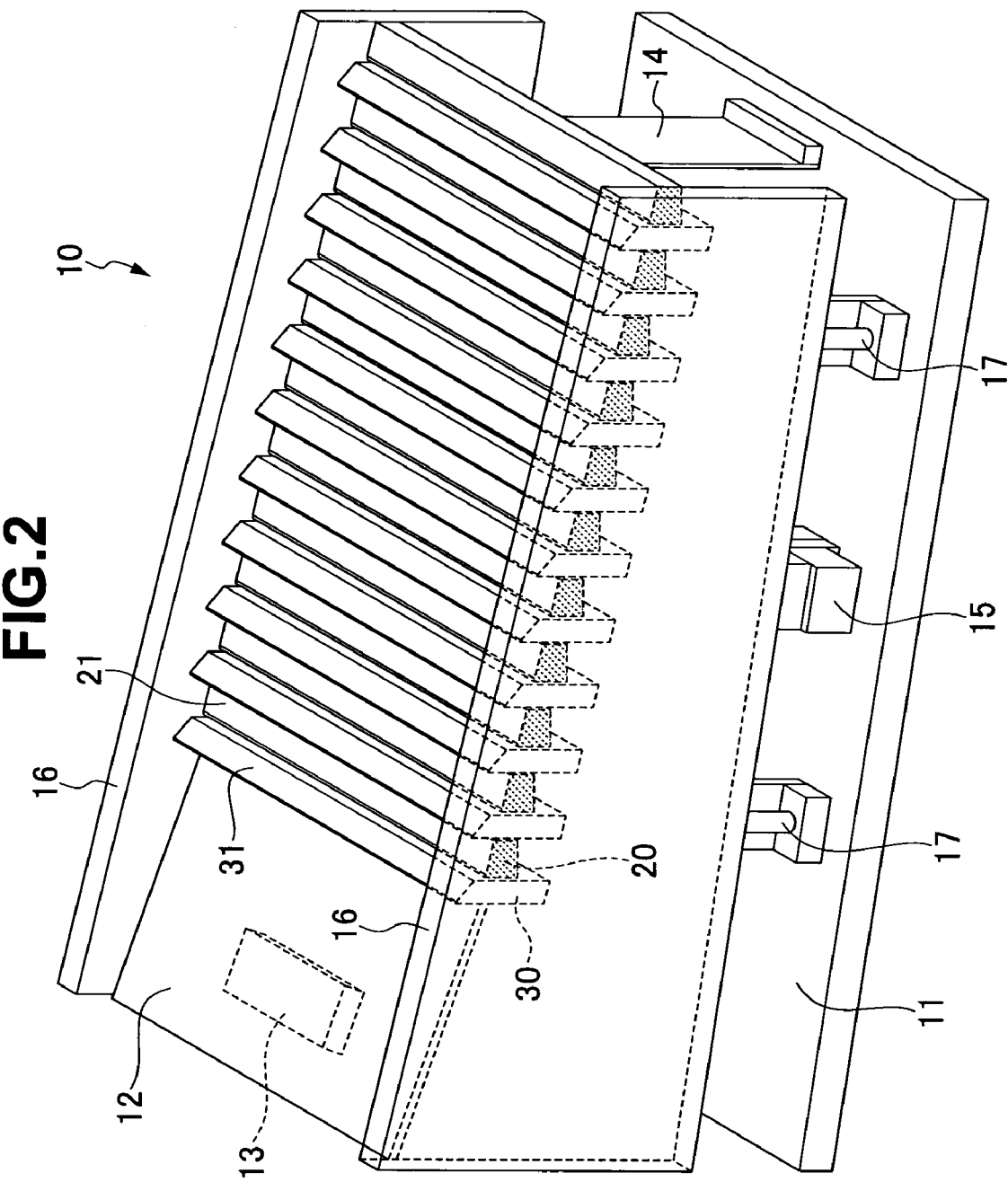
FIG. 2 is a perspective view showing state in which the moving floor of the article conveying device is projected.
Figure 3:
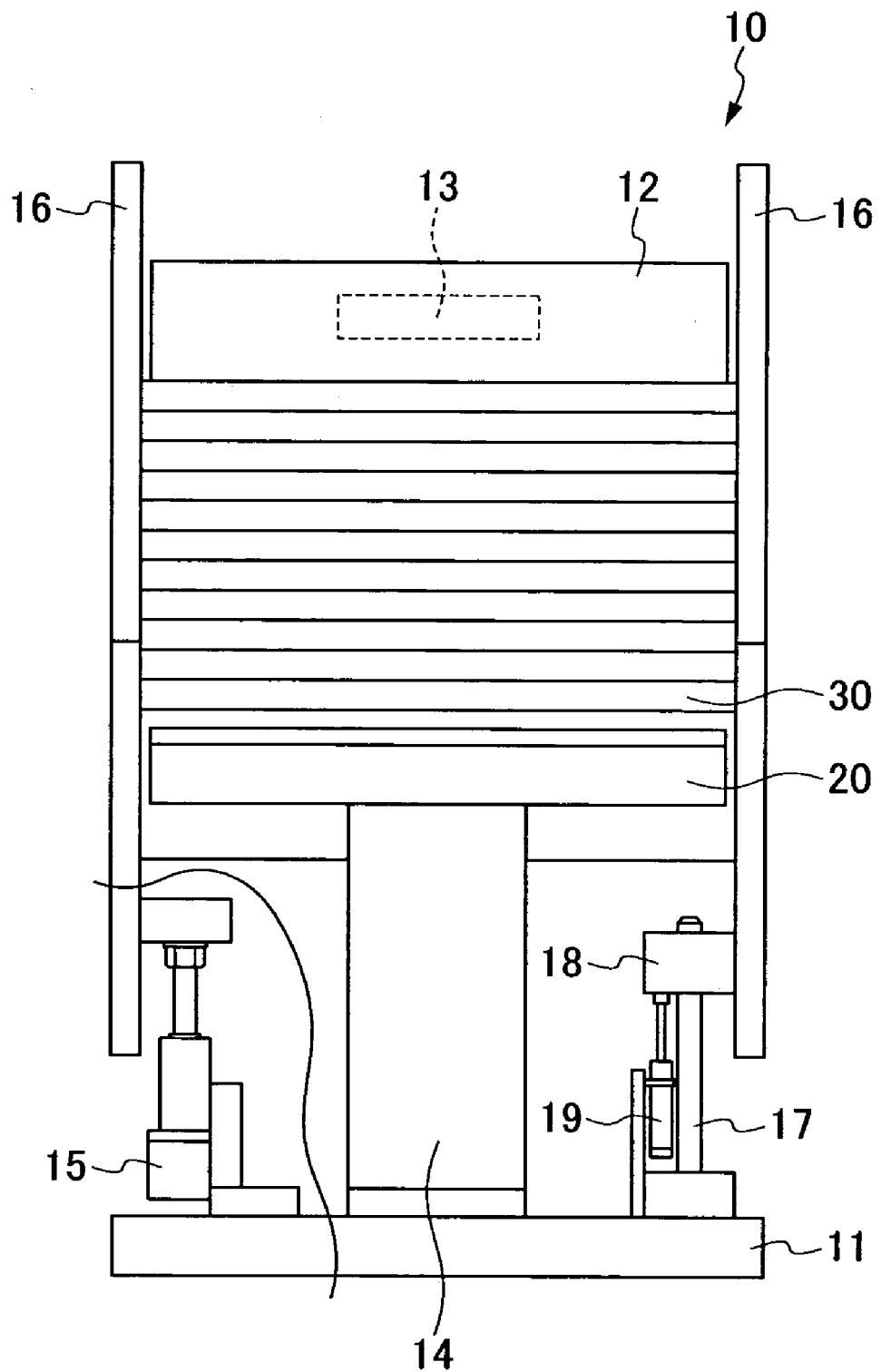
FIG. 3 is a front view showing the article conveying device.
Figure 4:
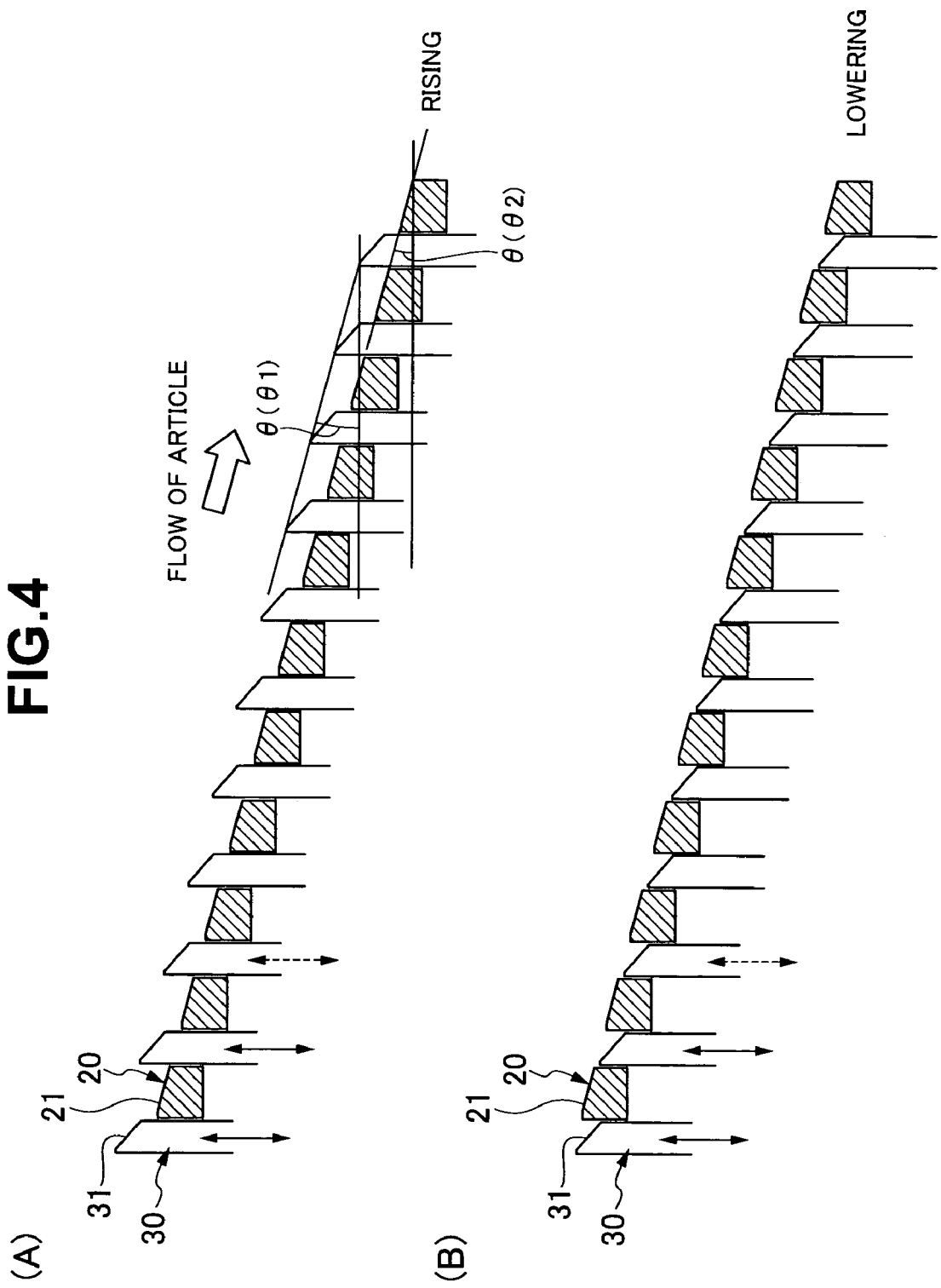
FIGS. 4(A) and 4(B) are frame format views showing a raising/lowering operation of the moving floor.
Figure 5:
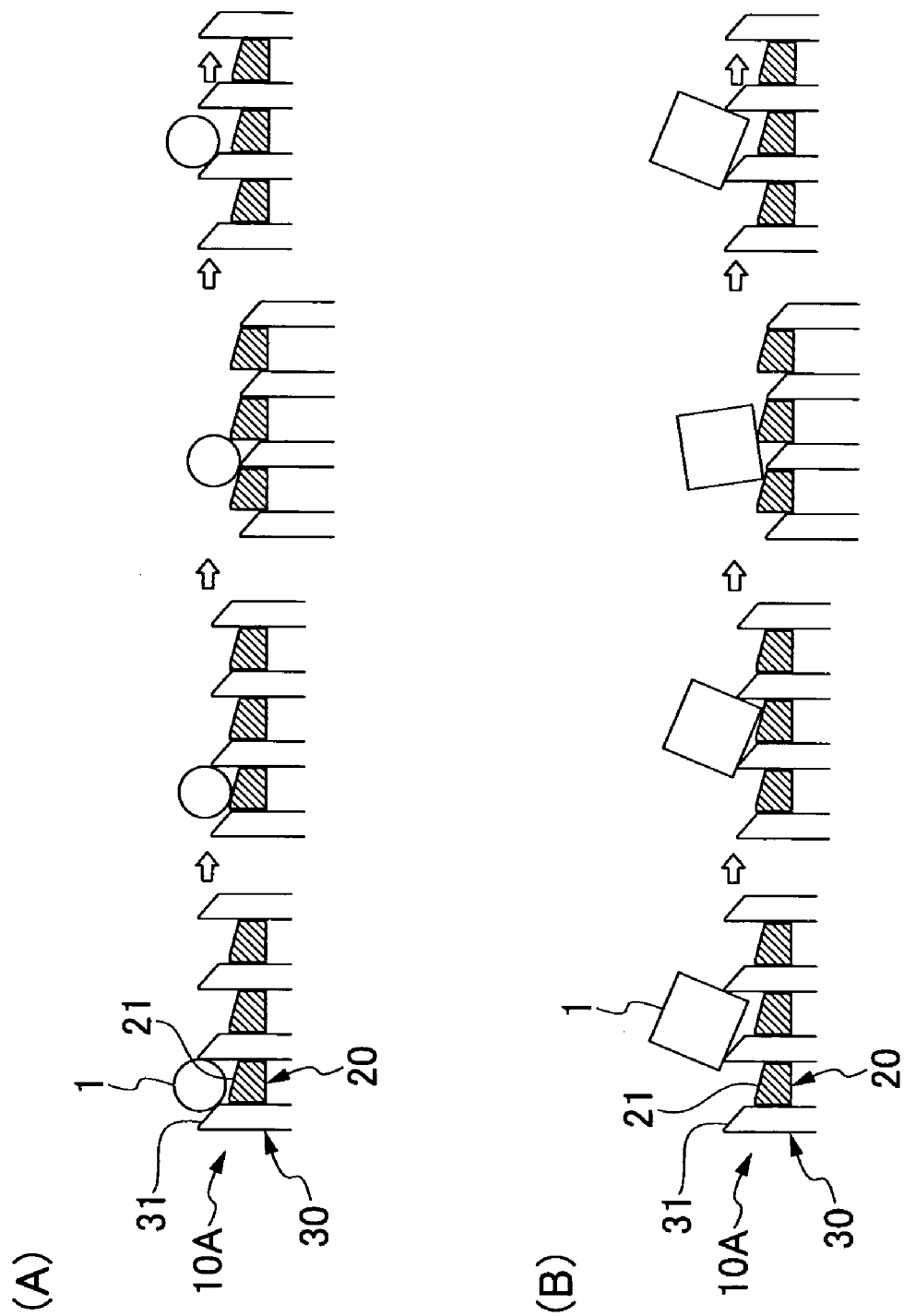
FIGS. 5(A) and 5(B) are frame format views showing an article conveying state in a reference example.
Figure 6:
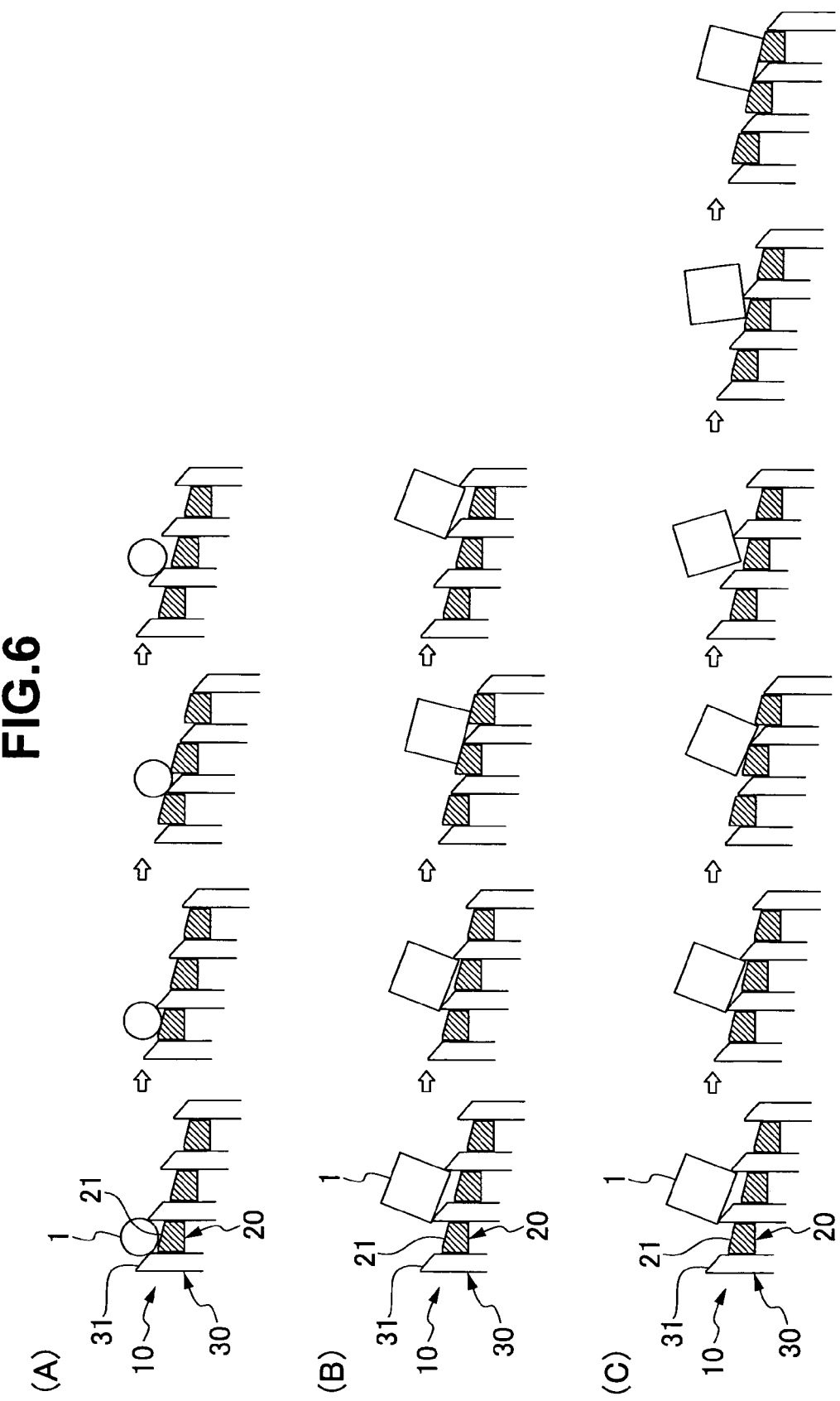
FIGS. 6(A) to 6(C) are frame format views showing an article conveying state in an example of the present invention.

As shown in FIGS. 1 to 3, an article conveying device 10 has a direction from one end side to the other end side of a mount 11 as an article conveying direction, where an inlet shoot 12 is arranged at the one end side, and a vibrator 13 is arranged on the back surface of the inlet shoot 12 for enhancing the conveying force.

The article conveying device 10 has a plurality of fixed floors 20 supported by a supporting member 14 arranged on the mount 11. The article conveying device 10 is arranged so that each floor surface 21 of the plurality of fixed floors 20 form a descending slope (angle θ with respect to horizontal plane: e.g., 5 to 35 degrees) (FIGS. 4A and 4B) towards the downstream side in the conveying direction with respect to each other. The floor surface 21 of each fixing floor 20 is an inclined plane inclined so as to form a descending slope towards the downstream side in the conveying direction. A vibrator may be arranged in the fixing floor 20 to enhance the conveying force.

The article conveying device 10 has left and right side guide plates 16 connected to a raising/lowering drive device 15 supported by the mount 11 and a slide part 18 fixed to the side guide plate 16 is fitted in a freely sliding manner to a slide shaft 17 supported by the mount 11. An impact alleviating damper 19 is interposed between the mount 11 and the slide part 18. The left and right side guide plates 16 are arranged on both sides in the width direction of the fixed floor 20 and the inlet shoot 12, and have a plurality of moving floors 30 held in between. Each of the plurality of moving floors 30 is adjacently arranged on the side in the conveying direction (on the side on the upstream side in the present embodiment) with respect to each fixed floor 20. The fixed floor 20 and the moving floor 30 are alternately arranged along the conveying direction at a constant interval. The article conveying device 10 repeats the raising and lowering operation of the side guide plate 16 and the moving floor 30 by means of the raising/lowering drive device 15 (the moving floor 30 may be directly connected to the raising/lowering drive device 15, and the side guide plate 16 does not necessarily need to be raised/lowered). That is, each moving floor 30 repeats the raising/lowering operation of simultaneously positioning each floor surface 31 at the high position (FIG. 4(A)) and the low position (FIG. 4(B)) with respect to the floor surface 21 of the adjacent fixed floor 20.

The floor surface 31 of each moving floor 30 projects above the floor surface 21 of the fixed floor 20 at high position, and depresses below the floor surface 21 of the fixed floor 20 at low position. "Depress" in the present invention refers to when the moving floor 30 is positioned on the lower side of the fixed floor 20, and specifically it includes obviously the case of completely depressed in which the entire moving floor 30 is completely positioned at the lower side of the floor surface 21 of the fixed floor 20 and a case in which the floor surface 31 of the moving floor 30 stops at substantially the same position as the floor surface 21 of the fixed floor 20 in the low position state as well. "Stops at substantially the same position" means being positioned such that the difference y in height of the line connecting the highest portions at the low position state of the floor surface 31 of each moving floor 30 with respect to the line connecting the lowest portions of the floor surface 21 of the plurality of fixed floors 20 is 0 to +5 mm, as shown in FIG. 17(A), or y is between 2 to 10% of the minimum dimension a of the article shown in FIG. 7. FIG. 17(B) shows a state in which y=approx. 0 mm, and the floor surface 31 of the moving floor 30 is at substantially the same position as the floor surface 21 of the fixed floor 20 in the low position state. FIG. 17C shows a state in which the y is a negative value, and the floor surface 31 of the moving floor 30 is completely depressed below the floor surface 21 of the fixed floor 20 in the low position state.

The floor surface 31 of each moving floor 30 positioned at high position is arranged so as to form a descending slope (angle θ with respect to horizontal plane: e.g., 5 to 35 degrees) towards the downstream side in the conveying direction with respect to each other. The floor surface 31 of each moving floor 30 is an inclined plane inclined so as to form a descending slope towards the downstream side in the conveying direction (FIGS. 4(A) and 4(B)).

The angle θ (θ1) for the moving floor arrangement is preferably matched to substantially the same as the angle θ (θ2) for the fixed floor arrangement since the article behavior in time of article conveyance stabilizes. The value of θ is appropriately adjusted by the friction state between the article and the fixed plate 20 or the moving floor 30. As one example, the angle θ of when conveying the article such as resin cap made of polypropylene, polyethylene, polystyrene, ABS etc., and metal cap made of aluminum etc. with (a) metal fixed floor 20 or moving floor 30 made of stainless steel or aluminum having the surface finished through general machining, (b) fixed floor 20 or moving floor 30 made of resin such as polyacetal or polyvinyl chloride having the surface finished through general machining, and (c) fixed floor 20 or moving floor 30 having a tape material of satisfactory slipping property attached to the surfaces is preferably between 8 to 25 degrees, and more preferably between 12 to 20 degrees. The movement behavior at the upstream and the downstream can be changed by differentiating the angle θ1 for the moving floor arrangement and the angle θ2 for the fixed floor arrangement.

The relationship of the angle θ of the moving floor arrangement and the fixed floor arrangement with respect to the horizontal plane, the angle α of the floor surface 21 of the fixed floor 20 with respect to the horizontal plane, and the angle β of the floor surface 31 of the moving floor 30 with respect to the horizontal plane is shown in FIGS. 16A to 16C.

As a first mode, the general relationship of each angle is shown in FIG. 16(A). The angle α of the floor surface 21 of the fixed floor 20 with respect to the horizontal plane is set substantially the same as or slightly larger, or about −5 to +15 degrees with respect to the angle θ1 for the moving floor arrangement. This is for slowly and stably conveying the article to the floor surface 31 of the moving floor 30 on the downstream at the floor surface 21 of the fixed floor 20. Even at the angle with which the article does not slide on its own, the article is conveyed by being pushed by another article from the upstream. The angle β of the floor surface 31 of the moving floor 30 with respect to the horizontal plane is set large, or about +5 to +25 degrees with respect to the angle α of the floor surface 21 of the fixed floor 20 with respect to the horizontal plane. This is for reliably conveying the article to the floor surface 21 of the fixed floor 20 on the downstream while the floor surface 31 of the moving floor 30 is projected out.

In the second mode, the relationship of each angle required for particularly smoothly conveying the article is shown in FIG. 16(B). The angle α of the floor surface 21 of the fixed floor 20 with respect to the horizontal plane is set to be substantially the same as the angle θ1 for the moving floor arrangement. The angle β of the floor surface 31 of the moving floor 30 with respect to the horizontal plane is also set substantially the same as the angle θ1 for the moving floor arrangement. This is for smoothly and reliably conveying the article to the floor surface 21 of the fixed floor 20 on the downstream without bumpiness when the floor surface 31 of the moving floor 30 is depressed. Therefore, the depressed position of the moving floor 30 is preferably a position where the floor surface 31 of the moving floor 30 is not depressed with respect to the floor surface 21 of the fixed floor 20 and the floor surface 21 of the fixed floor 20 and the floor surface 31 of the moving floor 30 form a substantially linear relationship as shown in FIG. 16(C), or a position (not shown) where the floor surface 31 of the moving floor 30 is depressed very slightly, or about 0.5 to 3 mm The raising/lowering drive device 15 can use an electrically operated cylinder capable of changing and controlling the raising/lowering speed or the raising/lowering stroke. The raising/lowering drive device 15 may be a mechanism for converting the rotation of the electrically operated motor to a linear movement, a pneumatic cylinder, or the like.

The article conveying state by the article conveying device 10 will be shown in comparison with the article conveying state by the article conveying device 10A serving as a reference example (FIGS. 5(A) and 5(B) and 6(A) to 6(C)).

In the article conveying device 10A of FIGS. 5(A) and 5(B), the floor surfaces 21 of the plurality of fixed floors 20 are arranged horizontally with respect to each other, and the floor surfaces 31 of the plurality of moving floors 30 are raised/lowered while maintaining a horizontal state with respect to each other, where an article 1 (FIG. 5(A)) having a dimension smaller than a pitch p of the adjacent moving floors 30 is conveyed while sliding along an inclined plane of the floor surfaces 21, 31 of the fixed floor 20 and the moving floor 30 by repeating the raising/lowering operation of each moving floor 30, but the article of a large dimension (FIG. 5(B)) is merely repeatedly pushed upward at one location and cannot be conveyed even if the raising/lowering operation of each moving floor 30 is repeated.

In the article conveying device 10 of FIGS. 6(A) to 6(C), the floor surfaces 21 of the plurality of fixed floors 20 are arranged so as to form a descending slope with respect to each other, and the floor surfaces 31 of the plurality of moving floors 30 are also arranged so as to form a descending slope with respect to each other, where the article 1 (FIG. 6(A)) having a dimension smaller than the pitch p of the adjacent moving floors 30 as well as the article 1 of a larger dimension (FIG. 6(B)) can be conveyed by repeating the raising/lowering operation of each moving floor 30. In other words, the inclination of the floor surface 31 of the moving floor 30 applies a conveying force towards the downstream side on the article 1 when the floor surface 31 of the moving floor 30 pushes up the article 1 on the floor surface 21 of the fixed floor 20 by raising the moving floor 30. The article 1 receiving the conveying force is then moved onto the floor surface 21 of the fixed floor 20 forming a descending slope along the conveying direction on the downstream side by lowering the moving floor 30, slides along the slope of the floor surface 21 of the fixed floor 20, and furthermore, the inclination of the floor surfaces 21 of the plurality of fixed floors 20 forming a descending slope along the conveying direction with respect to each other, and conveyed to the downstream side. In the process of sliding along the slope of the floor surface 21 of the fixed floor 20, the article is pushed up from the fixed floor 20 by the next raising of the moving floor 30 even if caught at the fixed floor 20 on the downstream side, and conveyed to the downstream side, as shown in FIG. 6(C).

Therefore, in the article conveying device 10, the fixed floor 20 and the moving floor 30 are alternately arranged adjacent to each other along the conveying direction, and the respective floor surfaces 21, 31 are arranged so as to form a descending slope with each other towards the downstream side in the conveying direction, and thus regardless of the dimensional shape or the placement orientation of the article 1, various articles 1 can be placed on the floor surface 21 of the fixed floor 20, pushed up by the floor surface 31 of the moving floor 30, and discharged by a substantially constant amount by performing the conveying operation of (a) described above.

The article conveying device 10 can control the time proportion in which the floor surface 31 of the moving floor 30 is projected above the floor surface 21 of the adjacent fixed floor 20 to be smaller than the time proportion in which the floor surface 31 of the moving floor 30 is depressed below the floor surface 21 of the fixed floor 20 in one cycle (one cycle of most lowered position to most raised position to most lowered position) of the raising/lowering operation of the moving floor 30. Thus, the time of sliding the article 1 along the floor surface 21 of the fixed floor 20 becomes longer than the time of pushing the article 1 above the floor surface 31 of the moving floor 30, whereby the discharging amount of the article 1 can be increased.

If the rising acceleration of the moving floor 30 is large, the push-up force on the article 1 by the floor surface 31 of the moving floor 30 is large, and thus the conveying force applied on the article 1 by the inclination of the floor surface 31 of the moving floor 30 becomes large, whereby the discharging amount of the article 1 can be increased.

Furthermore, the article conveying device 10 can control the time proportion in which the floor surface 31 of the moving floor 30 is projected above the floor surface 21 of the adjacent fixed floor 20 to be larger than the time proportion in which the floor surface 31 of the moving floor 30 is depressed below the floor surface 21 of the fixed floor 20 in one cycle of the raising/lowering operation of the moving floor 30. Thus, the time of sliding the article 1 along the floor surface 21 of the fixed floor 20 becomes shorter than the time of pushing the article 1 above the floor surface 31 of the moving floor 30, whereby the discharging amount of the article 1 can be reduced.

If the rising acceleration of the moving floor 30 is small, the push-up force on the article 1 by the floor surface 31 of the moving floor 30 is small, and thus the conveying force applied on the article 1 by the inclination of the floor surface 31 of the moving floor 30 becomes small, whereby the discharging amount of the article 1 can be reduced.

The maximum value of speed in time of raise of the moving floor 30 is appropriately adjusted so that the article can be stably conveyed at the desired speed depending on the weight of the conveying article, the angle of the fixed floor arrangement, angle θ for the moving floor arrangement, and the like. By way of example, the speed in time of raise of the moving floor 30 when conveying a cap serving as the article 1 having a weight of about 4 to 10 g at θ=15 degrees is preferably 50 to 300 mm/sec. The speed is more preferably 100 to 200 mm/sec.

If smaller than such suitable value, it becomes difficult to apply sufficient conveying force to the article 1, and if larger than the suitable value, the conveying speed of the article 1 becomes too large, and stable conveyance cannot be realized.

Figure 7:
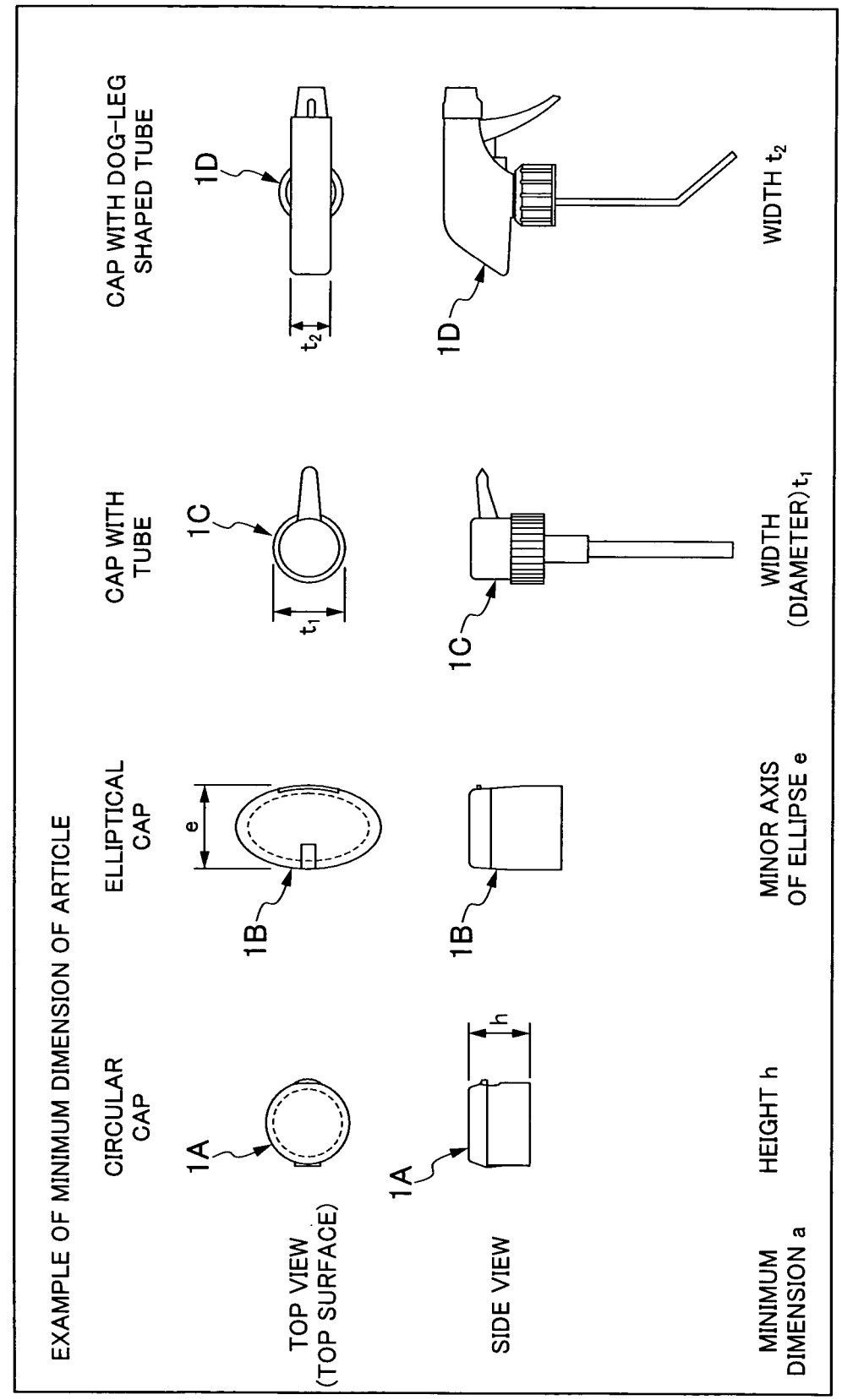
FIG. 7 is a frame format view showing various articles.
Figure 8:
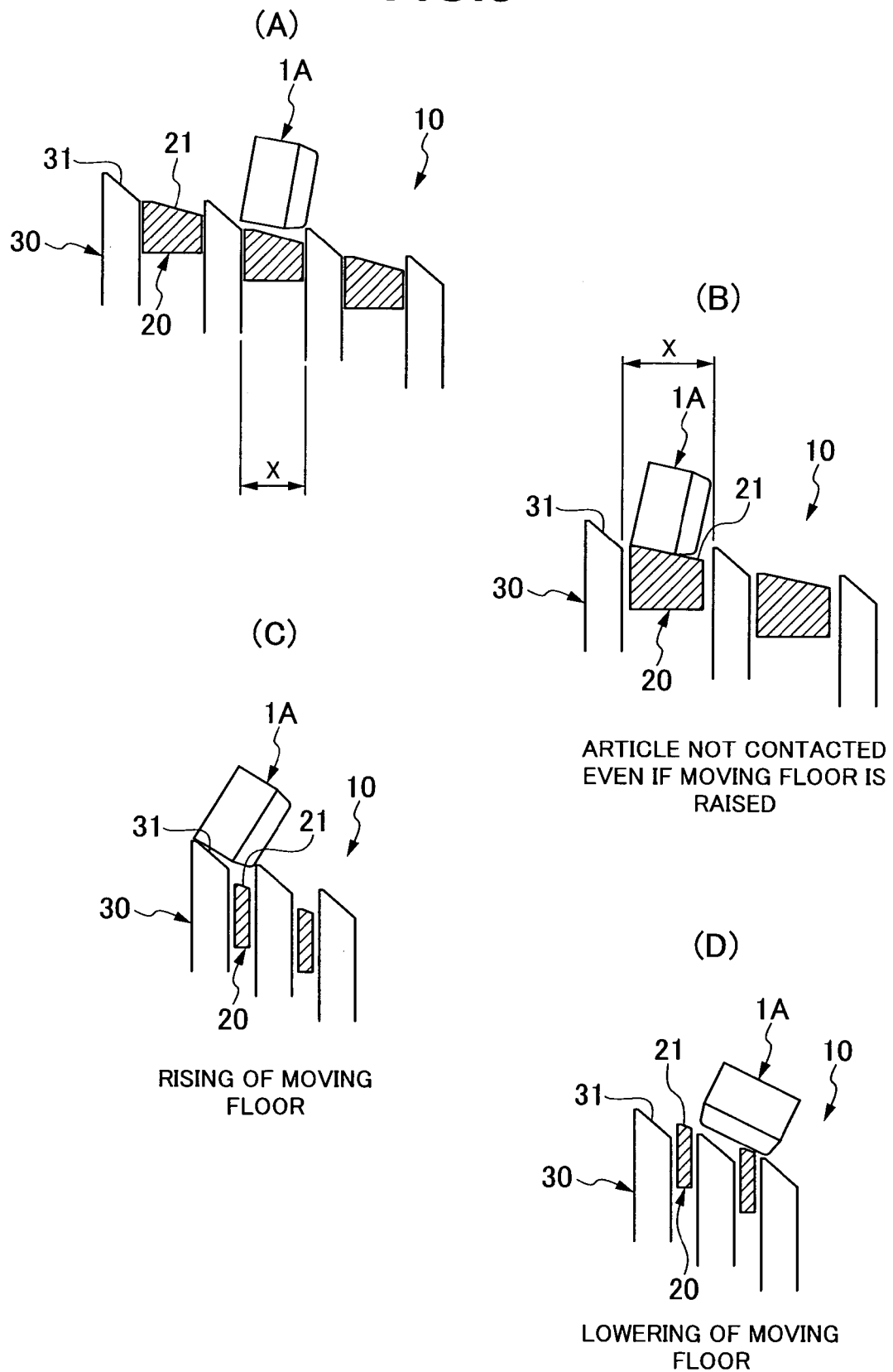
FIGS. 8(A) to 8(D) are frame format views showing a relationship between interval of the moving floors and the conveying property.
Figure 9:
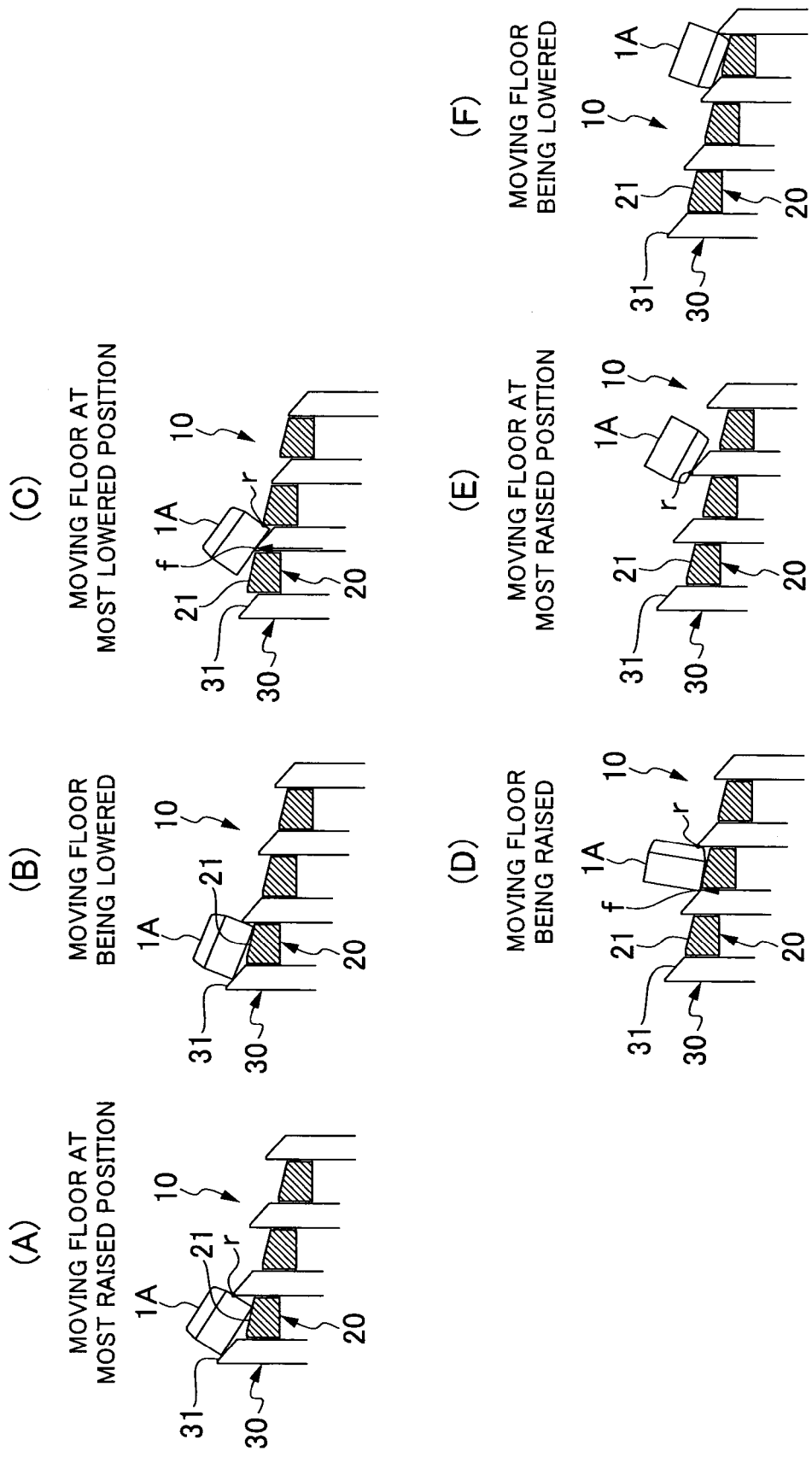
FIGS. 9(A) to 9(F) are frame format views showing an directing operation when conveying the article.
Figure 15:
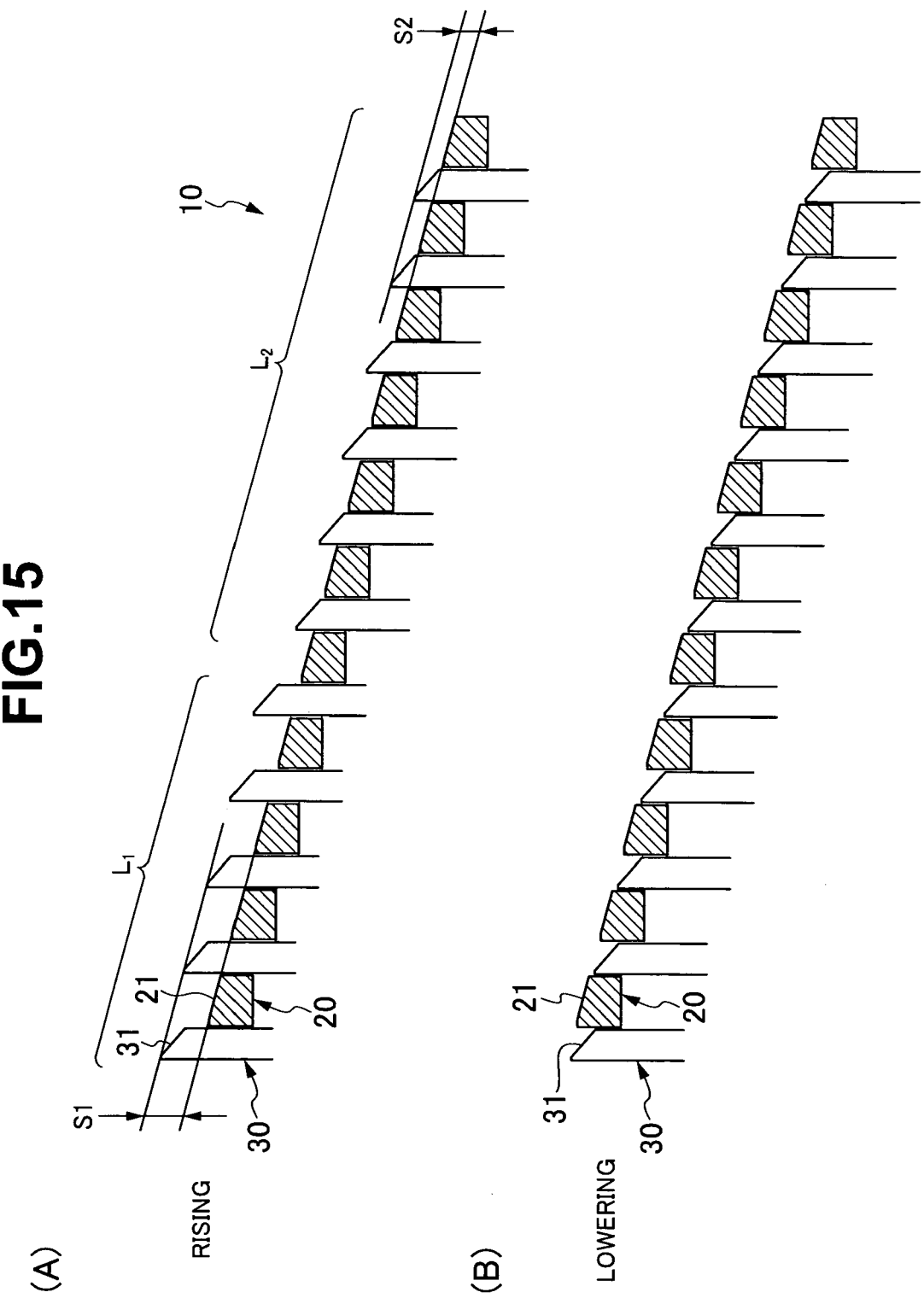
FIGS. 15(A) and 15(B) are frame format views showing a variant related to a projection stroke of the moving floor.

The relationship of the mode of the article 1 and the conveying property of the article 1 by the article conveying device 10 will now be described. Considering a circular cap 1A, an elliptical cap 1B, a cap with tube 1C, and a cap with dog-leg shaped tube 1D, as shown in FIG. 7, for the article 1 to be conveyed by the article conveying device 10, the minimum dimension a of the circular cap 1A is assumed as height h, the minimum dimension a of the elliptical cap 1B is assumed as minor axis e of an ellipse, the minimum dimension a of the cap with tube 1C is assumed as cap minimum diameter $t_1$ and the minimum dimension a of the cap with dog-leg shaped tube 1D is assumed as width $t_2$ of a pump head part. The circular cap and the elliptical cap of FIG. 7 are shape examples in which h and e are minimum, but obviously, the diameter of the circle may be smaller than h for the circular cap, and the height of the cap may be smaller than e for the elliptical cap. The following description is made with the minimum dimension of such articles 1 as the reference.

(1) Conveying property of the circular cap 1A by the article conveying device 10 (elliptical cap 1B is substantially the same) (FIGS. 8(A) to 8(D))

In order to ensure a satisfactory conveying property of the circular cap 1A, the interval x of the adjacent moving floors 30 is preferably 0.3 to 2.0 times, and more preferably 0.4 to 1.5 times the minimum dimension a (h, e) of the circular cap 1A (FIG. 8(A)). If the interval x of the adjacent moving floors 30 is excessively larger than such suitable value, the moving floor 30 cannot push up the circular cap 1, and thus cannot convey the cap (FIG. 8(B)). Even if the interval is in a range exceeding 1.0 times, conveyance becomes possible as the article will be pushed by the article 1 from the upstream if within the suitable value.

If the interval x of the adjacent moving floors 30 becomes excessively smaller than the suitable value, the fixed floor 20 and the moving floor 30 cannot act as an appropriate obstacle with respect to the conveyance of the circular cap 1A, and thus the circular cap 1A will continue to roll on the floor surface 21 of the fixed floor 20 and the floor surface 31 of the moving floor 30 and cannot be appropriately stopped temporarily, whereby the ratio of the circular cap 1A that cannot be stably discharged increases (FIGS. 8(C) and 8(D)).

In order to ensure satisfactory conveyance of the circular cap 1A, the level difference d (FIG. 12(B)) of the line connecting the floor surfaces 21 of the plurality of fixed floors 20 to each other and the line connecting the floor surfaces 31 at the most raised position of the plurality of moving floors 30 to each other is preferably 0.3 to 3.0 times, and more preferably 0.5 to 2.5 times the minimum dimension a of the circular cap 1A.

The conveying force becomes insufficient if smaller than the suitable value, and the conveyance force becomes too strong and stable conveyance becomes difficult if larger than the suitable value.

(2) Directing property of the circular cap 1A by the article conveying device 10 (elliptical cap 1B is substantially the same) (FIGS. 9A to 9F)

The circular cap 1A having a top surface is directed and discharged with the center of gravity side (top surface side) on the lower side.

In FIGS. 9(A) to 9(F), the point drawn at the contacting part of the fixed floor 20 or the moving floor 30 and the circular cap 1A is the center of rotation r, and the terminating point of the up-pointing arrow drawn to the moving floor 30 is the acting point f of the rotational force.

When the moving floor 30 is at the most raised position (FIG. 9(A)), this becomes the starting point of rotation for directing the circular cap 1A.

While the moving floor 30 is being lowered (FIG. 9(B)), the circular cap 1A receives the conveying force towards the downstream while moving.

When the moving floor 30 is at the most lowered position (FIG. 9(C)), the center of rotation r of the circular cap 1A is at the tip of the fixed floor 20, and the acting point f of the rotational force is at the tip of the moving floor 30. Since the conveying force to the downstream is acting on the circular cap 1A, the cap 1A can be rotated with a small rotational force.

While the moving floor 30 is being raised (FIG. 9(D)), the circular cap 1A is rotationally moved, and the center of rotation r of the cap 1A moves to the tip of the moving floor 30 on the downstream and the acting point f of the rotational force moves to the downstream side on the same moving floor 30.

When the moving floor 30 is at the most raised position (FIG. 9(E)), rotation is performed such that the top surface on the center of gravity side of the circular cap 1A is on the lower side, and thereafter, rotation is stopped, and stable orientation is obtained.

While the moving floor 30 is being lowered (FIG. 9(F)), the circular cap 1A slidably moves on the fixed floor 20, and does not rotate. In other words, directing for having the center of gravity side of the circular cap 1A on the lower side is performed through rotational movement of the circular cap 1A.

In order to ensure satisfactory directing property for having the center of gravity side of the circular cap 1A on the lower side, the level difference d (FIG. 12(B)) of the line connecting the floor surfaces 21 of the plurality of fixed floors 20 to each other and the line connecting the floor surfaces 31 at the most raised position of the plurality of moving floors 30 to each other is preferably 0.2 to 1.7 times, and more preferably 0.3 to 1.2 times the minimum dimension a of the circular cap 1A.

The rotational force and the conveying force becomes insufficient if smaller than the suitable value, and the rotational force becomes too strong and directing for having the center of gravity side on the lower side becomes difficult if larger than the suitable value.

As shown in FIGS. 10(A) to 10(C), the article conveying device 10 conveys small circular caps 1A, and discharges such caps in a directed state in which the center of gravity side of the circular cap 1A is on the lower side. A case of discharging in a directed state for having the center of gravity side of the small circular cap 1A on the lower side has been described, but similar directing is also possible for the elliptical cap 1B. Furthermore, directing for having the center of gravity side as the lower side is also possible for articles in which the center of gravity is off-centered such as caps having shapes other than circular shape such as square and extended elliptical shape, and articles having a tub shape such as lid of a box, a circular tube shape, and the like.

As shown in FIGS. 11(A) to 11(C), the article conveying device 10 can convey the large circular caps 1A and discharge such caps in a directed state for having the center of gravity side of the circular cap 1A on the lower side. However, if the range of the interval x of the adjacent moving floors 30 exceeds the suitable range described above, the property of supplying a constant amount slightly lowers.

(3) Conveying property of the cap with tube 1C (long article) by the article conveying device 10 (FIGS. 12 to 14)

In order to ensure satisfactory conveying property of the cap with tube 1C, the pitch p of the adjacent moving floors 30 is preferably 0.9 to 1.95 times, more preferably 1.1 to 1.7 times the minimum dimension a ($t_1$) (FIG. 7) of the cap with tube 1C. In this case, the selection of the minimum dimension a is defined without taking the tube part into consideration.

If the pitch p of the adjacent moving floors 30 is excessively larger than the suitable value, the moving floor 30 will not push up the cap with tube 1C, and the caps with tubes 1C cannot be separated.

If the pitch p of the adjacent moving floors 30 is excessively smaller than the suitable value, the cap with tube 1C cannot fit between the adjacent moving floors 30, and the caps with tubes 1C cannot be separated.

If the maximum dimension b of the cap with tube 1C is a cap maximum diameter $t_3$ (FIG. 12(A)), the level difference d (FIG. 12(B)) of the line connecting the floors surfaces 21 of the plurality of fixed floors 20 with respect to each other and the line connecting the floor surfaces 31 at the most raised position of the plurality of moving floors 30 with respect to each other is preferably 0.3 to 3.0 times, and more preferably 0.5 to 2.0 times the maximum dimension b ($t_3$) of the cap with tube 1C to ensure satisfactory conveying property of the cap with tube 1C.

If the level difference d of the fixed floor 20 and the moving floor 30 is excessively larger than the suitable value, the time the floor surface 31 of the moving floor 30 is projected above the floor surface 21 of the fixed floor 20 becomes longer and the discharging amount of articles reduces.

If the level difference d of the fixed floor 20 and the moving floor 30 is excessively smaller than the suitable value, the cap with tube 1C cannot fit between the adjacent moving floors 30, and the caps with tubes 1C cannot be separated.

As shown in FIGS. 13(A) to 13(C), the article conveying device 10 separates a large number of placed caps with tube 1C and discharges the caps one by one if the minimum dimension a of the cap 1C with tube is within the pitch p of the adjacent moving floors 30 and the entire length of the cap with tube 1C is within the width of the machine (entire width of the fixed floor 20 and the moving floor 30 held between the side guide plates 16). The cap with tube 1C is fitted between the adjacent moving floors 30 and is separated and conveyed.

As shown in FIGS. 14(A) to 14(C), the article conveying device 10 separates a large number of placed caps with tube 1C and discharges the caps one by one if the minimum dimension a of the cap 1C with tube is within the pitch p of the adjacent moving floors 30 and the entire length of the cap with tube 1C is larger than the width of the machine. The cap with tube 1C slides on the floor surfaces 21, 31 of the descending slope of the fixed floor 20 and the moving floor 30 to be conveyed.

The article conveying device 10 of FIGS. 15(A) and 15(B) controls the strokes S1, S2 for having the floor surface 31 of the moving floor 30 projecting above the floor surface 21 of the adjacent fixed floor 20 to be large (S1 of FIG. 15(A)) for the moving floor 30 on the upstream side L1 in the conveying direction and small (S2 of FIG. 15(A)) for the moving floor 30 on the downstream side L2. Accordingly, with regards to articles 1 that can easily get stuck such as cap with tube 1C and cap with dog-leg shaped tube 1D, the placed articles 1 are dispersed from each other so as to be easily separated on the upstream side in the conveying direction, and the articles 1 are stably discharged without increasingly/decreasingly changing the discharging amount of the articles 1 over time on the downstream side. S2 is defined as the level difference d of the fixed floor 20 and the moving floor 30. S1 is preferably set to 1.4 to 4.0 times, and more preferably to about 1.8 to 3.0 times S2.

Embodiment 2

FIGS. 18 to 34

Figure 18:
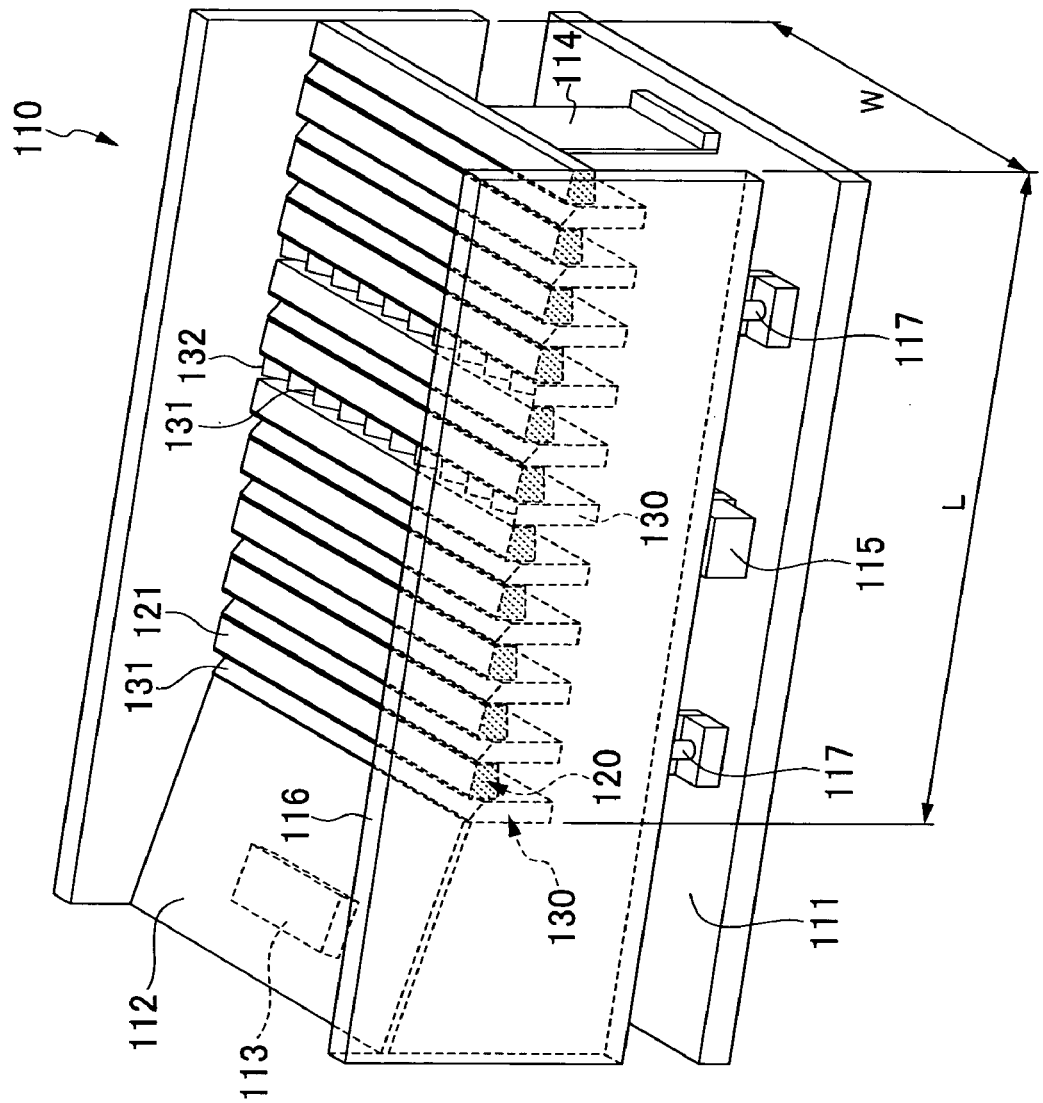
FIG. 18 is a perspective view showing a state in which the moving floor of the article conveying device of Embodiment 2 is depressed.
Figure 19:
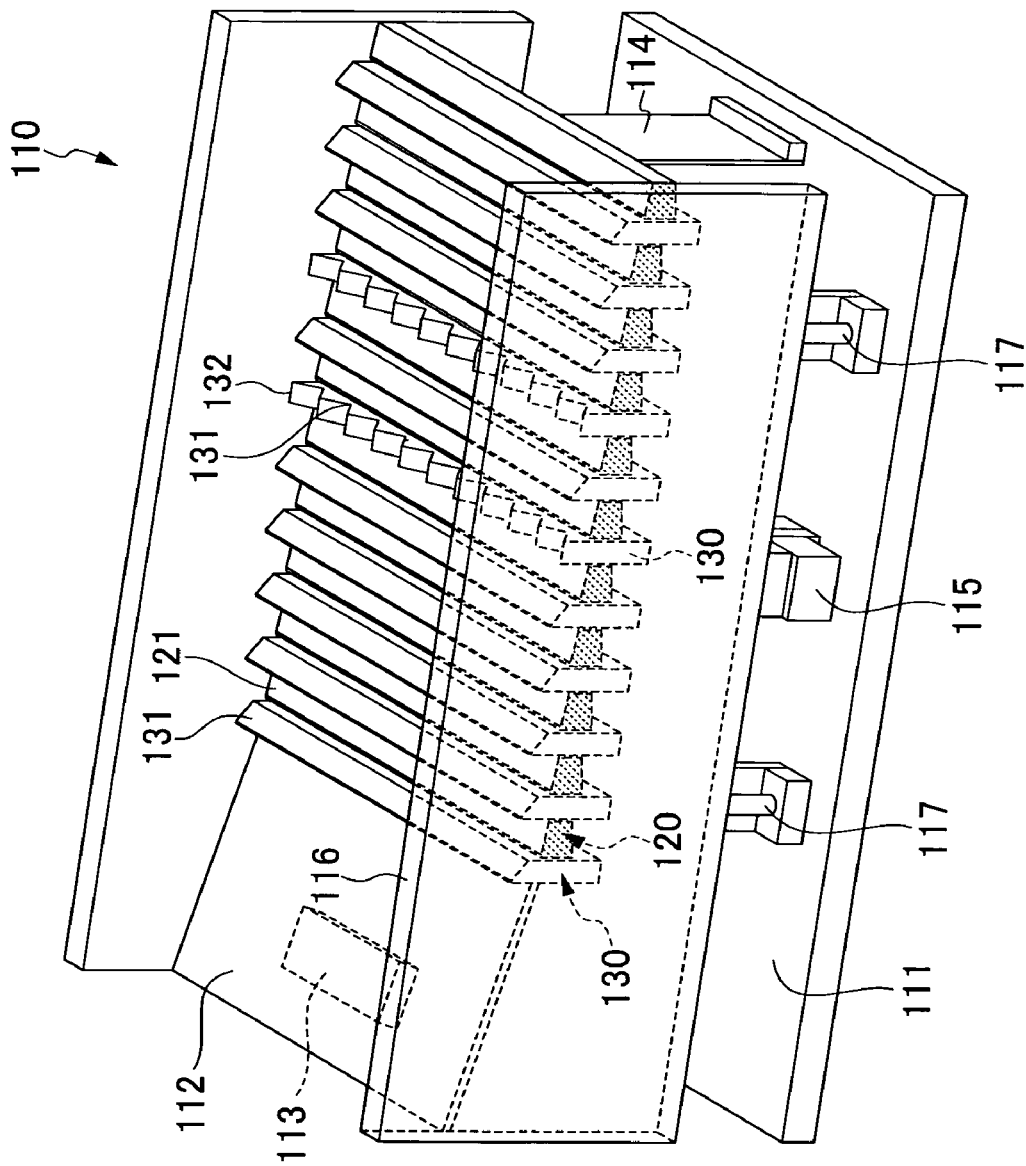
FIG. 19 is a perspective view showing a state in which the moving floor of the article conveying device is projected.
Figure 20:
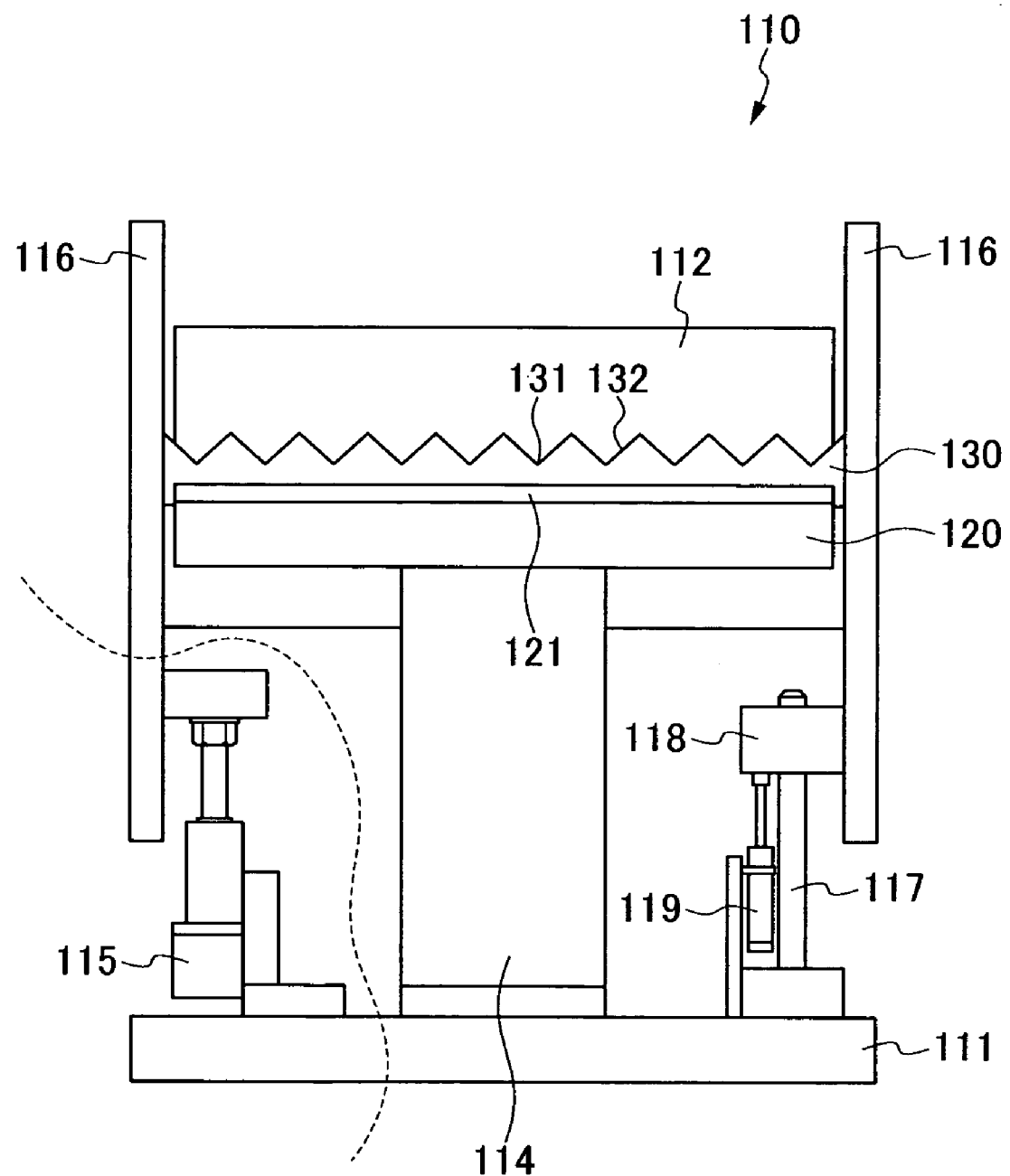
FIG. 20 is a front view showing the article conveying device.
Figure 24:
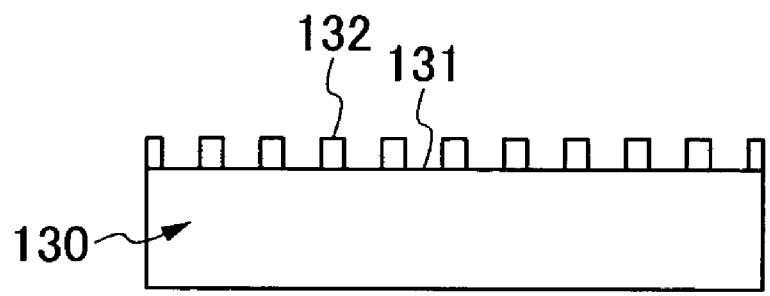
FIG. 24 is a frame format view showing the moving floor.
Figure 25:
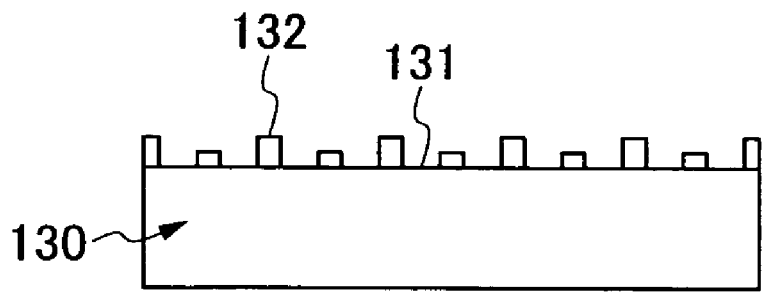
FIG. 25 is a frame format view showing the moving floor.
Figure 26:
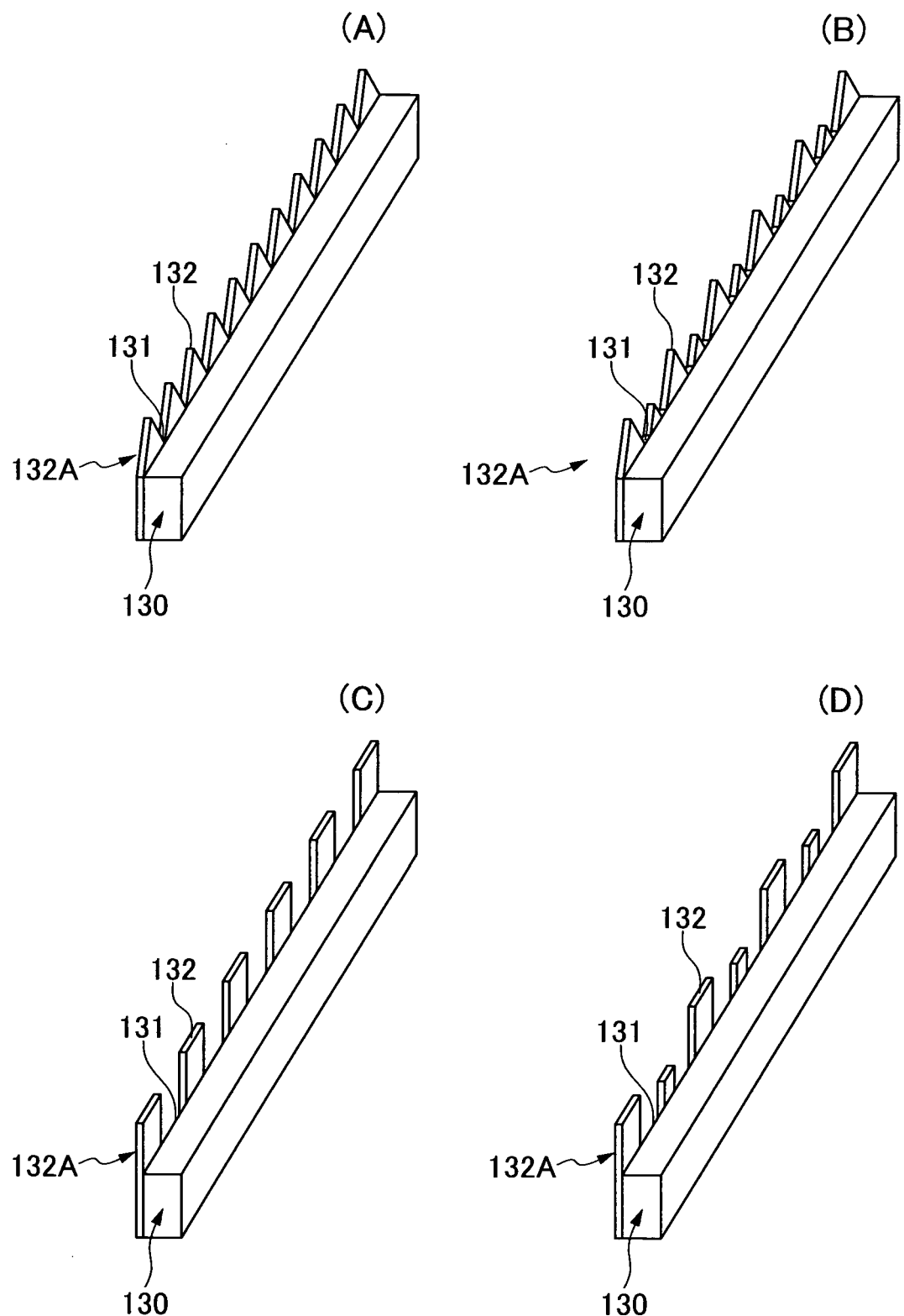
FIGS. 26(A) to 26(D) are frame format views showing another example of the moving floor.

As shown in FIGS. 18 to 20, an article conveying device 110 has a direction from one end side to the other end side of a mount 111 as an article conveying direction, where an inlet shoot 112 is arranged at the one end side, and a vibrator 113 is arranged on the back surface of the inlet shoot 112 for enhancing the conveying force.

The article conveying device 110 has a plurality of fixed floors 120 supported by a supporting member 114 arranged on the mount 111. The article conveying device 110 has each of the plurality of fixed floors 120 lined in the conveying direction so that the floor surfaces 121 are arranged horizontal with respect to each other towards the downstream side in the conveying direction (FIGS. 27(A) and 27(B)). In this case, the floor surface 121 of each fixed floor 120 is an inclined plane inclined so as to form a descending slope towards the downstream side in the conveying direction. A vibrator may be arranged in the fixed floor 120 to enhance the conveying force.

The article conveying device 110 has left and right side guide plates 116 connected to a raising/lowering drive device 115 supported by the mount 111 and a slide part 118 fixed to the side guide plate 116 is fitted in a freely sliding manner to a slide shaft 117 supported by the mount 111. An impact alleviating damper 119 is interposed between the mount 111 and the slide part 118. The left and right side guide plates 116 are arranged on both sides in the width direction of the fixed floor 120 and the inlet shoot 112, and have a plurality of moving floors 130 held in between. Each of the plurality of moving floors 130 is adjacently arranged on the side in the conveying direction (on the side on the upstream side in the present embodiment) with respect to each fixed floor 120. The fixed floor 120 and the moving floor 130 are alternately arranged along the conveying direction at a constant interval. The article conveying device 110 repeats the raising and lowering operation of the side guide plate 116 and the moving floor 130 by means of the raising/lowering drive device 115 (the moving floor 130 may be directly connected to the raising/lowering drive device 115, and the side guide plate 116 does not necessarily need to be raised/lowered). That is, each moving floor 130 repeats the raising/lowering operation of simultaneously positioning each floor surface 131 at the high position (FIG. 27(A)) and the low position (FIG. 27(B)) with respect to the floor surface 121 of the adjacent fixed floor 120.

The floor surface 131 of each moving floor 130 projects above the floor surface 121 of the fixed floor 120 at high position, and depresses below the floor surface 121 of the fixed floor 120 at low position. "Depress" in the present invention refers to when the moving floor 130 is positioned on the lower side of the fixed floor 120, and specifically it includes obviously the case of completely depressed in which the entire moving floor 130 is completely positioned at the lower side of the floor surface 121 of the fixed floor 120 and a case in which the floor surface 131 of the moving floor 130 stops at substantially the same position as the floor surface 121 of the fixed floor 120 in the low position state as well. "Stops at substantially the same position" means being positioned such that the difference y in height of the line connecting the highest portions at the low position state of the floor surface 131 of each moving floor 130 with respect to the line connecting the lowest portions of the floor surface 121 of the plurality of fixed floors 120 is 0 to +5 mm, as shown in FIG. 28(A), or y is between 2 to 10% of the minimum dimension d or e of the article shown in FIG. 30 and FIG. 31. FIG. 28(B) shows a state in which y=approx. 0 mm, and the floor surface 131 of the moving floor 130 is at substantially the same position as the floor surface 121 of the fixed floor 120 in the low position state. FIG. 28(C) shows a state in which the y is a negative value, and the floor surface 131 of the moving floor 130 is completely depressed below the floor surface 121 of the fixed floor 120 in the low position state.

Figure 27:
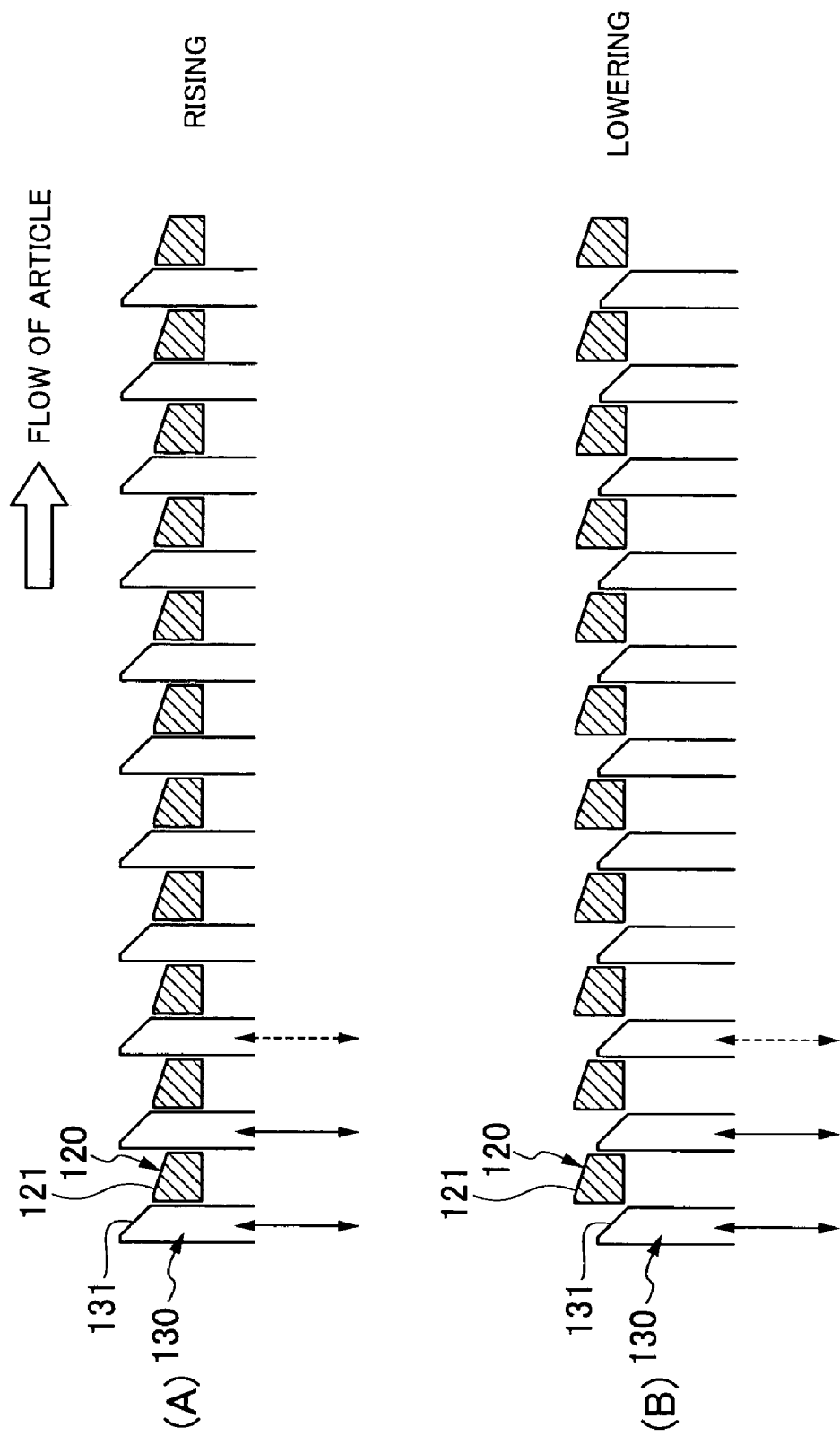
FIGS. 27(A) and 27(B) are frame format views showing a raising/lowering operation of the moving floor.
Figure 29:
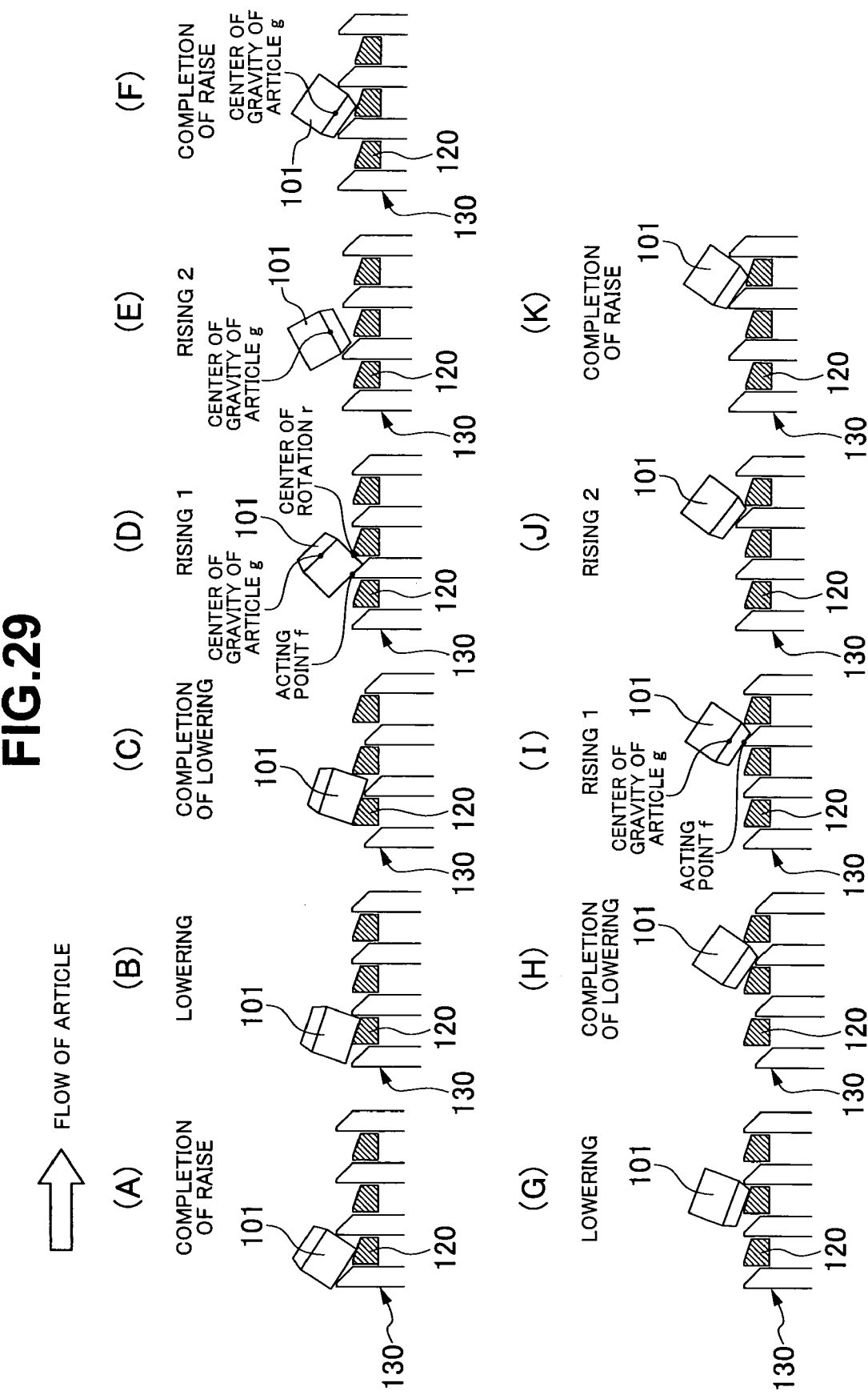
FIGS. 29(A) to 29(K) are frame format views showing an article conveying state by the article conveying device.
Figure 32:
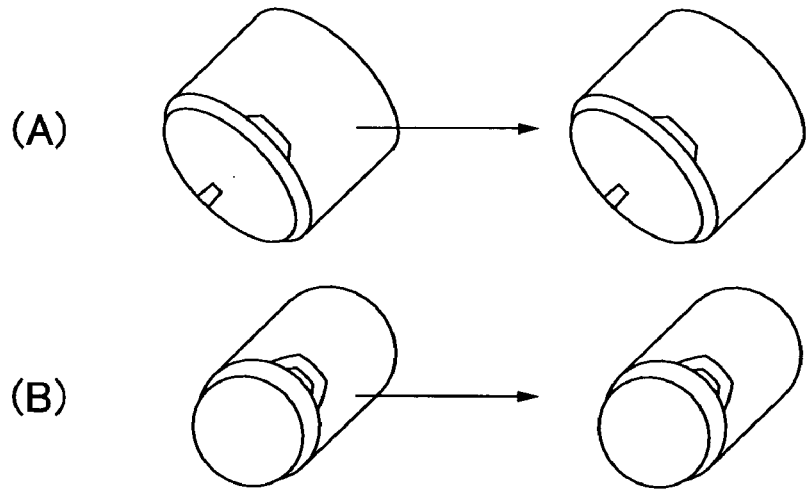
FIGS. 32(A) and 32(B) are frame format views showing an article passing through the moving floor not including the concave-convex part.

The floor surface 131 of each moving floor 130 positioned on the upper level is arranged to be horizontal with respect to each other towards the downstream side in the conveying direction (FIGS. 27(A) and 27(3)). In this case, the floor surface 131 of each moving floor 130 is an inclined plane inclined so as to form a descending slope towards the downstream side in the conveying direction. The angle of inclined plane of the moving floor 130 may be about the same as the angle of inclined plane of the fixed floor 120 or may be an acute angle to enhance the conveying force of the article.

The article conveying device 110 has a concave-convex part 132 forming a concave-convex pattern similar to a saw-shape like pattern along a direction (direction along longitudinal direction of moving floor 130, W direction of FIG. 18) orthogonal to the conveying direction (L direction of FIG. 18) on at least some of the floor surfaces 131 of the plurality of moving floors 130, so that the article 101 passing through the floor surface 131 of the moving floor 130 is pushed into the concave portion in the W direction of the concave-convex part 132 and rolled over, and the articles 101 are dispersed in the width direction (W direction) of the article conveying device 110 and directed so that the center of gravity of the article 101 is on the lower side. The moving floor 130 of FIGS. 21(A) and 21(B) does not have the concave-convex part 132 arranged on the floor surface 131, but the moving floor 130 of FIGS. 22 to 26 have the concave-convex part 132 arranged on the floor surface 131. The concave-convex part 132 of FIGS. 22(A) and 22(B) has a triangular shape (saw-shape like pattern). The concave-convex part 132 of FIGS. 23(A) and 23(B) has a triangular shape (saw-shape like pattern) to provide a difference in the height of the tips of adjacent triangles to enhance the roll-over property in the W direction of the article 101. The concave-convex part 132 of FIG. 24 has a quadratic prism shape. The concave-convex part 132 of FIG. 25 has a quadratic prism shape to provide a difference in the height of the tips of adjacent squares to enhance the roll-over property in the W direction of the article 101.

In FIGS. 26(A) to 26(D), the concave-convex part 132 is formed by a flat plate 132A, and the flat plate 132A is arranged on the moving floor 130.

The concave-convex part 132 of FIG. 26(A) has a triangular flat plate shape (saw-shape like pattern). The concave-convex part 132 of FIG. 26(B) has a triangular flat plate shape (saw-shape like pattern) to provide a difference in the height of the tips of adjacent triangles to enhance the roll-over property in the W direction of the article 101. The concave-convex part 132 of FIG. 26(C) has a square flat plate shape. The concave-convex part 132 of FIG. 26(D) has a square flat plate shape to provide a difference in the height of the tips of adjacent squares to enhance the roll-over property in the W direction of the article 101. When forming the concave-convex part 132 with the flat plate 132A of FIGS. 26(A) to 26(D), the flat plate 132A side is arranged on the upstream side.

The raising/lowering drive device 115 can use an electrically operated cylinder etc. to change and control the raising/lowering speed, the acceleration, and the raising/lowering stroke. The raising/lowering drive device 115 may be a mechanism for converting the rotation of the electrically operated motor to a linear movement, a pneumatic cylinder, or the like. When the floor surfaces 131 of the moving floors 130 are arranged horizontal to each other, the raising/lowering speed of the moving floor 130 is adjusted preferably to 30 to 400 mm/sec, more preferably to 40 to 250 mm/sec, and most preferably to 50 to 150 mm/sec to enable high precision directing. The speed is set to high speed if desiring to enhance the roll-over property, in particular, and set to low speed when the orientation does not stabilize as the roll-over property is too high and when the transfer of article 101 from the outlet part of the article conveying device 110 to the next step is unstable. The raising/lowering acceleration of the moving floor 130 is preferably 0.05 to 0.6 G, and more preferably 0.2 to 0.4 G. The unit G indicates multiples of the gravitational acceleration 9.8 m/sec$^2$. The acceleration is set to high acceleration if desiring to enhance the roll-over property, in particular, and set to low acceleration when the orientation does not stabilize as the roll-over property is too high and when the transfer of article 101 from the outlet part of the article conveying device 110 to the next step is unstable. When adjustment of speed and acceleration corresponding to the roll-over property of the article is performed such as speeding up and speeding down in the middle of raise using the electrically operated cylinder capable of changing and controlling the raising/lowering speed, the acceleration, and the raising/lowering stroke, highly precise directing becomes possible. Furthermore, if the moving floor 130 is temporarily stopped for 0.2 to 1.0 sec at the highest raised point or temporarily stopped for 0.2 to 1.0 sec at the lowest lowered point, highly precise directing may be performed by momentarily stopping and stabilizing the movement of the article 101. The raising/lowering stroke is appropriately adjusted by the size and shape of the article, the moving floor 130, and the fixed floor 120. As one example, a servo motor having a very small output of 30 W is sufficient in a device of driving the raising/lowering unit including eleven moving floors 130 made of polyacetal having a length of 300 mm.

The article conveying state by the article conveying device 110 will now be described.

(Article Conveying Operation by Raising/Lowering of Moving Floor 30)

As shown in FIGS. 18 and 19, the article conveying device 10 has the floor surfaces 121 of the plurality of fixed floors 120 arranged horizontal to each other, and the floor surfaces 131 of the plurality of moving floors 130 raised and lowered while maintaining a horizontal state with respect to each other, where the article 101 is conveyed by sliding along the inclined surfaces of the floor surfaces 121, 131 of the fixed floor 120 and the moving floor 130 by repeating the raising/operating operation of each moving floor 130.

Specifically, the directing and conveying property of the article by the article conveying device 110 are as shown in FIGS. 29(A) to 29(K). In FIGS. 29(A) to 29(K), g is the center of gravity of the article 101, r is the center of rotation of the article 101, f is the acting point of the rotational force that acts on the article 101, and the article 101 is a cap.

At the completion of raise (FIG. 29(A)) in which the moving floor 130 is at the most raised position, the cap 101 is between the adjacent moving floors 130.

While the moving floor 130 is being lowered (FIG. 29(B)), the cap 101 moves while sliding the floor surface 121 of the fixed floor 120.

At the completion of lowering (FIG. 29(C)) in which the moving floor 130 is at the most lowered position, the cap 101 is stopped by being retained by the fixed floor 120 on the downstream side.

While the moving floor 130 is being raised (FIGS. 29(D) and 29(E)), the center of gravity g of the cap 101 is first at the upper side and thus is unstable, but the center of gravity g of the cap 101 moves to the lower side when a slight rotational force on the cap 101 rotates the cap 101 at the acting point f due to the raising of the moving floor 130 with the tip of the fixed floor 120 as the center of rotation r.

At the completion of raising (FIG. 29(F)) of the moving floor 130, the cap 10 is rotated and directed until the top surface where the center of gravity g of the cap 101 exists is on the lower side.

While the moving floor 130 is being lowered (FIG. 29(G)), the cap 101 moves while sliding the floor surface 121 of the fixed floor 120.

At the completion of lowering (FIG. 29(H)) of the moving floor 130, the cap 101 is stopped by being retained by the fixed floor 120 on the downstream side.

While the moving floor 130 is being raised (FIGS. 29(I) and 29(J)), the center of gravity g of the cap 101 is at the lower side and thus is stable. The acting point f where the moving floor 130 applies the rotational force on the cap 101 and the center of gravity g of the cap 101 become close by the raising of the moving floor 130, and thus the cap 101 is merely pushed upward and rotational force is less likely to be generated.

At the completion of raising (FIG. 29(K)) of the moving floor 130, the top surface where the center of gravity g of the cap 101 originally exists is on the lower side, and further rotation is not generated. The cap 101 only slidably moves on the floor surface 131 of the moving floor 130.

When the rising acceleration of the moving floor 130 is large, the push-up force of the floor surface 131 of the moving floor 130 on the article 101 becomes large, and furthermore, the conveying force of the inclination of the floor surface 131 of the moving floor 130 on the article 101 becomes large, whereby the discharging amount of the article 101 can be increased.

When the rising acceleration of the moving floor 130 is small, the push-up force of the floor surface 131 of the moving floor 130 on the article 101 becomes small, and furthermore, the conveying force of the inclination of the floor surface 131 of the moving floor 130 on the article 101 becomes small, whereby the discharging amount of the article 101 can be reduced.

(Article Conveying Operation by the Concave-Convex Part 132 of the Moving Floor 130)

In the article conveying device 110, if the floor surface 131 of the moving floor 130 includes the concave-convex part 132, the article 101 is dispersed in the width direction of the article conveying device 110, and the article 101 can be discharged by a substantially constant amount from the article conveying device 110.

When desiring to perform directing on the articles 101 to be discharged from the article conveying device 110 to have the respective center of gravity on the lower side, the article 101 passing through the floor surface 131 of the moving floor 130 must be rolled over at the concave portion in the W direction of the concave-convex part 132 to have the center of gravity directed on the lower side.

The floor surface 131 of each moving floor 130 having the concave-convex part 132 may be directed in the horizontal direction, or may be inclined so as to form a descending slope towards the downstream side in the conveying direction to enhance the conveying force.

In particular, if the height (h) of the article 101 is large with respect to the bottom surface length thereof (diameter d, minor axis of ellipse e) (h>1.2d, h>1.2e) as shown in FIGS. 30 and 31, when the moving floor 130 does not include the concave-convex part 132, the article 101 moves towards the downstream in the same direction and directing for having the center of gravity on the lower side becomes difficult, as shown in FIGS. 32(A) and 32(B). When the moving floor 130 includes the concave-convex part 132, the article 101 is pushed into the concave portion of the concave-convex part 132 when passing the floor surface 131 of the moving floor 130 thereby inclined and rolled over in the W direction towards the center of gravity of the article 101 as shown in FIGS. 33(A) and 33(B), whereby directing for having the center of gravity on the lower side is performed.

In the article conveying device 110, the dispersion of the articles 101 in the width direction of the article conveying device 110 is further promoted if the floor surfaces 131 of all the moving floor 130 include the concave-convex part 132, whereby the article 101 can be discharged by a constant amount from the article conveying device 110 and high dispersion conveying property can be obtained.

When desiring to perform directing for having the center of gravity of the article 101 on the lower side, the moving floor 130 including the concave-convex part 132 is preferably installed in a suitable range from a position on the upstream side by (0.2-0.4)×L from the most downstream part to an upstream part with respect to the installing range L of the fixed floor 120 and the moving floor 130 in the article conveying device 110. If the moving floor 130 including the concave-convex part 132 is at the most downstream part of the article conveying device 110, the article 101 inclines in the W direction at the most downstream part and the discharging orientation of the article 101 becomes unstable. However, if it is preferable to incline in the W direction in terms of handling of the article in the next step or to incline in the W direction for articles of special shape in terms of directing, the moving floor 130 including the concave-convex part 132 is sometimes arranged only at the most downstream position or arranged at the most downstream position and the upstream position thereof. The article conveying device 110 may have the concave-convex part 132 arranged on all the moving floors 130 of the suitable range, or have both the moving floor 130 including the concave-convex part 132 and the moving floor 130 not including the concave-convex part 132. More preferably, the moving floor 130 including the concave-convex part 132 and the moving floor 130 not including the concave-convex part 132 are alternately arranged, whereby high conveying force is applied by the moving floor 130 not including the concave-convex part 132, the directing for having the center of gravity of the article on the lower side is performed by the moving floor 130 including the concave-convex part 132, and high-performance directing can be performed.

The article conveying device 110 of FIGS. 34(A) to 34(C) conveys the cap 101 in which the height (h) with respect to the diameter (d) is small, where the article passes the moving floor 130 including the concave-convex part 132 about twice, so that most (about 83 to 97%) of the articles 101 are directed. The directing of most (about 83 to 97%) articles is also possible for the articles 101 in which the height (h) of the article 101 is large with respect to the bottom surface length (diameter d, minor axis of ellipse e) (h>1.2d, h>1.2e) as shown in FIGS. 30 and 31. As an example of directing, the caps are supplied to the moving floor 130 having a length of 300 mm such that an average of about five caps are lined, and the moving floor 130 is raised and lowered at 1 sec. cycle, so that the cap 101 having a diameter (d) of 34 mm and a height (h) of 24 mm can be directed at about 300/min. at a success rate of about 95%.

Embodiment 3

Figure 35:
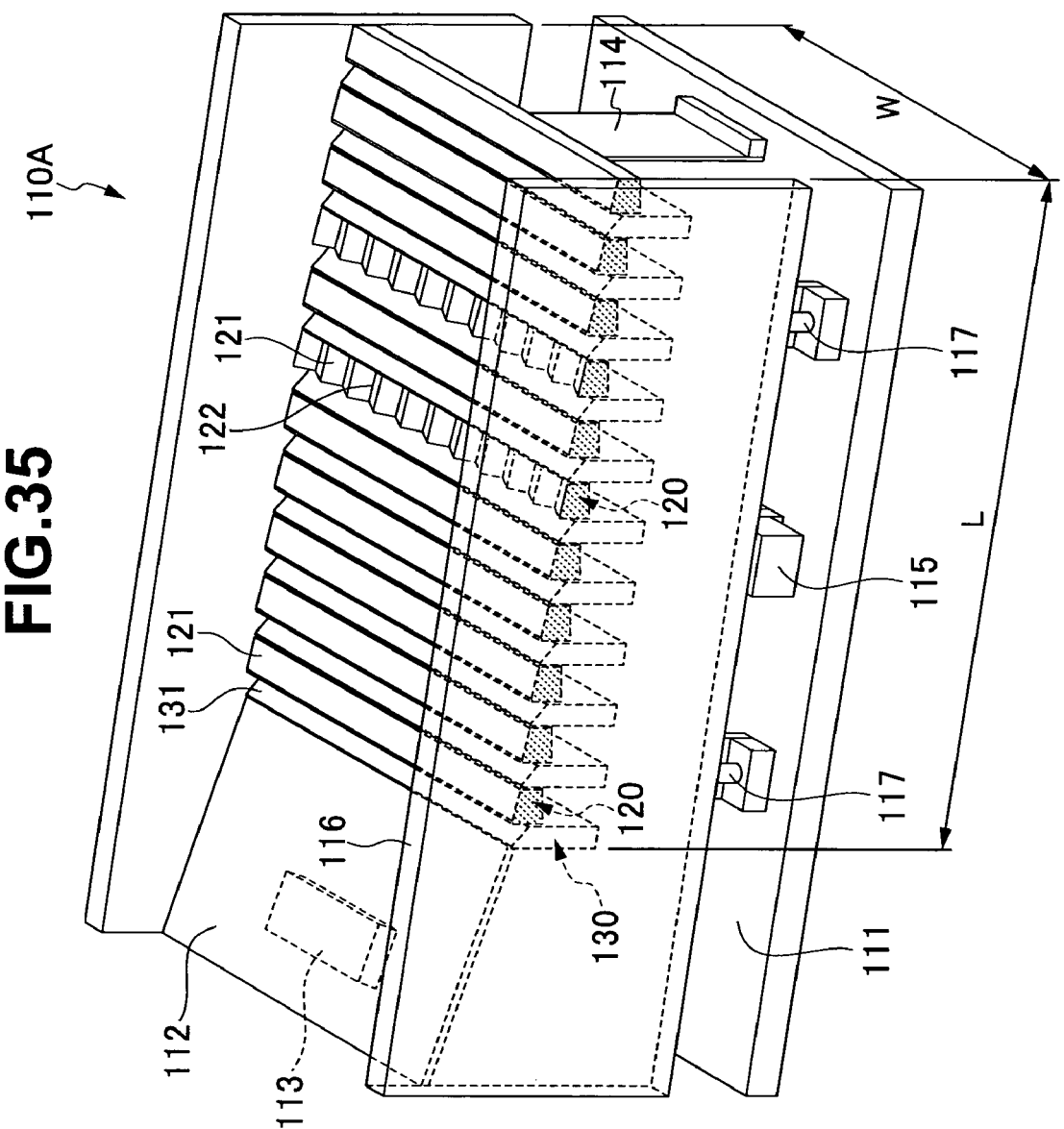
FIG. 35 is a perspective view showing a state in which the moving floor of an article conveying device of Embodiment 3 is depressed.
Figure 36:
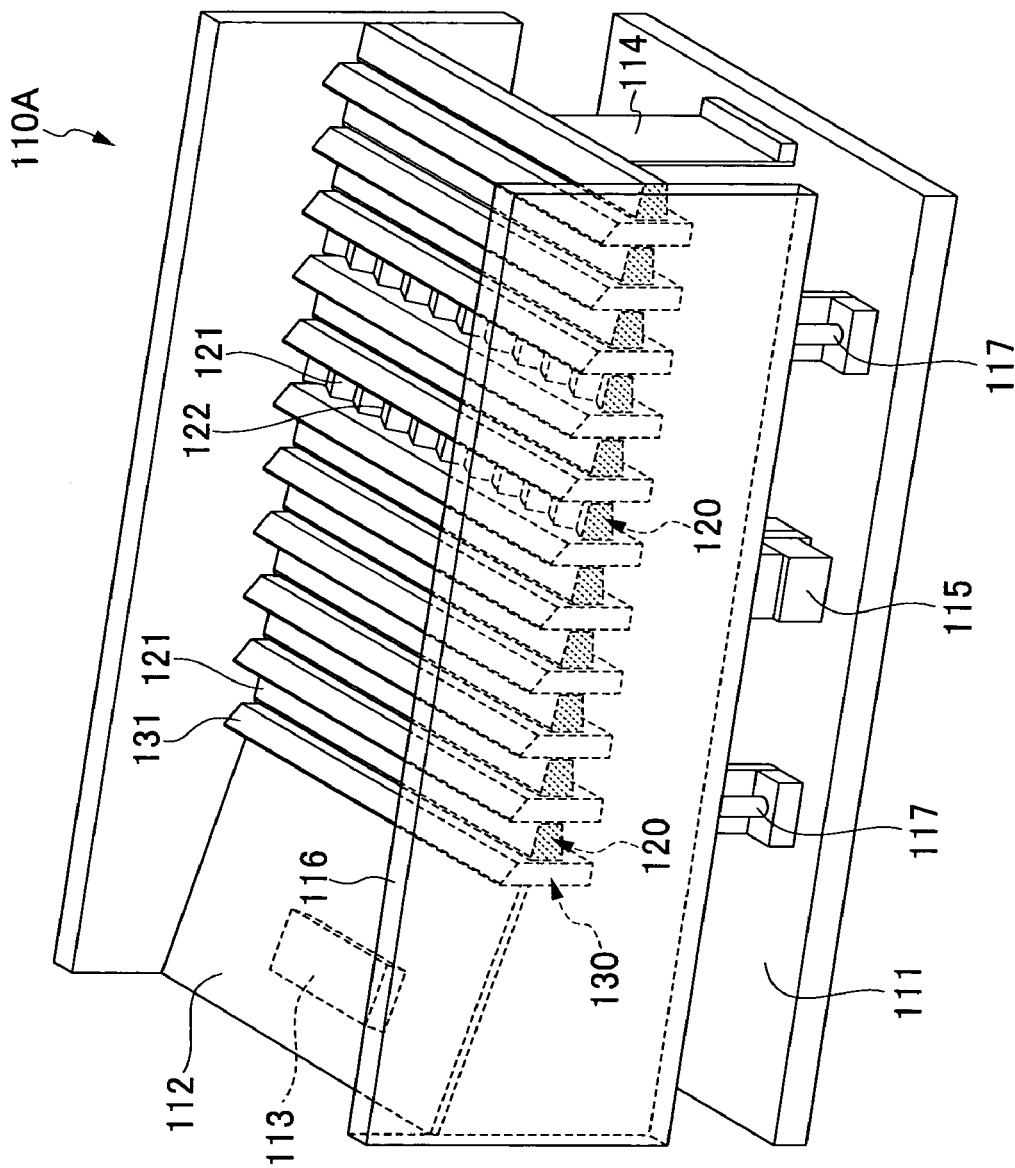
FIG. 36 is a perspective view showing a state in which the moving floor of the article conveying device is projected.
Figure 37:
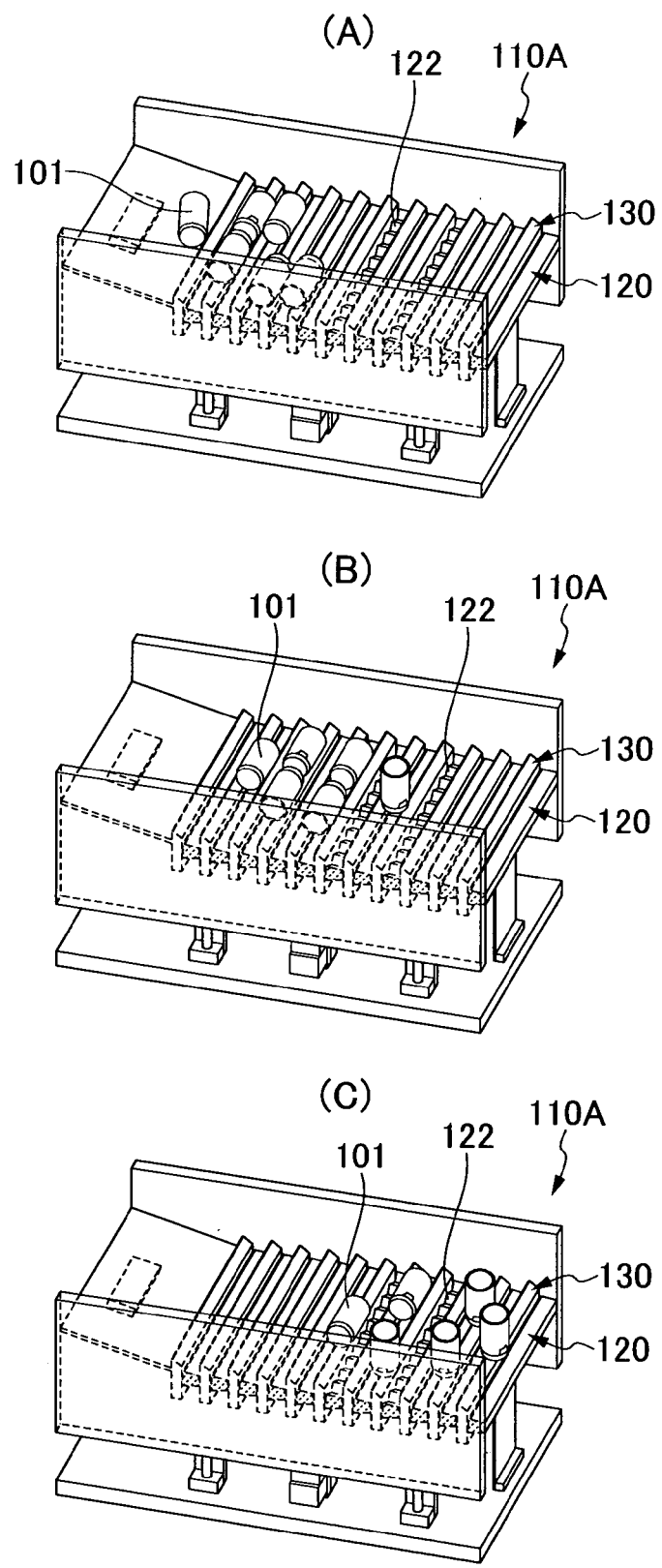
FIGS. 37(A) to 37(C) are frame format views showing a conveying state of the cap.
Figure 38:
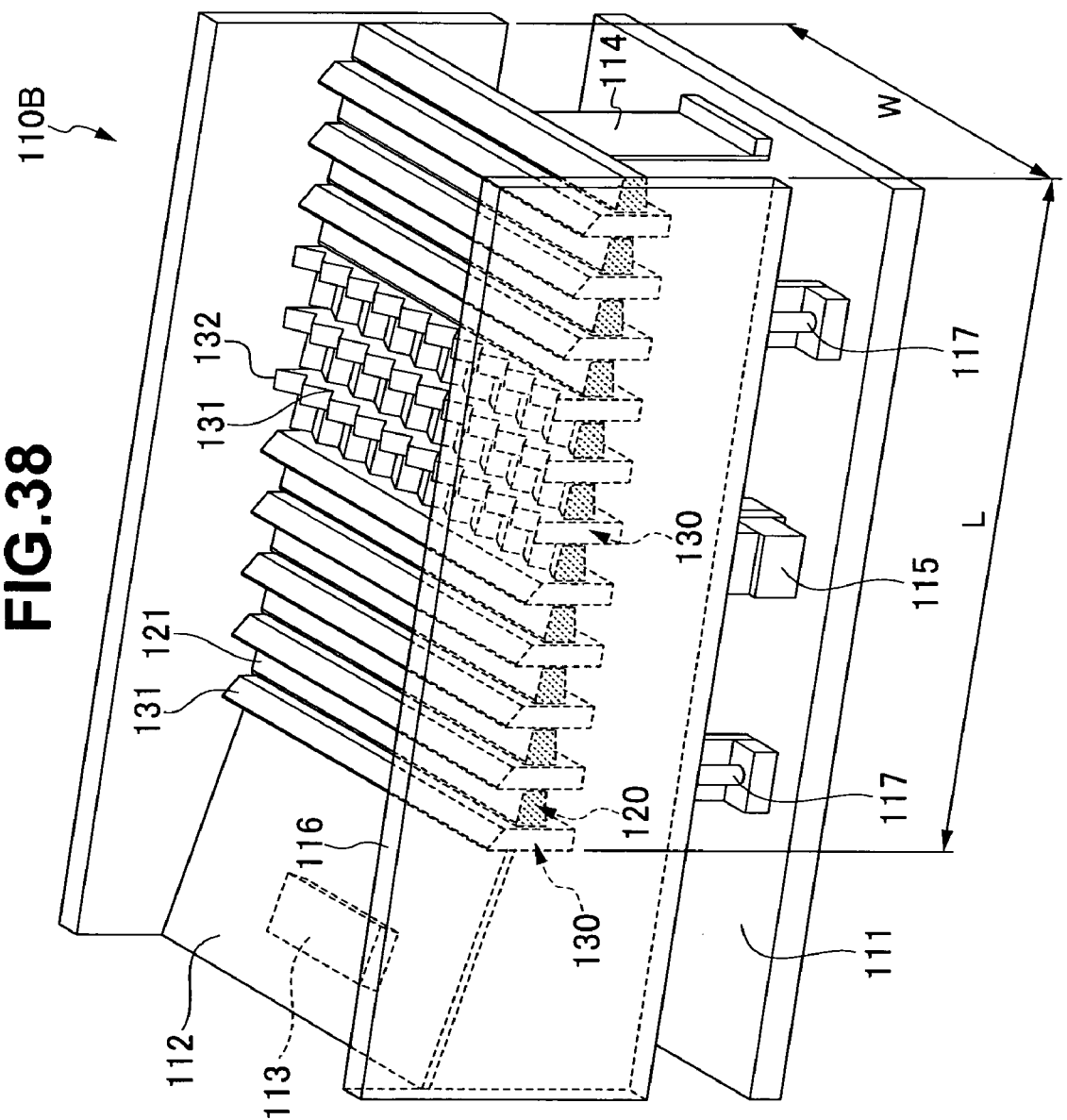
FIG. 38 is a frame format view showing an article conveying state by an article conveying device of Embodiment 4.

FIGS. 35 to 37

An article conveying device 110A of Embodiment 3 differs from the article conveying device 110 of Embodiment 2 in that a concave-convex part 122 forming a concave-convex pattern such as saw-shape like pattern is arranged along a direction (direction along longitudinal direction of the fixed floor 120, W direction) orthogonal to the conveying direction (L direction) on at least some of the floor surfaces 121 of the plurality of fixed floors 120, as shown in FIGS. 35 and 36, so that the article 101 passing the floor surface 121 of the fixed floor 120 is pushed into the concave portion in the W direction of the concave-convex part 122 and rolled over, and the articles 101 are dispersed in the width direction (W direction) of the article conveying device 110A and directed so that the center of gravity of the article 101 is on the lower side. The concave-convex part 122 of the fixed floor 120 can be arranged in a similar shape and configuration as the concave-convex part 132 arranged on the moving floor 130 in the article conveying device 110, and similar effects are obtained.

The floor surface 121 of each fixed floor 120 including the concave-convex part 122 may be arranged horizontally, but if the size of the article 101 is small with respect to the width of the fixed floor 120, the article 101 might stop on the floor surface 121 of the fixed floor 120 and may not be conveyed. In such case, the floor surface 121 is inclined so as to form a descending slope towards the downstream side in the conveying direction to enhance the conveying force.

Similar to the article conveying device 110, the article conveying device 110A performs the article conveying operation through the raising/lowering of the moving floor 130, and the article conveying operation by the concave-convex part 122 of the fixed floor 120 similar to that by the concave-convex part 132 of the moving floor 130, whereby high dispersion conveying property is similarly obtained.

The article conveying device 110A of FIGS. 37(A) to 37(C) conveys the cap 101 in which the height (h) is large with respect to the diameter (d), where the article passes the fixed floor 120 including the concave-convex part 122 about twice, so that most (about 83 to 97%) of the caps 101 are directed. As an example of directing, the articles are supplied to the moving floor 130 having a length of 300 mm such that an average of about four caps 101 are lined, and the moving floor 130 is raised and lowered at 1.5 sec. cycle, so that the cap 101 having a diameter (d) of 30 mm and a height (h) of 40 mm can be directed at about 160/min. at a success rate of about 90%.

Embodiment 4

FIG. 38

An article conveying device 110B of Embodiment 4 differs from the article conveying device 110 of Embodiment 2 in that a concave-convex part 122 forming a concave-concave pattern similar to the saw-shape like pattern along a direction (direction along longitudinal direction of the fixed floor 120, W direction) orthogonal to the conveying direction (L direction) is arranged on at least some of the floor surfaces 121 of the plurality of fixed floors 120, a concave-convex part 132 forming a concave-concave pattern similar to the saw-shape like pattern along a direction (direction along longitudinal direction of the moving floor 130, W direction) orthogonal to the conveying direction (L direction) is arranged adjacent to the upstream or downstream position of the concave-convex part 122, on at least some of the floor surfaces 131 of the plurality of moving floors 130, and the concave-convex parts are not arranged on the fixed floor 120 and the moving floor 130 arranged before and after the above relevant floor surfaces. The effect of dispersing the articles 101 in the width direction (W direction) of the article conveying device 110A and the effect of directing the center of gravity of the article 101 to the lower side are further enhanced since the article 101 passing the floor surface 121 of the fixed floor 120 is pushed into the concave portion in the W direction of the concave-convex part 122 and rolled over, the article 101 passing the floor surface 131 of the moving floor 130 is pushed into the concave portion in the W direction of the concave-convex part 132 and rolled over, and furthermore, by the mutual action of the floor surface 131 of the moving floor 130 including the concave-convex part and the floor surface 121 of the fixed floor 120 including the concave-convex part adjacent to each other.

Therefore, the article conveying device 110B has an article conveying operation similar to the article conveying device 110, 110A and a higher dispersion conveying property.

The shape of the concave-convex part of the adjacent moving floor 130 and the fixed floor 120 may be the same or may be different. Alternatively, the shape of the concave-convex part may be the same but the position of the concave-concave portion may be shifted in the W direction.

The article conveying device 110B directs the caps 101 shown in FIGS. 30 to 33 with higher effect, but the orientation of the directed articles might be disturbed in the case of the shape or the position of the center of gravity of the article 101 in which the orientation in directing for having the center of gravity of the article 101 to the lower side is unstable. In this case, adjustment is made through a method of lowering the raising/lowering speed or the acceleration, decreasing the raising/lowering stroke, or reducing the difference in height of the concave-convex part according to the shape or the position of center of gravity of the article 101.

Embodiment 5

FIGS. 39 to 46

Figure 39:
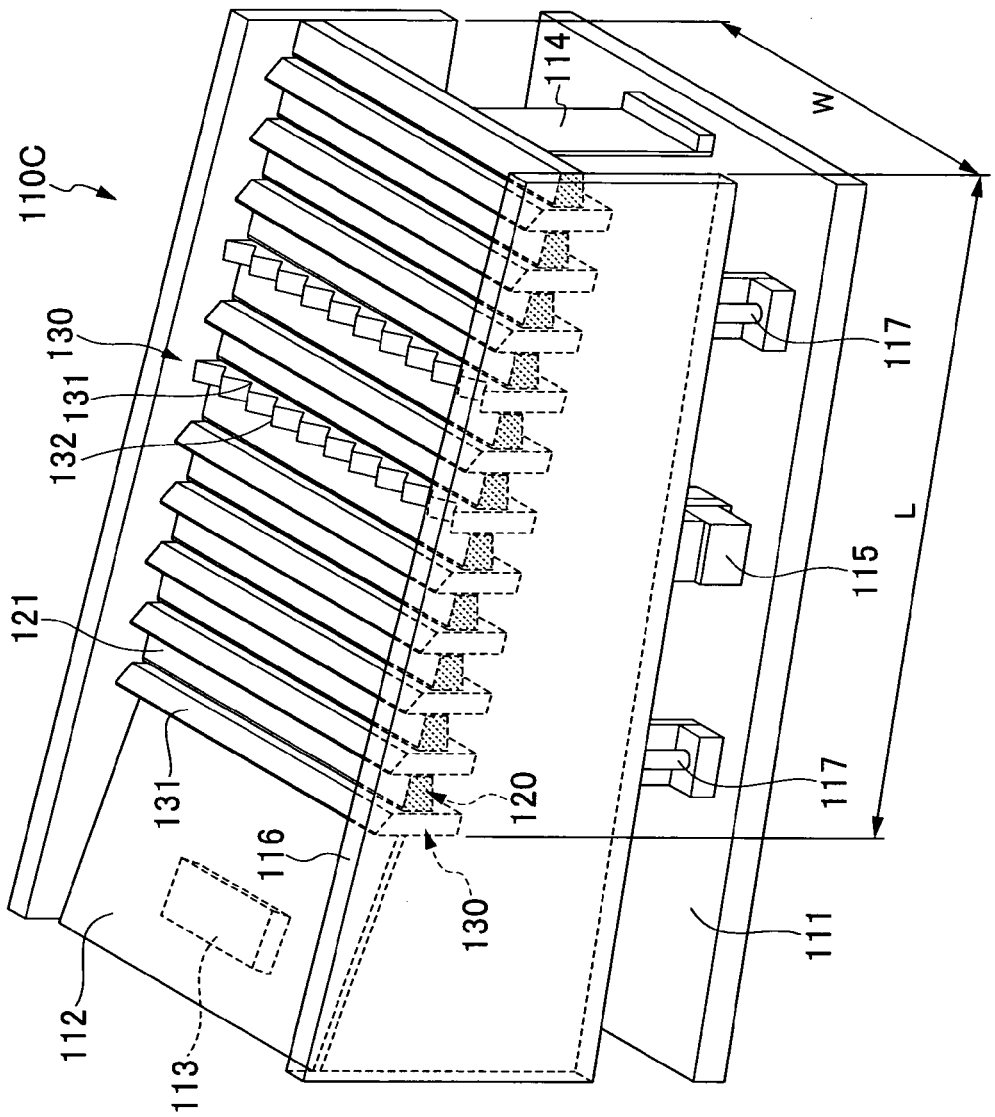
FIG. 39 is a frame format view showing a state in which a moving floor of an article conveying device of Embodiment 5 is projected.
Figure 40:
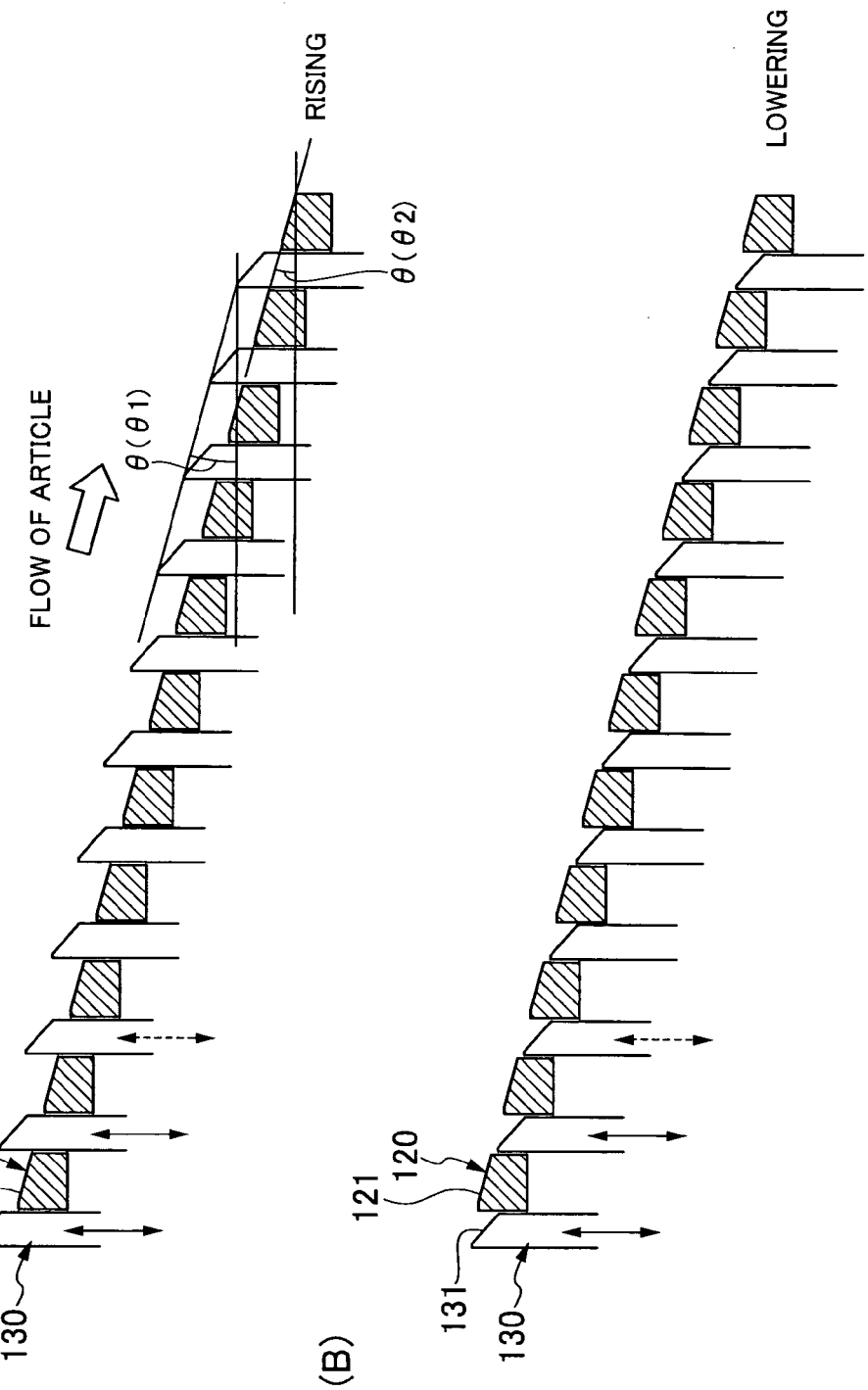
FIGS. 40(A) and 40(B) are frame format views showing a raising/lowering operation of the moving floor.
Figure 43:
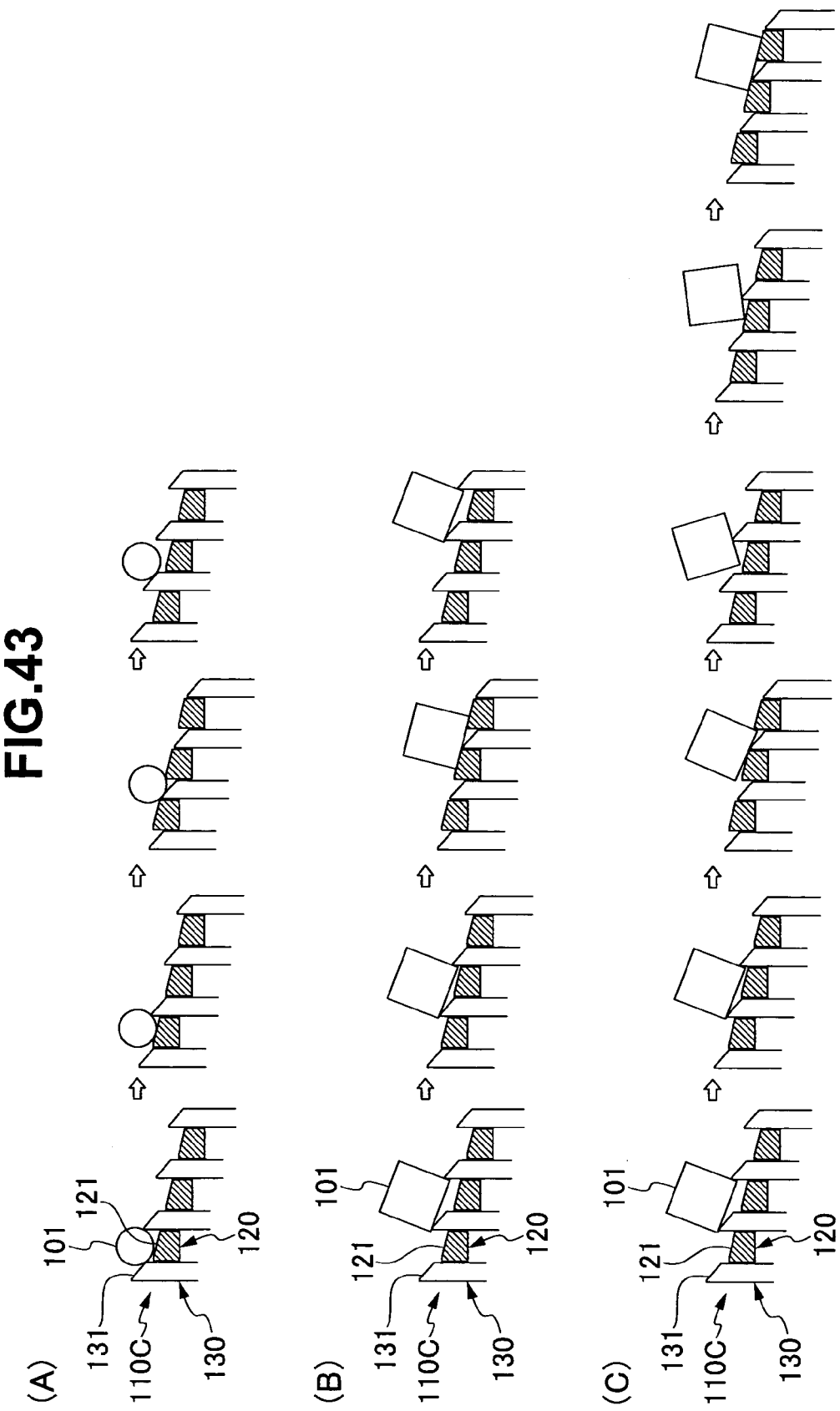
FIGS. 43(A) to 43(C) are frame format views showing an article conveying state by the article conveying device.
Figure 44:
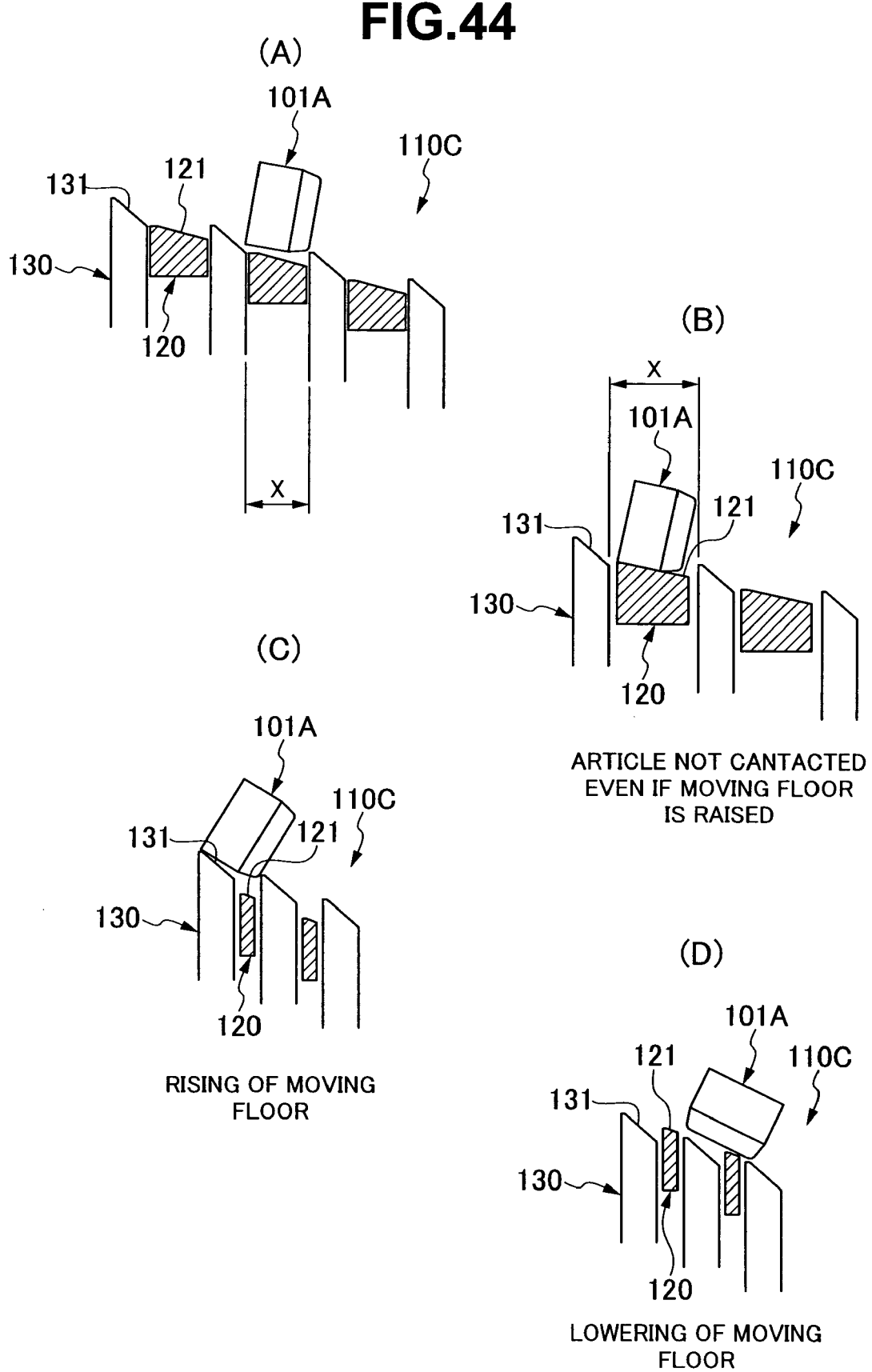
FIGS. 44(A) to 44(D) are frame format views showing a relationship between interval of the moving floors and the conveying property.
Figure 45:
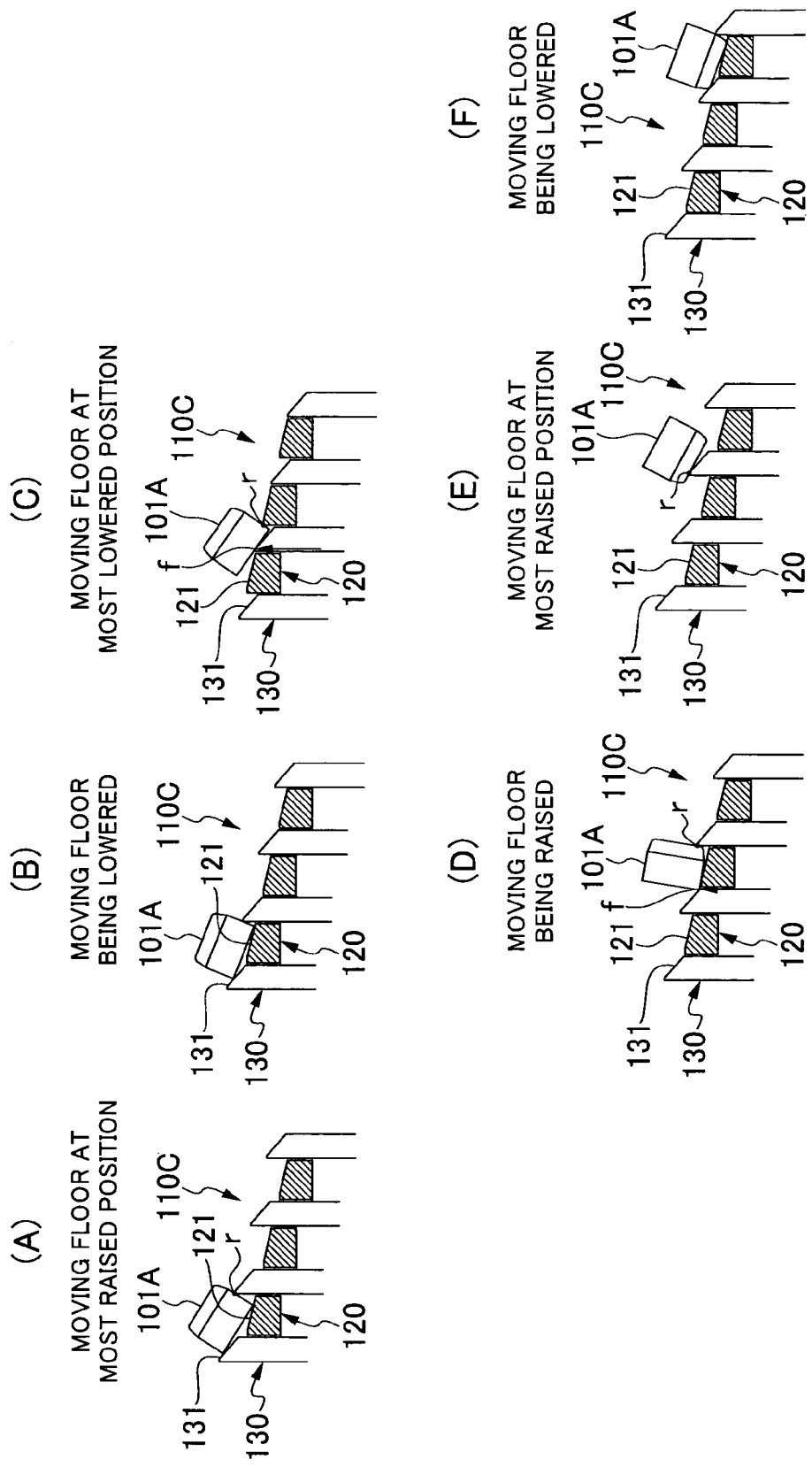
FIGS. 45(A) to 45(F) are frame format views showing a directing operation when conveying the article.
Figure 46:
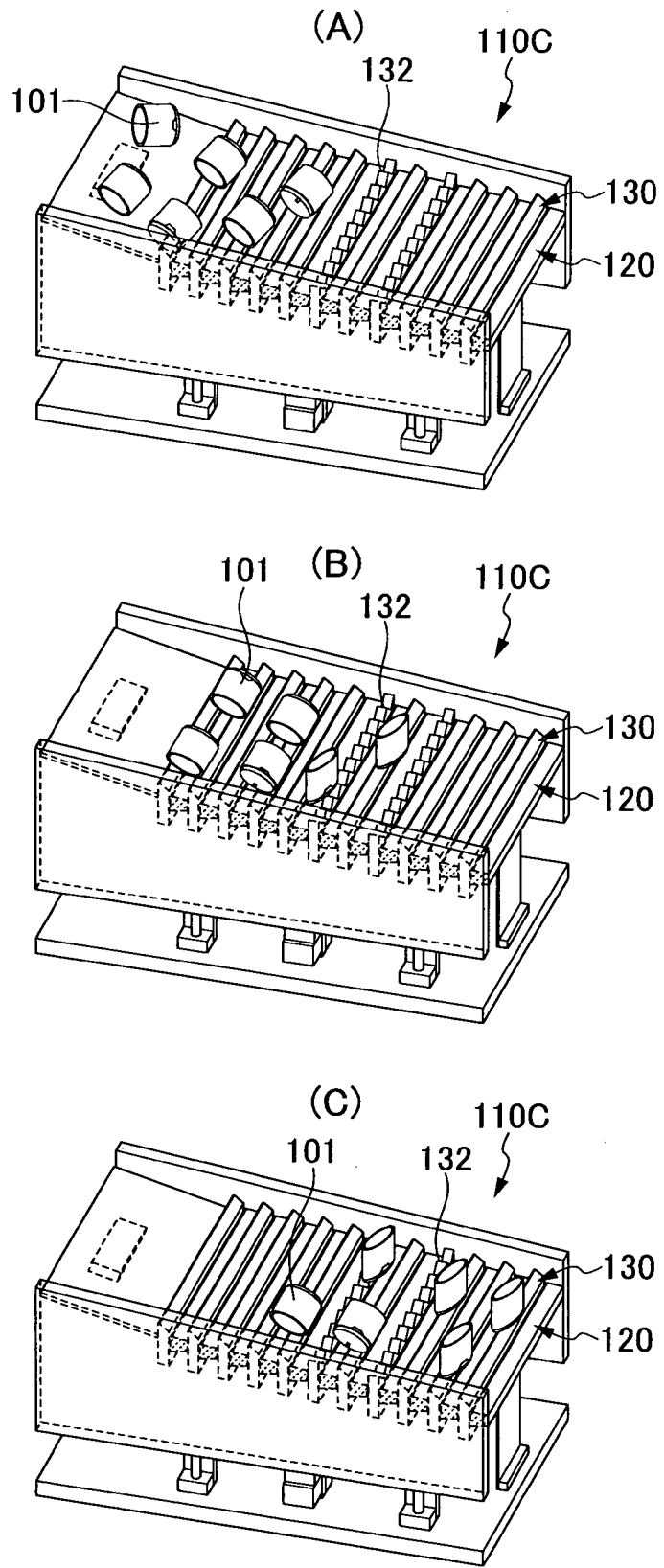
FIGS. 46(A) to 46(C) are frame format views showing a conveying state of a cap.

As shown in FIG. 39, an article conveying device 110C of Embodiment 5 has a direction from one end side to the other end side of a mount 111 as an article conveying direction, where an inlet shoot 112 is arranged at the one end side, and a vibrator 113 is arranged on the back surface of the inlet shoot 112 to enhance the conveying force.

The article conveying device 110C has a plurality of fixed floors 20 supported by a supporting member 114 arranged on the mount 111. The article conveying device 110C is arranged so that each floor surface 121 of the plurality of fixed floors 120 form a descending slope (angle θ with respect to horizontal plane: e.g., 5 to 35 degrees) (FIGS. 40(A) and 40(B)) towards the downstream side in the conveying direction with respect to each other. The floor surface 121 of each fixing floor 120 is an inclined plane inclined so as to form a descending slope towards the downstream side in the conveying direction. A vibrator may be arranged in the fixing floor 120 to enhance the conveying force.

The article conveying device 110C has left and right side guide plates 116 connected to a raising/lowering drive device 115 supported by the mount 111 and a slide part 118 (not shown) fixed to the side guide plate 116 is fitted in a freely sliding manner to a slide shaft 117 supported by the mount 111. An impact alleviating damper 119 is interposed between the mount 111 and the slide part 118. The left and right side guide plates 16 are arranged on both sides in the width direction of the inlet shoot 112 and the fixed floor 120, and have a plurality of moving floors 130 held in between. Each of the plurality of moving floors 130 is adjacently arranged on the side in the conveying direction (on side on the upstream side in the present embodiment) with respect to each fixed floor 120. The fixed floor 120 and the moving floor 130 are alternately arranged along the conveying direction with a constant interval. The article conveying device 110C repeats the raising and lowering operation of the side guide; plate 116 and the moving floor 130 by the raising/lowering drive device 115 (the moving floor 130 may be directly connected to the raising/lowering drive device 115, and the side guide plate 116 does not necessarily need to be raised/lowered). That is, each moving floor 130 repeats the raising/lowering operation of simultaneously positioning each floor surface 131 at the high position (FIG. 40(A)) and the low position (FIG. 40(B)) with respect to the floor surface 121 of the adjacent fixed floor 120.

The floor surface 131 of each moving floor 130 projects above the floor surface 121 of the fixed floor 120 at high position, and depresses below the floor surface 121 of the fixed floor 120 at low position. "Depress" in the present invention refers to when the moving floor 130 is positioned on the lower side of the fixed floor 120, and specifically, it includes obviously the case of completely depressed in which the entire moving floor 130 is completely positioned at the lower side of the floor surface 121 of the fixed floor 120 and a case in which the floor surface 131 of the moving floor 130 stops at substantially the same position as the floor surface 121 of the fixed floor 120 in the low position state as well. "Stops at substantially the same position" means being positioned such that the difference y in height of the line connecting the highest portions at the low position state of the floor surface 131 of each moving floor 130 with respect to the line connecting the lowest portions of the floor surface 121 of the plurality of fixed floors 120 is 0 to +5 mm as shown in FIG. 41(A), or y is between 2 to 10% of the minimum dimension d or e of the article shown in FIGS. 30 and 31. FIG. 41(B) shows a state in which y=approx. 0 mm, and the floor surface 131 of the moving floor 130 is at substantially the same position as the floor surface 121 of the fixed floor 120 in the low position state. FIG. 41(C) shows a state in which the y is a negative value, and the floor surface 131 of the moving floor 130 is completely depressed below the floor surface 121 of the fixed floor 120 in the low position state.

The floor surface 131 of each moving floor 130 positioned at high position is arranged so as to form a descending slope (angle θ with respect to horizontal plane: e.g., 5 to 35 degrees) towards the downstream side in the conveying direction with respect to each other. The floor surface 131 of each moving floor 130 is an inclined plane inclined so as to form a descending slope towards the downstream side in the conveying direction (FIGS. 40(A) and 40(B)).

The angle θ (θ1) for the moving floor arrangement is preferably matched to substantially the same as the angle θ (θ2) for the fixed floor arrangement because the article behavior in time of article conveyance stabilizes. The value of θ is appropriately adjusted by the friction state between the article and the fixed plate 120 or the moving floor 130. As one example, the angle θ of when conveying the article such as resin cap made of polypropylene, polyethylene, polystyrene, ABS etc., and metal cap made of aluminum etc. with (a) metal fixed floor 120 or moving floor 130 made of stainless steel or aluminum having the surface finished through general machining, (b) fixed floor 120 or moving floor 130 made of resin such as polyacetal or polyvinyl chloride having the surface finished through general machining, and (c) fixed floor 120 or moving floor 130 having a tape material of satisfactory slipping property attached to the surfaces is preferably between 8 to 25 degrees, and more preferably between 12 to 20 degrees. The movement behavior at the upstream and the downstream can be changed by differing the angle θ1 for the moving floor arrangement and the angle θ2 for the fixed floor arrangement.

The relationship of the angles θ, θ1, θ2 of the moving floor arrangement and the fixed floor arrangement with respect to the horizontal plane, the angle α of the floor surface 121 of the fixed floor 120 with respect to the horizontal plane, and the angle β of the floor surface 131 of the moving floor 130 with respect to the horizontal plane is shown in FIGS. 42(A) to 42(C). Generally, α is appropriately set to a range of 0 to θ2 degrees, and β is appropriately set to a range of 0 to θ1 degrees.

As a first mode, the general relationship of each angle is shown in FIG. 42(A). The angle α of the floor surface 121 of the fixed floor 120 with respect to the horizontal plane is set substantially the same as or slightly larger, or about −5 to +15 degrees with respect to the angle θ1 for the moving floor arrangement. This is for slowly and stably conveying the article to the floor surface 131 of the moving floor 130 on the downstream at the floor surface 121 of the fixed floor 120. Even at the angle the article does not slide on it sown, the article is conveyed by being pushed by another article from the upstream. The angle β of the floor surface 131 of the moving floor 130 with respect to the horizontal plane is set large, or about +5 to +25 degrees with respect to the angle α of the floor surface 121 of the fixed floor 120 with respect to the horizontal plane. This is for reliably conveying the article to the floor surface 121 of the fixed floor 120 on the downstream while the floor surface 131 of the moving floor 130 is projected.

In the second mode, the relationship of each angle particularly of when smoothly conveying the article is shown in FIG. 42(B). The angle α of the floor surface 121 of the fixed floor 120 with respect to the horizontal plane is set to be substantially the same as the angle θ1 for the moving floor arrangement. The angle β of the floor surface 131 of the moving floor 130 with respect to the horizontal plane is also set substantially the same as the angle θ1 for the moving floor arrangement. This is smoothly and reliably conveying the article to the floor surface 121 of the fixed floor 120 on the downstream without bumpiness when the floor surface 131 of the moving floor 130 is depressed. Therefore, the depressed position of the moving floor 130 is preferably a position where the floor surface 131 of the moving floor 130 is not depressed with respect to the floor surface 121 of the fixed floor 120 and the floor surface 121 of the fixed floor 120 and the floor surface 131 of the moving floor 130 form a substantially linear relationship, or a position (not shown) where the floor surface 131 of the moving floor 130 is depressed very slightly or about 0.5 to 3 mm, as shown in FIG. 42(C).

A concave-convex part 132 forming a concave-concave pattern similar to the saw-shape like pattern along a direction (direction along longitudinal direction of the moving floor 130, W direction of FIG. 39) orthogonal to the conveying direction (L direction of FIG. 39) is arranged on at least some of the floor surfaces 131 of the plurality of moving floors 130, where the article 101 passing the floor surface 131 of the moving floor 130 is pushed into the concave portion in the W direction of the concave-convex part 132 and rolled over, and dispersed in the width direction (W direction) of the article conveying device 110C, and furthermore, directed so that the center of gravity of the article 101 is on the lower side. The concave-convex part 132 arranged on the floor surface 131 of the moving floor 130 is as shown in FIGS. 22 to 25.

The raising/lowering drive device 115 can use an electrically operated cylinder capable of changing and controlling the raising/lowering speed or the raising/lowering stroke. The raising/lowering drive device 115 may be a mechanism for converting the rotation of the electrically operated motor to a linear movement, a pneumatic cylinder, or the like. When the floor surface 131 of the moving floor 131 forms a descending slope of an angle θ=15 degrees with respect to the horizontal plane, the raising/lowering speed of the moving floor 130 is preferably 50 to 250 mm/sec., and more preferably 100 to 150 mm/sec.

The article conveying state by the article conveying device 110C will now be described.

(Article Conveying Operation by Raising/Lowering of the Moving Floor 130)

In the article conveying device 110C of FIGS. 43(A) to 43(C), the floor surfaces 121 of the plurality of fixed floors 120 are arranged so as to form a descending slope with respect to each other, and the floor surfaces 131 of the plurality of moving floors 130 are also arranged so as to form a descending slope with respect to each other, where the article 101 (FIG. 43(A)) having a dimension smaller than the pitch p of the adjacent moving floor 130 as well as the article 101 (FIG. 43(B)) of larger dimension can be conveyed by repeating the raising/lowering operation of each moving floor 130. In other words, the inclination of the floor surface 131 of the moving floor 130 applies a conveying force towards the downstream side on the article 101 when the floor surface 131 of the moving floor 130 pushes up the article 101 on the floor surface 121 of the fixed floor 120 by raising the moving floor 130. The article 101 receiving the conveying force is then moved onto the floor surface 121 of the fixed floor 120 forming a descending slope along the conveying direction on the downstream side by lowering the moving floor 130, slides along the slope of the floor surface 121 of the fixed floor 120, and furthermore, the inclination of the floor surfaces 121 of the plurality of fixed floors 120 forming a descending slope along the conveying direction with respect to each other, and conveyed to the downstream side. In the process of sliding along the slope of the floor surface 121 of the fixed floor 120, the article is pushed up from the fixed floor 120 by the next raising of the moving floor 130 even if caught at the fixed floor 120 on the downstream side, and conveyed to the downstream side, as shown in FIG. 43(C). The conveying force of the article 101 (FIG. 43(B)) having a large dimension may be insufficient when the floors surfaces 121 of the plurality of fixed floors 120 are arranged horizontally with respect to each other, and the floor surfaces 131 of the plurality of moving floors 130 are raised and lowered while maintaining a horizontal state with respect to each other, as shown in FIG. 39, but sufficient conveying force can be obtained by arranging the floors surfaces 121 of the plurality of fixed floors 120 so as to form a descending slope with respect to each other, and arranging the floor surfaces 131 of the plurality of moving floors 130 so as to form a descending slope with respect to each other as in the article conveying device 110C of FIGS. 43(A) to 43(C).

Therefore, in the article conveying device 110C, the fixed floor 120 and the moving floor 130 are alternately arranged adjacent to each other along the conveying direction, and the respective floor surfaces 121, 131 are arranged so as to form a descending slope with each other towards the downstream side in the conveying direction, and thus regardless of the dimensional shape or the placement orientation of the article 101, various articles 101 can be placed on the floor surface 121 of the fixed floor 120, pushed up by the floor surface 131 of the moving floor 130, and discharged by a substantially constant amount by performing the conveying operation of (a) described above.

The article conveying device 110C can control the time proportion in which the floor surface 131 of the moving floor 130 is projected above the floor surface 121 of the adjacent fixed floor 20 to be smaller than the time proportion in which the floor surface 131 of the moving floor 130 is depressed below the floor surface 121 of the fixed floor 120 in one cycle (one cycle of most lowered position to most raised position to most lowered position) of the raising/lowering operation of the moving floor 130. Thus, the time of sliding the article 101 along the floor surface 121 of the fixed floor 120 becomes longer than the time of pushing the article 101 above the floor surface 131 of the moving floor 130, whereby the discharging amount of the article 1 can be increased.

If the rising acceleration of the moving floor 130 is large, the push-up force on the article 101 by the floor surface 131 of the moving floor 130 is large, and thus the conveying force applied on the article 101 by the inclination of the floor surface 131 of the moving floor 130 becomes large, whereby the discharging amount of the article 101 can be increased.

Furthermore, the article conveying device 110C can control the time proportion in which the floor surface 131 of the moving floor 130 is projected above the floor surface 121 of the adjacent fixed floor 120 to be larger than the time proportion in which the floor surface 131 of the moving floor 130 is depressed below the floor surface 121 of the fixed floor 120 in one cycle of the raising/lowering operation of the moving floor 130. Thus, the time of sliding the article 101 along the floor surface 121 of the fixed floor 120 becomes shorter than the time of pushing the article 101 above the floor surface 131 of the moving floor 130, whereby the discharging amount of the article 101 can be reduced.

If the rising acceleration of the moving floor 130 is small, the push-up force on the article 101 by the floor surface 131 of the moving floor 130 is small, and thus the conveying force applied on the article 101 by the inclination of the floor surface 131 of the moving floor 130 becomes small, whereby the discharging amount of the article 101 can be reduced.

The maximum value of the speed in time of raise of the moving floor 130 is appropriately adjusted so that the article can be stably conveyed at the desired speed depending on the weight of the conveying article, the angle of the fixed floor arrangement, angle θ for the moving floor arrangement, and the like. By way of example, the speed in time of raise of the moving floor 130 when conveying a cap serving as the article 101 having a weight of about 4 to 10 g at θ=15 degrees is preferably 40 to 250 mm/sec. The speed is more preferably 50 to 150 mm/sec.

If smaller than the suitable value, it becomes difficult to apply sufficient conveying force to the article 101, and if larger than the suitable value, the conveying speed of the article 101 also becomes too large, and stable conveyance cannot be realized.

The relationship of the mode of the article 101 and the conveying property of the article 101 by the article conveying device 110C will now be described. Considering a circular cap 101A and an elliptical cap 101B, as shown in FIGS. 30 and 31, for the article 101 to be conveyed by the article conveying device 110C, the minimum dimension a of the circular cap 101A is assumed as height h, and the minimum dimension a of the elliptical cap 101B is assumed as minor axis e of an ellipse. The circular cap and the elliptical cap of FIGS. 30 and 31 are shape examples in which h and e are minimum, but obviously, the diameter of the circle may be smaller than h for the circular cap, and the height of the cap may be smaller than e for the elliptical cap. The following description is made with the minimum dimension of such articles 101 as the reference.

(1) Conveying property of the circular cap 101A by the article conveying device 110C (elliptical cap 101B is substantially the same) (FIGS. 44(A) to 44(D))

In order to ensure a satisfactory conveying property of the circular cap 101A, the interval x of the adjacent moving floors 130 is preferably 0.3 to 2.0 times, and more preferably 0.4 to 1.5 times the minimum dimension a (h, e) of the circular cap 101A (FIG. 44(A)). If the interval x of the adjacent moving floors 130 is excessively larger than such suitable value, the moving floor 130 cannot push up the circular cap 101A, and thus cannot convey the cap (FIG. 44(B)). Even if the interval is in a range exceeding 1.0 times, conveyance becomes possible as the article will be pushed by the article 101 from the upstream if within the suitable value.

If the interval x of the adjacent moving floors 130 becomes excessively smaller than the suitable value, the fixed floor 120 and the moving floor 130 cannot act as an appropriate obstacle with respect to the conveyance of the circular cap 101A, and thus the circular cap 101A will continue to roll on the floor surface 121 of the fixed floor 120 and the floor surface 131 of the moving floor 130 and cannot be appropriately stopped temporarily, whereby the ratio of the circular cap 101A that cannot be stably discharged increases (FIGS. 44(C) and 44(D)).

(2) Directing property of the circular cap 101A by the article conveying device 110C (elliptical cap 101B is substantially the same) (FIGS. 45(A) to 45(F))

The circular cap 101A having a top surface is directed and discharged with the center of gravity side (top surface side) on the lower side.

In FIGS. 45A to 45F, the point drawn at the contacting part of the fixed floor 120 or the moving floor 130 and the circular cap 101A is the center of rotation r, and the terminating point of the up-pointing arrow drawn to the moving floor 130 is the acting point f of the rotational force.

When the moving floor 130 is at the most raised position (FIG. 45(A)), this becomes the starting point of rotation for directing the circular cap 101A.

While the moving floor 130 is being lowered (FIG. 45(B)), the circular cap 101A is applied with the conveying force towards the downstream while moving.

When the moving floor 130 is at the most lowered position (FIG. 45(C)), the center of rotation r of the circular cap 101A is at the tip of the fixed floor 120, and the acting point f of the rotational force is at the tip of the moving floor 130. Since the conveying force to the downstream is acting on the circular cap 101A, the cap 101A can be rotated with a small rotational force.

While the moving floor 130 is being raised (FIG. 45(D)), the circular cap 101A is rotationally moved, and the center of rotation r of the cap 101A moves to the tip of the moving floor 130 on the downstream and the acting point f of the rotational force moves to the downstream side on the same moving floor 130.

When the moving floor 130 is at the most raised position (FIG. 45(E)), rotation is performed such that the top surface on the center of gravity side of the circular cap 101A is on the lower side, and thereafter, rotation is stopped, and stable orientation is obtained.

While the moving floor 130 is being lowered (FIG. 45(F)), the circular cap 101A slidably moves on the fixed floor 120, and does not rotate. In other words, directing for having the center of gravity side of the circular cap 101A on the lower side is performed through rotational movement of the circular cap 101A.

(Article Conveying Operation by the Concave-Convex Part 132 of the Moving Floor 130)

In the article conveying device 110C, if the floor surface 131 of the moving floor 130 includes the concave-convex part 132, the article 101 is dispersed in the width direction of the article conveying device 110C, and the article 101 can be discharged by a substantially constant amount from the article conveying device 110C.

When desiring to perform directing on the articles 101 to be discharged from the article conveying device 110C to have the respective center of gravity on the lower side, the article 101 passing through the floor surface 131 of the moving floor 130 must be rolled over at the concave portion in the W direction of the concave-convex part 132 to have the center of gravity directed to the lower side.

Figure 33:
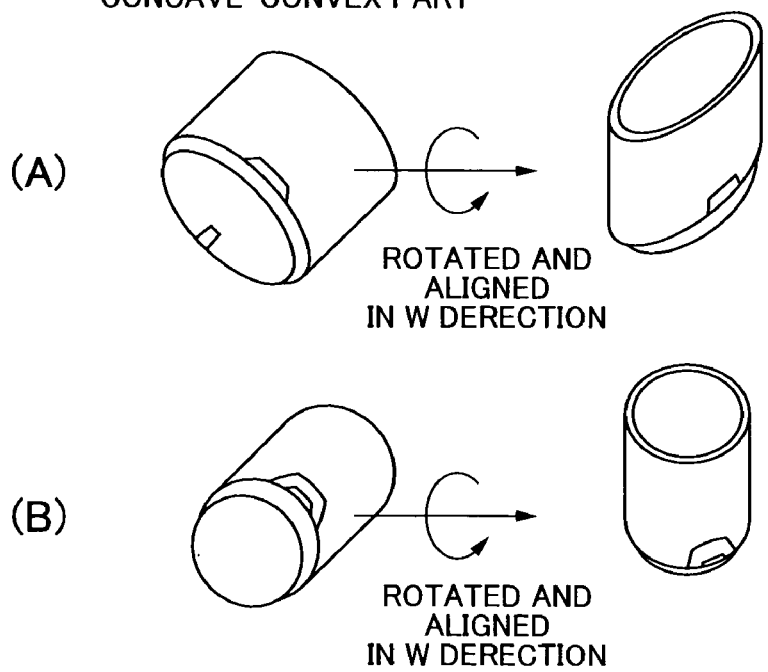
FIGS. 33(A) and 33(B) are frame format views showing an article passing through the moving floor including the concave-convex part.

In particular, if the height (h) of the article 101 is large with respect to the bottom surface length thereof (diameter d, minor axis of ellipse e) (h>1.2d, h>1.2e) as shown in FIGS. 30 and 31, when the moving floor 130 does not include the concave-convex part 132, the article 101 moves towards the downstream in the same direction and directing for having the center of gravity on the lower side becomes difficult, as shown in FIGS. 32(A) and 32(B). When the moving floor 130 includes the concave-convex part 132, as shown in FIG. 33, the article 101 is pushed into the concave portion of the concave-convex part 132 when passing the floor surface 131 of the moving floor 130 thereby inclined and rolled over in the W direction towards the center of gravity of the article 101, whereby directing for having the center of gravity on the lower side is performed.

In the article conveying device 110C, the dispersion of the articles 101 in the width direction of the article conveying device 110C is further promoted if the floor surfaces 131 of all the moving floor 130 include the concave-convex part 132, whereby the article 101 can be discharged by a constant amount from the article conveying device 110C and high dispersion conveying property can be obtained.

When desiring to perform directing for having the center of gravity of the article 101 on the lower side, the moving floor 130 including the concave-convex part 132 is preferably installed in a suitable range from a position on the upstream side by (0.2-0.4)×L from the most downstream part to an upstream part with respect to the installing range L of the fixed floor 120 and the moving floor 130 in the article conveying device 110C. If the moving floor 130 including the concave-convex part 132 is at the most downstream part of the article conveying device 110, the article 101 inclines in the W direction at the most downstream part and the discharging orientation of the article 101 becomes unstable. However, if it is preferable to incline in the W direction in terms of handling of the article in the next step or it is convenient to incline in the W direction for articles of special shape in terms of directing, the moving floor 130 is sometimes arranged only at the most downstream position or arranged at the most downstream position and the upstream position thereof. The article conveying device 110C may have the concave-convex part 132 arranged on all the moving floors 130 of the suitable range, or have both the moving floor 130 including the concave-convex part 132 and the moving floor 130 not including the concave-convex part 132. More preferably, the moving floor 130 including the concave-convex part 132 and the moving floor 130 not including the concave-convex part 132 are alternately arranged, whereby high conveying force is applied by the moving floor 130 not including the concave-convex part 132, the directing for having the center of gravity of the article 101 to the lower side is performed by the moving floor 130 including the concave-convex part 132, and high-performance directing can be performed.

The article conveying device 110C of FIGS. 46(A) to 46(C) conveys the cap 101 in which the height (h) with respect to the minor axis of the ellipse (e) is small, where the article passes the moving floor 130 including the concave-convex part 132 about twice, so that most (about 83 to 97%) of the articles 101 are directed. As an example of directing, the caps are supplied to the moving floor 130 having a length of 300 mm such that an average of about three caps are lined, and the moving floor 130 is raised and lowered at 1 sec. cycle, so that the cap 101 having a minor axis of an ellipse (e) of 36 mm, a major axis of an ellipse (not shown) of 51 mm, and a height (h) of 46 mm can be directed at about 180/min. at a success rate of about 85%.

Similar to the article conveying device 110A, the concave-convex part 122 may be arranged on at least some floor surfaces 121 of the plurality of fixed floors 120 in the article conveying device 110C.

In the article conveying device of the present invention, the dispersion conveying property and the directing property of the article 101 can be further enhanced even if the floor surface 121 of the fixed floor 120 and the floor surface 131 of the moving floor 130 are arranged horizontally or have a descending slope of either angle θ1, θ2 by arranging the concave-convex part 122 on the floor surface 121 of the fixed floor 120 and arranging the concave-convex part 132 on the floor surface 132 of the moving floor 130.

FIGS. 47(A) and 47(B) are frame format views showing a variant of the article conveying device. FIG. 47(A) shows a view in which the plurality of fixed floors 120 and the moving floors 130 are arranged horizontally to each other, and FIG. 47(B) shows a view in which the plurality of fixed floors 120 and the moving floors 130 are arranged so as to form a descending slope towards the downstream side with respect to each other. Regarding the angle β shown in FIGS. 42(A) to 42(C) of the moving floor 130, the moving floor having a β larger than the β of another moving floor 130, a moving floor having a β smaller than the β of another moving floor 130, or a moving floor of β=0 where the floor surface becomes horizontal may coexist, or the moving floor having β of front and back opposite directions with respect to the β of another moving floor 130 may coexist (not shown), whereby the movement of the article 101 is temporarily stopped or disturbed to enhance the directing property. Similarly, in the fixed floor 120, regarding the angle α shown in FIGS. 42(A) to 42(C) of the fixed floor 120, the fixed floor having a α larger than the α of another fixed floor 120, a fixed floor having a α smaller than the α of another fixed floor 120, or a fixed floor of α=0 where the floor surface becomes horizontal may coexist (not shown), or the fixed floor having a of front and back opposite directions with respect to the α of another fixed floor 120 may coexist (not shown), whereby similar effect is obtained.

Figure 48:
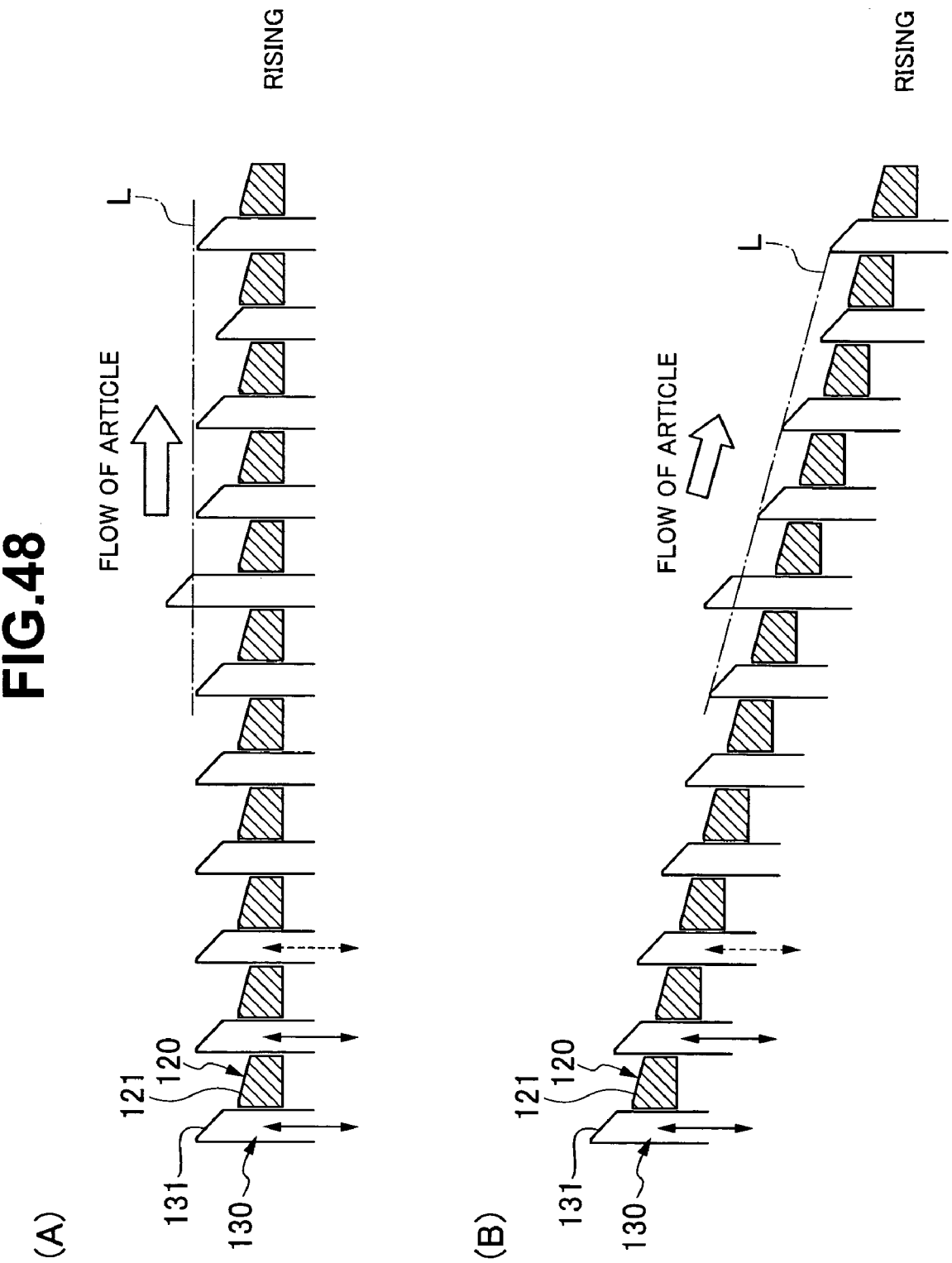
FIGS. 48(A) and 48(B) are frame format views showing a variant of the article conveying device.

FIGS. 48(A) and 48(B) are frame format views showing a variant of the article conveying device. FIG. 48(A) is a view in which the plurality of fixed floors 120 and the moving floors 130 are arranged horizontal to each other, and FIG. 48(B) is a view in which the plurality of fixed floors 120 and the moving floors 130 are arranged so as to form a descending slope towards the downstream side with respect to each other.

The moving floor having a floor surface of a height exceeding a linear part L connecting the same parts of the floor surfaces 131 of two or more moving floors 130 may coexist, or the moving floor having a floor surface of low height may coexist, where the directing property can be enhanced by temporarily stopping or disturbing the movement of the article 101. Similarly, for the fixed floor 120, the fixed floor having a floor surface of a height exceeding a linear part L connecting the same parts of the floor surfaces 121 of two or more fixed floors 120 may coexist, or the fixed floor having a floor surface of low height may coexist (not shown), whereby similar effect can be obtained.

Figure 49:
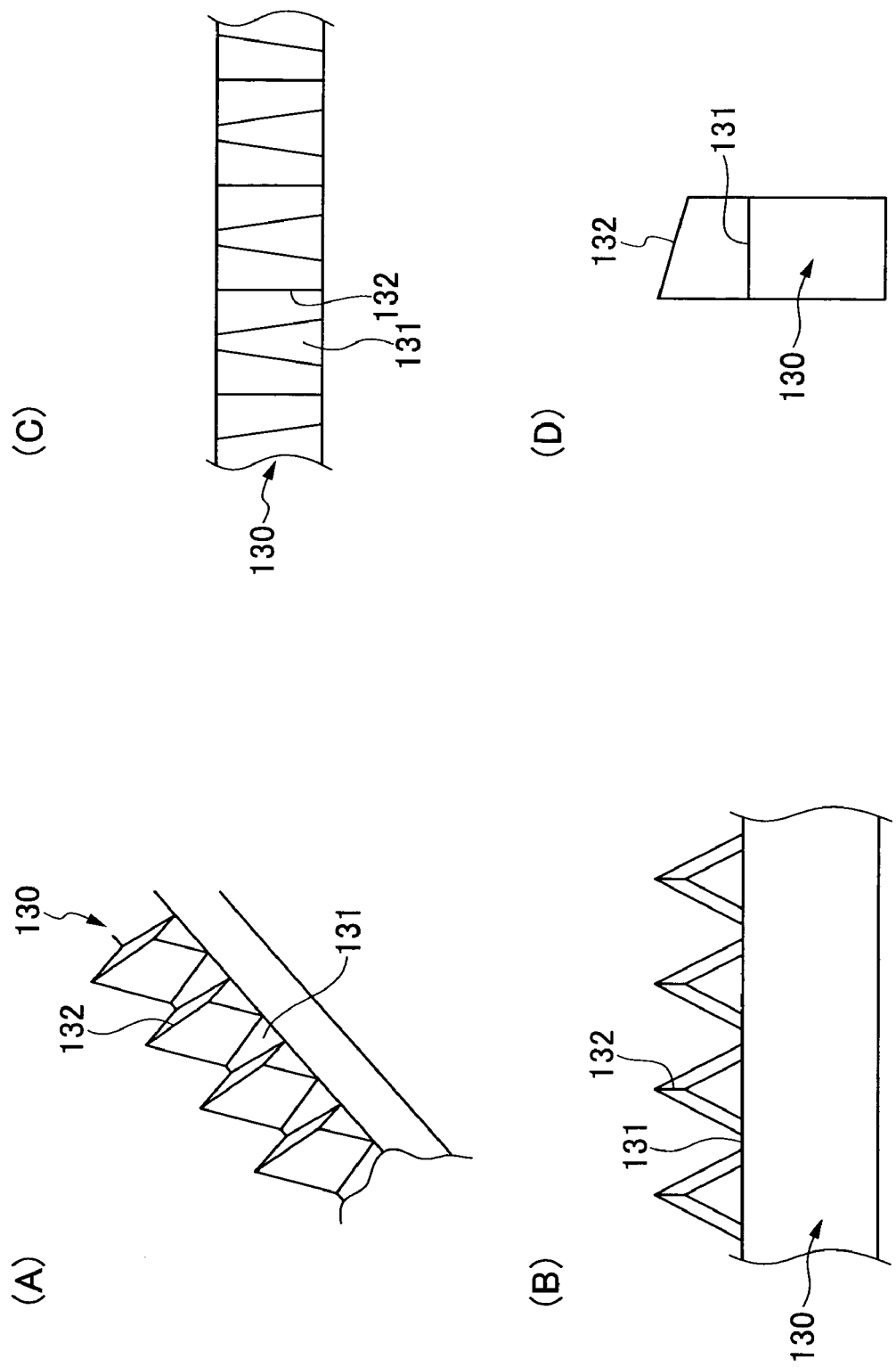
FIGS. 49(A) to 49(D) are frame format views showing a variant of the shape of the concave-convex part of the fixed floor or the moving floor.

FIGS. 49(A) to 49(D) are frame format views showing a variant of a pattern of the concave-convex pattern of the fixed floor or the moving floor. For instance, in the floor surface 131 to be formed with the concave-convex part 132 of the moving floor 130, inclination is made so as to form a descending slope towards the downstream side in the conveying direction, and the conveying force can be enhanced, as shown in FIGS. 49(A) (perspective view), 49(B) (front view), 49(C) (plan view), and 49(D), (side view). This is the same for the floor surface 121 to be formed with the concave-convex part 122 of the fixed floor 120.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. For instance, the concave-convex part may be arranged on all the floor surfaces of the fixed floors and the moving floors.

The present invention handles articles which are not limited to caps and articles of similar shape described hereinafter in detail. For instance by way of example: articles in which the position of the center of gravity is biased, such as caps having a low height with respect to the diameter of a jar container for filling cream, hand cream, hair wax, and the like, such as a stopper (an inside plug of a container) or an electronics device case having a low height with respect to the diameter or width further having a tub shape having a circular or a square shape, such articles merely formed with a depression.

Further, the direction alignment on various articles, not only on containers or body shells but also on any product or parts are possible. For instance, possible examples include: a screw, a chocolate bar or other article, having a substantially cylindrical column with or without a depression, a plate-shaped body having a particular thickness and rectangular parallel piped shape, wherein the shaped body's center of gravity is biased or at substantially the center in the height direction for solid articles, the shape having a difference in the shape of the top surface and the bottom end which are in a chamfered state.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

The invention claimed is:

1. An article conveying device, comprising:
   a plurality of fixed floors;
   a plurality of moving floors; and
   a raising/lowering drive device that performs a raising/lowering operation of the plurality of moving floors;
   wherein
   a floor surface of each of the plurality of fixed floors is arranged to form a descending slope towards a downstream side in a conveying direction with respect to each other,
   each of the plurality of moving floors is adjacently arranged on a side in the conveying direction with respect to each fixed floor,
   the raising/lowering drive device simultaneously positions a respective floor surface of each moving floor at a high position or a low position with respect to a floor surface of the adjacent fixed floor,
   the raising/lowering drive device repeatedly performs the raising/lowering operation,
   the floor surface of each moving floor positioned at the high position is arranged to form a descending slope towards the downstream side in the conveying direction with respect to each other,
   the floor surface of each fixed floor is inclined to form a descending slope towards the downstream side in the conveying direction,
   the floor surface of each moving floor is also inclined to form a descending slope towards the downstream side in the conveying direction, and
   an angle of the floor surface of each moving floor with respect to a horizontal plane is larger than an angle of the floor surface of each fixed floor with respect to the horizontal plane.

2. The article conveying device according to claim 1, wherein in one cycle of the raising/lowering operation of the moving floor, a time proportion in which the floor surface of the moving floor is projected above the floor surface of the adjacent fixed floor is controlled to be smaller than a time proportion in which the floor surface of the moving floor is depressed below the floor surface of the fixed floor.

3. The article conveying device according to claim 1, wherein in one cycle of the raising/lowering operation of the moving floor, a time proportion in which the floor surface of the moving floor is projected above the floor surface of the adjacent fixed floor is controlled to be larger than a time proportion in which the floor surface of the moving floor is depressed below the floor surface of the fixed floor.

4. The article conveying device according to claim 3, wherein a stroke in which the floor surface of the moving floor is projected above the floor surface of the adjacent fixed floor is controlled to be larger for the moving floor on the upstream side in the conveying direction than for the moving floor on the downstream side.

5. The article conveying device according to claim 1, further comprising a concave-convex part wherein
   the concave-convex part forms a concave-convex pattern along a direction orthogonal to the conveying direction, and is arranged on at least some floor surfaces of the fixed floors or the moving floors.

6. The article conveying device according to claim 5, wherein the floor surface of each of the plurality of fixed floors or the plurality of moving floors is arranged to be horizontal in the conveying direction with respect to each other.

7. The article conveying device according to claim 5, wherein the floor surface of each of the plurality of fixed floors or the plurality of moving floors is arranged to form a descending slope towards the downstream side in the conveying direction with respect to each other.

8. The article conveying device according to claim 7, wherein all the floor surfaces of the moving floors are arranged to form a descending slope towards the downstream side in the conveying direction with respect to each other.

9. The article conveying device according to claim 5, wherein the concave-convex part is arranged on the floor surface of at least one moving floor.

10. The article conveying device according to claim 5, wherein the concave-convex part is arranged on the floor surface of at least one fixed floor.

11. The article conveying device according to claim 5, wherein the floor surface not having the concave-convex part of the fixed floor and the moving floor is inclined to form a descending slope towards the downstream side in the conveying direction.

12. The article conveying device according to claim 11, wherein the floor surface having the concave-convex part of the fixed floor or the moving floor is inclined to form a descending slope towards the downstream side in the conveying direction.

13. The article conveying device according to claim 5, wherein the moving floor or the fixed floor having the concave-convex part and the fixed floor and the moving floor not having the concave-convex part are alternately arranged.

14. The article conveying device according to claim 5, wherein the concave-convex part is arranged on all the floor surfaces of the fixed floor and the moving floor.

15. The article conveying device according to claim 12, wherein the floor surface arranged at the downstream in the conveying direction does not include the concave-convex part.

16. The article conveying device according to claim 5, wherein the floor surface of the moving floor having the concave-convex part and the floor surface of the fixed floor having the concave-convex part are arranged adjacent to each other, and the floor surface of the fixed floor or the floor surface of the moving floor arranged before and after do not have the concave-convex part.

17. The article conveying device according to claim 12, wherein the moving floor or the fixed floor having the concave-convex part and the fixed floor and the moving floor not having the concave-convex part are alternately arranged.

18. The article conveying device according to claim 12, wherein the floor surface of the moving floor having the concave-convex part and the floor surface of the fixed floor having the concave-convex part are arranged adjacent to each other, and the floor surface of the fixed floor or the floor surface of the moving floor arranged before and after do not have the concave-convex part.

19. The article conveying device according to claim 8, wherein the concave-convex part is arranged on all the floor surfaces of the fixed floor and the moving floor.

20. The article conveying device according to claim 12, wherein the concave-convex part is arranged on all the floor surfaces of the fixed floor and the moving floor.

* * * * *